(12) United States Patent
Fudaba et al.

(10) Patent No.: US 9,114,531 B2
(45) Date of Patent: Aug. 25, 2015

(54) ARM CONTROL APPARATUS, ARM CONTROL METHOD, ARM CONTROL PROGRAM, ROBOT, AND INTEGRATED ELECTRONIC CIRCUIT FOR ARM CONTROL

(71) Applicant: Panasonic Corporation, Osaka (JP)

(72) Inventors: Yudai Fudaba, Osaka (JP); Yuko Tsusaka, Osaka (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/445,588

(22) Filed: Jul. 29, 2014

(65) Prior Publication Data

US 2014/0336820 A1   Nov. 13, 2014

Related U.S. Application Data

(63) Continuation of application No. PCT/JP2013/006802, filed on Nov. 20, 2013.

(30) Foreign Application Priority Data

Nov. 22, 2012   (JP) .................................. 2012-256525

(51) Int. Cl.
*G05B 15/00* (2006.01)
*B25J 9/00* (2006.01)
(Continued)

(52) U.S. Cl.
CPC ............... *B25J 9/1633* (2013.01); *G06F 3/041* (2013.01); *G09F 9/00* (2013.01); *G05B 2219/36168* (2013.01); *G05B 2219/36249* (2013.01); *Y10S 901/02* (2013.01); *Y10S 901/50* (2013.01)

(58) Field of Classification Search
USPC .............. 700/261, 260, 262, 245; 901/46, 14; 248/309.1
See application file for complete search history.

(56) References Cited

U.S. PATENT DOCUMENTS 6,155,993 A * 12/2000 Scott ............................. 600/595
6,428,172 B1 * 8/2002 Hutzel et al. .................. 359/838
(Continued)

FOREIGN PATENT DOCUMENTS

| JP | 09-196055 | 7/1997 |
| JP | 09-267281 | 10/1997 |

(Continued)

OTHER PUBLICATIONS

International Search Report issued Dec. 24, 2013 in International (PCT) Application No. PCT/JP2013/006802.

*Primary Examiner* — Ronnie Mancho
(74) *Attorney, Agent, or Firm* — Wenderoth, Lind & Ponack, L.L.P.

(57) ABSTRACT

There is provided a display information acquiring unit for acquiring display information on a screen of a touch panel display, a touch pattern estimating unit for estimating a region on the screen likely to be touched by a person and a motion direction of the touch based on the display information, a load estimating unit for estimating a load or a torque to the display based on the estimated region and the motion direction, a stiffness parameter information generating unit for generating information for controlling the arm so that the position and the orientation of the display do not change along the touching direction at the time of touch panel input based on the estimated load or torque, and an arm control unit for controlling a stiffness parameter of the arm based on the generated information.

18 Claims, 56 Drawing Sheets

(51) Int. Cl.
*B25J 9/16* (2006.01)
*G06F 3/041* (2006.01)
*G09F 9/00* (2006.01)

(56) References Cited

U.S. PATENT DOCUMENTS

| | | | |
|---|---|---|---|
| 7,191,191 B2* | 3/2007 | Peurach et al. | 1/1 |
| 9,038,971 B1* | 5/2015 | Guthrie | 248/121 |
| 2002/0003571 A1* | 1/2002 | Schofield et al. | 348/148 |
| 2002/0149571 A1* | 10/2002 | Roberts | 345/174 |
| 2005/0045409 A1* | 3/2005 | Fenelli et al. | 180/326 |
| 2012/0072025 A1 | 3/2012 | Takagi et al. | |
| 2013/0107136 A1* | 5/2013 | Tamura et al. | 348/836 |
| 2013/0172906 A1* | 7/2013 | Olson et al. | 606/130 |
| 2013/0258212 A1* | 10/2013 | Ooe et al. | 348/836 |

FOREIGN PATENT DOCUMENTS

| | | |
|---|---|---|
| JP | 2000-162976 | 6/2000 |
| JP | 2004-029645 | 1/2004 |
| JP | 2008-009632 | 1/2008 |
| JP | 2010-128195 | 6/2010 |
| JP | 2012-086354 | 5/2012 |

* cited by examiner

Fig.2

| TIME (ms) | POSITION (mm) (x, y, z) | ORIENTATION (rad) (rx, ry, rz) | VELOCITY (mm/ms) (vx, vy, vz) | ANGULAR VELOCITY (rad/ms) ($\omega_x$, $\omega_y$, $\omega_z$) |
|---|---|---|---|---|
| . . . | . . . | . . . | . . . | . . . |
| 1821 | 112.2, 65.5, -8.5 | 0.07, -0.87, 1.22 | 0.11, -0.21, 0.38 | 0.015, -0.012, 0.010 |
| 1822 | 113.1, 64.8, -8.5 | 0.06, -0.85, 1.27 | 0.95, -0.73, 0.00 | -0.018, 0.022, 0.059 |
| 1823 | 113.5, 64.0, -8.0 | 0.05, -0.82, 1.28 | 0.42, -0.82, 0.50 | -0.010, 0.026, 0.017 |
| . . . | . . . | . . . | . . . | . . . |

Fig.5A

| HTML | POSITION (x, y) | | | | DIRECTION (+x, −x, +y, −y) |
|---|---|---|---|---|---|
| | ...... | (0, −1) | (0, 0) | (0, 1) | ...... |
| mousedown | ... ... | 1 | 0 | 0 | ... ... | 0, 0, 0, 0 |
| draggable | ... ... | 1 | 1 | 1 | ... ... | 1, 1, 0, 0 |
| meta name = "viewpoint" USER-SCALABLE | ... ... | 1 | 1 | 1 | ... ... | 1, 1, 1, 1 |
| keydown | ... ... | 1 | 0 | 0 | ... ... | 0, 0, 0, 0 |
| ... ... | ... ... | ... ... | ... ... | ... ... | ... ... | ... ... |

Fig.5B

| CONTENTS | POSITION (x, y) | | | | DIRECTION (+x, −x, +y, −y) |
|---|---|---|---|---|---|
| | ... | (0, −1) | (0, 0) | (0, 1) | ...... |
| BOOK | ..... | 1 | 1 | 1 | 1, 1, 0, 0 |
| PHOTOGRAPH | ..... | 1 | 1 | 1 | 1, 1, 1, 1 |
| MAP | ..... | 1 | 1 | 1 | 1, 1, 1, 1 |
| ..... | ..... | ..... | ..... | ..... | ..... |

Fig.6C

| TIME (ms) | POSITION (x, y) | | | | | | DIRECTION (+x, −x, +y, −y) |
|---|---|---|---|---|---|---|---|
| | ... | (0, −125) | ... | (0, −1) | (0, 0) | (0, 1) | ... |
| ... | ... | ... | ... | ... | ... | ... | ... |
| 323 | ... | 1 | ... | 0 | 0 | 0 | 0, 0, 0, 0 |
| 324 | ... | 1 | ... | 0 | 0 | 0 | 0, 0, 0, 0 |
| 325 | ... | 1 | ... | 0 | 0 | 0 | 0, 0, 0, 0 |
| ... | ... | ... | ... | ... | ... | ... | ... |

*Fig.7E*

| TIME (ms) | POSITION (x, y) | | | | | DIRECTION (+x, -x, +y, -y) |
|---|---|---|---|---|---|---|
| | ...... | (1, 0) | (0, 0) | (0, 1) | ...... | |
| ⋮ | ⋮ | ⋮ | ⋮ | ⋮ | ⋮ | ⋮ |
| 132 | ⋮ | 1 | 1 | 1 | ⋮ | 1, 1, 0, 0 |
| 133 | ⋮ | 1 | 1 | 1 | ⋮ | 1, 1, 0, 0 |
| 134 | ⋮ | 1 | 1 | 1 | ⋮ | 1, 1, 0, 0 |
| ⋮ | ⋮ | ⋮ | ⋮ | ⋮ | ⋮ | ⋮ |

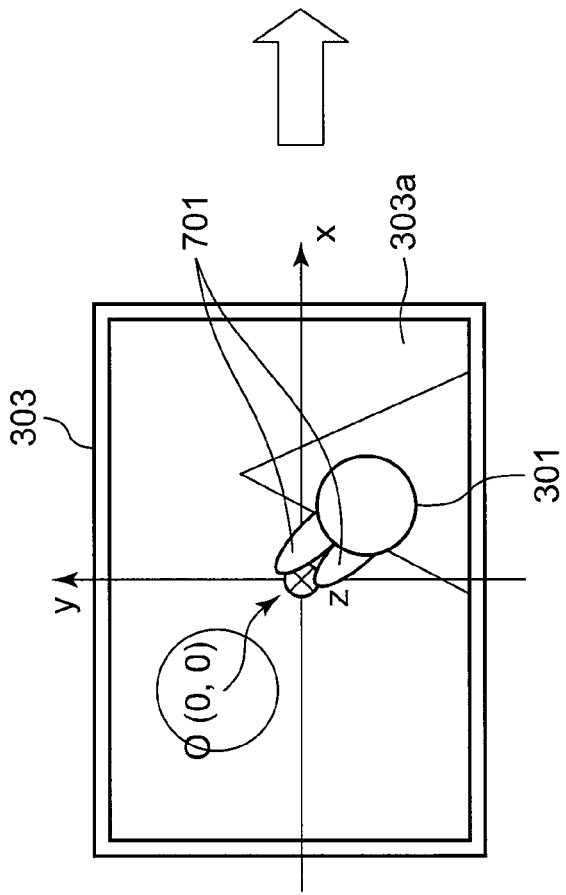
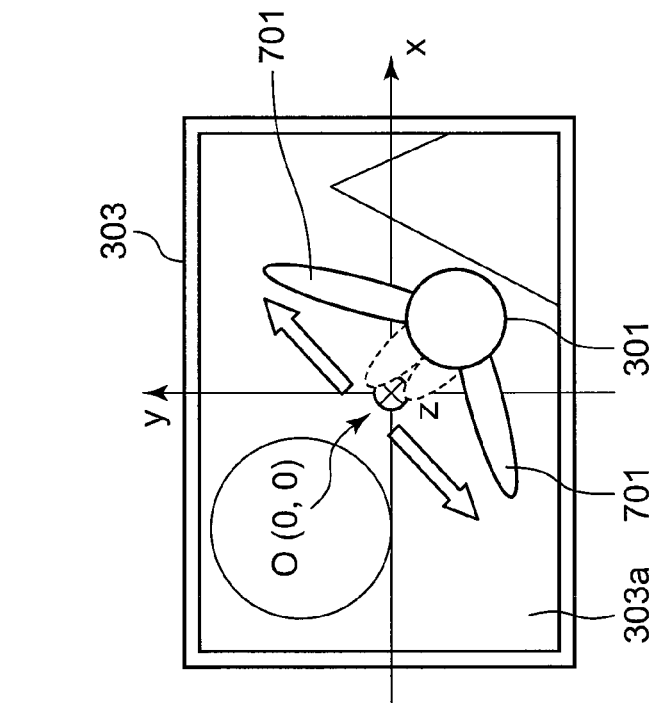
Fig.8A

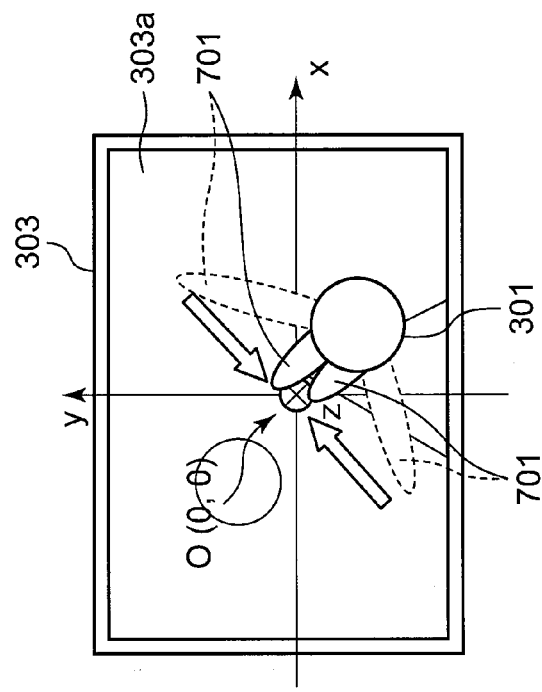
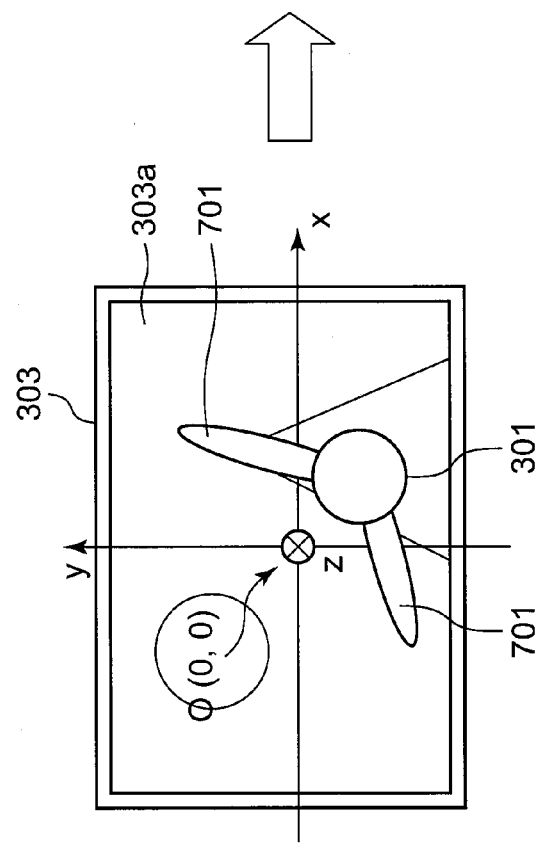
Fig.8B

| TIME (ms) | POSITION (x, y) | | | | | DIRECTION (+x, -x, +y, -y) |
|---|---|---|---|---|---|---|
| | ...... | (1, 0) | (0, 0) | (0, 1) | ...... | |
| ⋮ | ⋮ | ⋮ | ⋮ | ⋮ | ⋮ | ⋮ |
| 2244 | ⋮ | 1 | 1 | 1 | ⋮ | 1, 1, 1, 1 |
| 2245 | ⋮ | 1 | 1 | 1 | ⋮ | 1, 1, 1, 1 |
| 2246 | ⋮ | 1 | 1 | 1 | ⋮ | 1, 1, 1, 1 |
| ⋮ | ⋮ | ⋮ | ⋮ | ⋮ | ⋮ | ⋮ |

*Fig.9C*

| TIME (ms) | POSITION (x, y) | | | | | | DIRECTION (+x, -x, +y, -y) |
|---|---|---|---|---|---|---|---|
| | ...... | (0, -125) | ...... | (0, -1) | (0, 0) | (0, 1) | ...... |
| .... | .. .. | .. .. | .. .. | .. .. | .. .. | .. .. | .. .. |
| 1212 | .. .. | 1 | .. .. | 0 | 0 | 0 | 0, 0, 0, 0 |
| 1213 | .. .. | 1 | .. .. | 0 | 0 | 0 | 0, 0, 0, 0 |
| 1214 | .. .. | 1 | .. .. | 0 | 0 | 0 | 0, 0, 0, 0 |
| .... | .. .. | .. .. | .. .. | .. .. | .. .. | .. .. | .. .. |

Fig.10C

| TIME (ms) | POSITION (x, y) | | | | | DIRECTION (+x, −x, +y, −y) |
|---|---|---|---|---|---|---|
|  | ...... | (1, 0) | (0, 0) | (0, 1) | ...... |  |
| ⋮ | ⋮ | ⋮ | ⋮ | ⋮ | ⋮ | ⋮ |
| 5556 | ⋮ | 1 | 1 | 1 | ⋮ | 1, 1, 1, 1 |
| 5557 | ⋮ | 1 | 1 | 1 | ⋮ | 1, 1, 1, 1 |
| 5558 | ⋮ | 1 | 1 | 1 | ⋮ | 1, 1, 1, 1 |
| ⋮ | ⋮ | ⋮ | ⋮ | ⋮ | ⋮ | ⋮ |

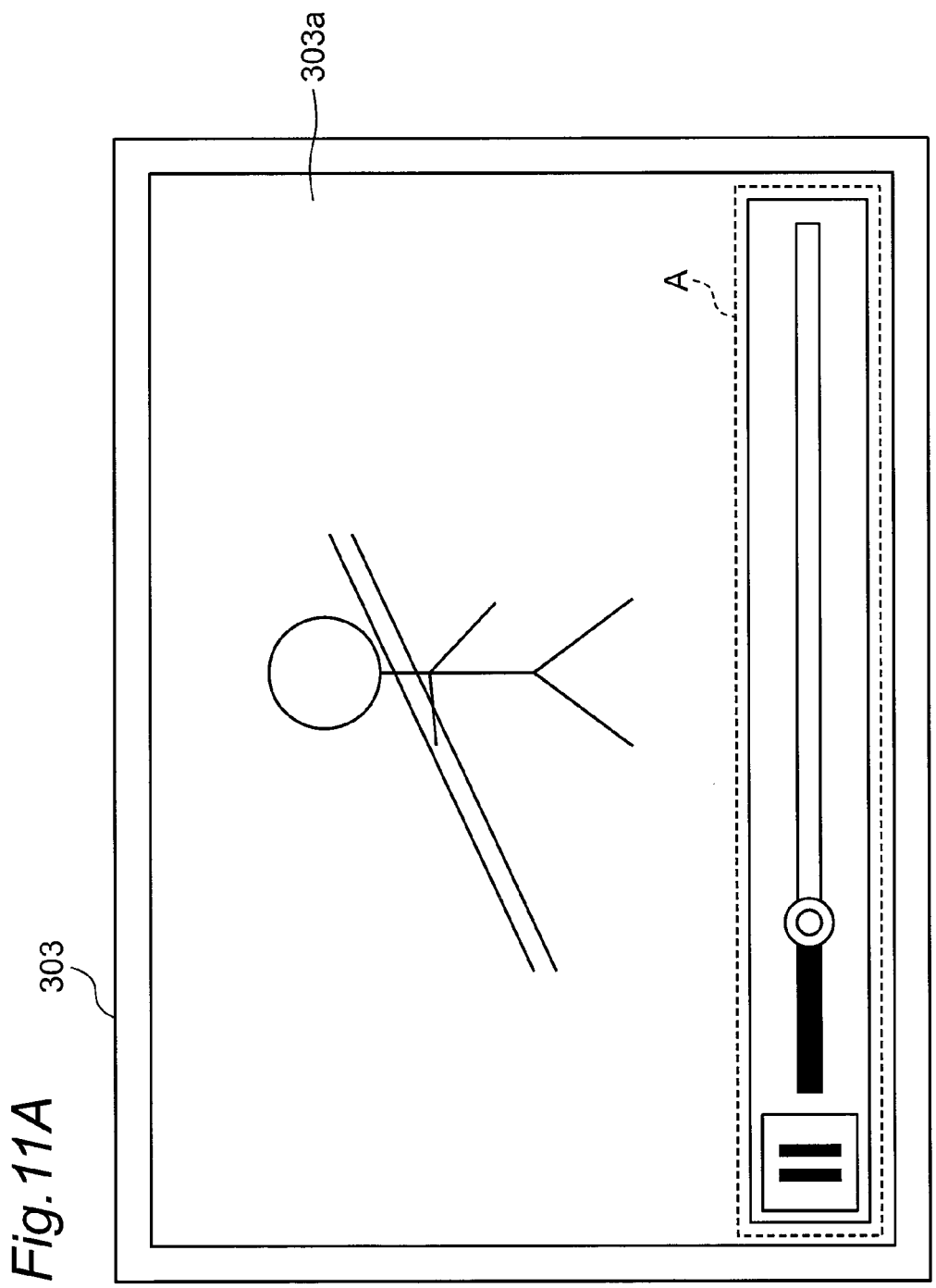

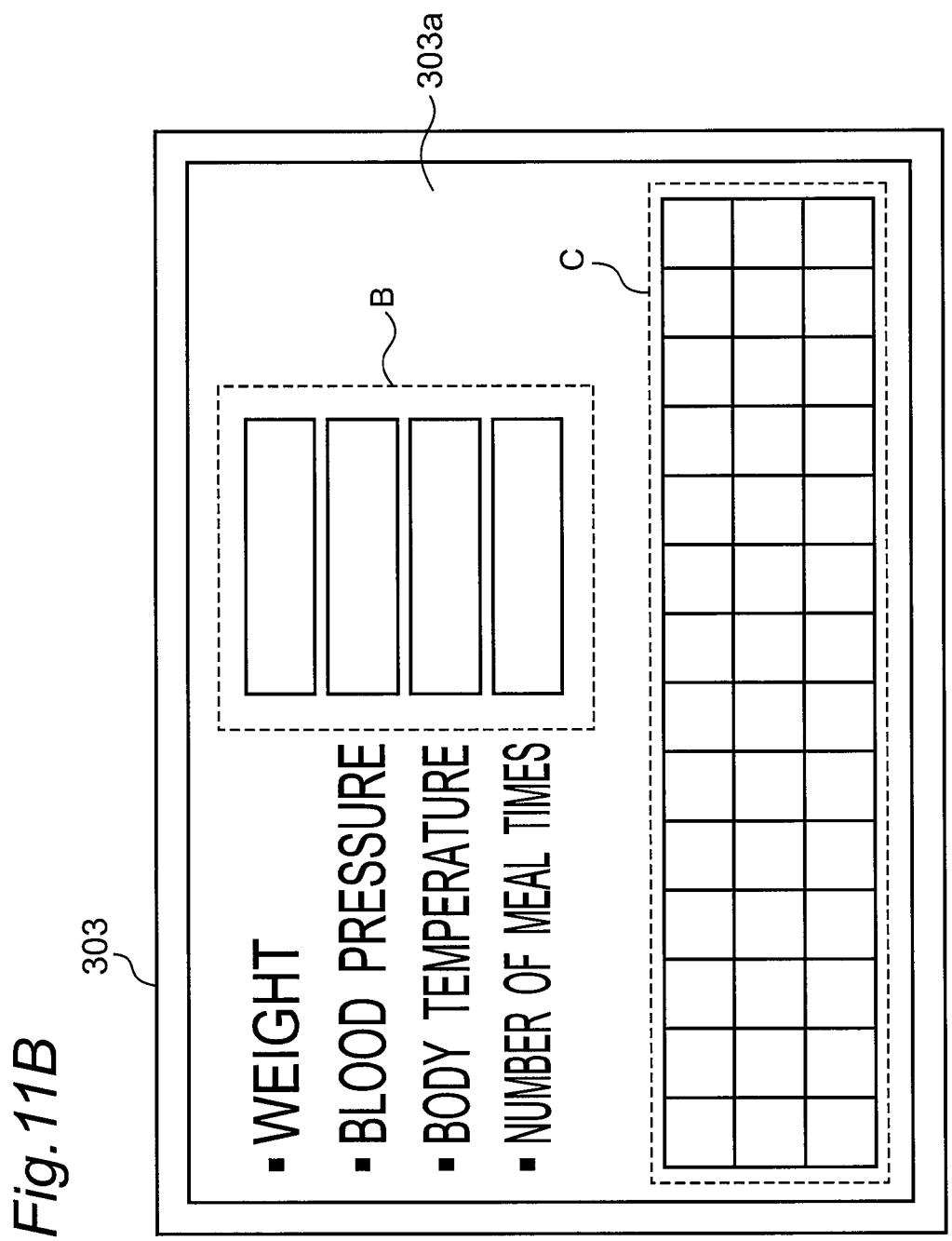

*Fig.12*

| TIME (ms) | POSITION (x, y) | | | DIRECTION (+x, −x, +y, −y) |
|---|---|---|---|---|
| | (0, 0) | (0, 1) | ...... | |
| ⋮ | ⋮ | ⋮ | ⋮ | ⋮ |
| 323 | 0 | 1 | ⋮ | 1, 1, 0, 0 |
| 324 | 0 | 1 | ⋮ | 1, 1, 0, 0 |
| 325 | 0 | 1 | ⋮ | 1, 1, 0, 0 |
| ⋮ | ⋮ | ⋮ | ⋮ | ⋮ |

Fig. 15A

| TIME (ms) | FORCE | | | | | | TORQUE | | | | | |
|---|---|---|---|---|---|---|---|---|---|---|---|---|
| | +Fx | -Fx | +Fy | -Fy | +Fz | -Fz | +Mx | -Mx | +My | -My | +Mz | -Mz |
| . . . | . . . . | . . . . | . . . . | . . . . | . . . . | . . . . | . . . . | . . . . | . . . . | . . . . | . . . . | . . . . |
| 1563 | 0 | 0 | 0 | 0 | 1 | 0 | 1 | 0 | 1 | 1 | 0 | 0 |
| 1564 | 0 | 0 | 0 | 0 | 1 | 0 | 1 | 0 | 1 | 1 | 0 | 0 |
| 1565 | 0 | 0 | 0 | 0 | 1 | 0 | 1 | 0 | 1 | 1 | 0 | 0 |
| . . . | . . . . | . . . . | . . . . | . . . . | . . . . | . . . . | . . . . | . . . . | . . . . | . . . . | . . . . | . . . . |

Fig. 15B

| TIME (ms) | FORCE | | | | | | TORQUE | | | | | |
|---|---|---|---|---|---|---|---|---|---|---|---|---|
| | +Fx | -Fx | +Fy | -Fy | +Fz | -Fz | +Mx | -Mx | +My | -My | +Mz | -Mz |
| . . . | . . . | . . . | . . . | . . . | . . . | . . . | . . . | . . . | . . . | . . . | . . . | . . . |
| 1112 | 1 | 1 | 0 | 0 | 1 | 0 | 1 | 1 | 1 | 1 | 1 | 1 |
| 1113 | 1 | 1 | 0 | 0 | 1 | 0 | 1 | 1 | 1 | 1 | 1 | 1 |
| 1114 | 1 | 1 | 0 | 0 | 1 | 0 | 1 | 1 | 1 | 1 | 1 | 1 |
| . . . | . . . | . . . | . . . | . . . | . . . | . . . | . . . | . . . | . . . | . . . | . . . | . . . |

Fig. 15C

| TIME (ms) | FORCE | | | | | | TORQUE | | | | | |
|---|---|---|---|---|---|---|---|---|---|---|---|---|
| | +Fx | -Fx | +Fy | -Fy | +Fz | -Fz | +Mx | -Mx | +My | -My | +Mz | -Mz |
| . . . | . . . | . . . | . . . | . . . | . . . | . . . | . . . | . . . | . . . | . . . | . . . | . . . |
| 321 | 1 | 1 | 1 | 1 | 1 | 0 | 1 | 1 | 1 | 1 | 1 | 1 |
| 322 | 1 | 1 | 1 | 1 | 1 | 0 | 1 | 1 | 1 | 1 | 1 | 1 |
| 323 | 1 | 1 | 1 | 1 | 1 | 0 | 1 | 1 | 1 | 1 | 1 | 1 |
| . . . | . . . | . . . | . . . | . . . | . . . | . . . | . . . | . . . | . . . | . . . | . . . | . . . |

Fig.15D

| TIME (ms) | FORCE | | | | | | TORQUE | | | | | |
|---|---|---|---|---|---|---|---|---|---|---|---|---|
| | +Fx | -Fx | +Fy | -Fy | +Fz | -Fz | +Mx | -Mx | +My | -My | +Mz | -Mz |
| .... | .... | .... | .... | .... | .... | .... | .... | .... | .... | .... | .... | .... |
| 2778 | 0 | 0 | 0 | 0 | 1 | 0 | 1 | 0 | 1 | 1 | 0 | 0 |
| 2779 | 0 | 0 | 0 | 0 | 1 | 0 | 1 | 0 | 1 | 1 | 0 | 0 |
| 2780 | 0 | 0 | 0 | 0 | 1 | 0 | 1 | 0 | 1 | 1 | 0 | 0 |
| .... | .... | .... | .... | .... | .... | .... | .... | .... | .... | .... | .... | .... |

Fig. 15E

| TIME (ms) | FORCE | | | | | | TORQUE | | | | | |
|---|---|---|---|---|---|---|---|---|---|---|---|---|
| | +Fx | -Fx | +Fy | -Fy | +Fz | -Fz | +Mx | -Mx | +My | -My | +Mz | -Mz |
| ..... | ..... | ..... | ..... | ..... | ..... | ..... | ..... | ..... | ..... | ..... | ..... | ..... |
| 4454 | 1 | 1 | 1 | 1 | 1 | 0 | 1 | 1 | 1 | 1 | 1 | 1 |
| 4455 | 1 | 1 | 1 | 1 | 1 | 0 | 1 | 1 | 1 | 1 | 1 | 1 |
| 4456 | 1 | 1 | 1 | 1 | 1 | 0 | 1 | 1 | 1 | 1 | 1 | 1 |
| ..... | ..... | ..... | ..... | ..... | ..... | ..... | ..... | ..... | ..... | ..... | ..... | ..... |

Fig. 17A

| TIME (ms) | FORCE | | | | | | TORQUE | | | | | |
|---|---|---|---|---|---|---|---|---|---|---|---|---|
| | +x | -x | +y | -y | +z | -z | +rx | -rx | +ry | -ry | +rz | -rz |
| ..... | ..... | ..... | ..... | ..... | ..... | ..... | ..... | ..... | ..... | ..... | ..... | ..... |
| 1563 | 0 | 0 | 0 | 0 | 1 | 0 | 1 | 0 | 1 | 1 | 0 | 0 |
| 1564 | 0 | 0 | 0 | 0 | 1 | 0 | 1 | 0 | 1 | 1 | 0 | 0 |
| 1565 | 0 | 0 | 0 | 0 | 1 | 0 | 1 | 0 | 1 | 1 | 0 | 0 |
| ..... | ..... | ..... | ..... | ..... | ..... | ..... | ..... | ..... | ..... | ..... | ..... | ..... |

Fig. 17B

| TIME (ms) | FORCE | | | | | | TORQUE | | | | | |
|---|---|---|---|---|---|---|---|---|---|---|---|---|
| | +x | -x | +y | -y | +z | -z | +rx | -rx | +ry | -ry | +rz | -rz |
| .. .. | .. .. | .. .. | .. .. | .. .. | .. .. | .. .. | .. .. | .. .. | .. .. | .. .. | .. .. | .. .. |
| 1112 | 1 | 1 | 0 | 0 | 1 | 0 | 1 | 1 | 1 | 1 | 1 | 1 |
| 1113 | 1 | 1 | 0 | 0 | 1 | 0 | 1 | 1 | 1 | 1 | 1 | 1 |
| 1114 | 1 | 1 | 0 | 0 | 1 | 0 | 1 | 1 | 1 | 1 | 1 | 1 |
| .. .. | .. .. | .. .. | .. .. | .. .. | .. .. | .. .. | .. .. | .. .. | .. .. | .. .. | .. .. | .. .. |

Fig. 17C

| TIME (ms) | FORCE | | | | | | TORQUE | | | | | |
|---|---|---|---|---|---|---|---|---|---|---|---|---|
| | +x | -x | +y | -y | +z | -z | +rx | -rx | +ry | -ry | +rz | -rz |
| .... | .... | .... | .... | .... | .... | .... | .... | .... | .... | .... | .... | .... |
| 321 | 1 | 1 | 1 | 1 | 1 | 0 | 1 | 1 | 1 | 1 | 1 | 1 |
| 322 | 1 | 1 | 1 | 1 | 1 | 0 | 1 | 1 | 1 | 1 | 1 | 1 |
| 323 | 1 | 1 | 1 | 1 | 1 | 0 | 1 | 1 | 1 | 1 | 1 | 1 |
| .... | .... | .... | .... | .... | .... | .... | .... | .... | .... | .... | .... | .... |

Fig. 17D

| TIME (ms) | FORCE | | | | | | TORQUE | | | | | |
|---|---|---|---|---|---|---|---|---|---|---|---|---|
| | +x | -x | +y | -y | +z | -z | +rx | -rx | +ry | -ry | +rz | -rz |
| .... | .... | .... | .... | .... | .... | .... | .... | .... | .... | .... | .... | .... |
| 2778 | 0 | 0 | 0 | 0 | 1 | 0 | 1 | 0 | 1 | 1 | 0 | 0 |
| 2779 | 0 | 0 | 0 | 0 | 1 | 0 | 1 | 0 | 1 | 1 | 0 | 0 |
| 2780 | 0 | 0 | 0 | 0 | 1 | 0 | 1 | 0 | 1 | 1 | 0 | 0 |
| .... | .... | .... | .... | .... | .... | .... | .... | .... | .... | .... | .... | .... |

Fig.17E

| TIME (ms) | FORCE | | | | | | TORQUE | | | | | |
|---|---|---|---|---|---|---|---|---|---|---|---|---|
| | +x | -x | +y | -y | +z | -z | +rx | -rx | +ry | -ry | +rz | -rz |
| ..... | ..... | ..... | ..... | ..... | ..... | ..... | ..... | ..... | ..... | ..... | ..... | ..... |
| 4454 | 1 | 1 | 1 | 1 | 1 | 0 | 1 | 1 | 1 | 1 | 1 | 1 |
| 4455 | 1 | 1 | 1 | 1 | 1 | 0 | 1 | 1 | 1 | 1 | 1 | 1 |
| 4456 | 1 | 1 | 1 | 1 | 1 | 0 | 1 | 1 | 1 | 1 | 1 | 1 |
| ..... | ..... | ..... | ..... | ..... | ..... | ..... | ..... | ..... | ..... | ..... | ..... | ..... |

*Fig.25*

| TIME (ms) | POSITION (x, y) | | | | | | |
|---|---|---|---|---|---|---|---|
| | ...... | (0, -2) | (0, -1) | (0, 0) | (0, 1) | (0, 2) | ...... |
| ⋮ | ⋮ | ⋮ | ⋮ | ⋮ | ⋮ | ⋮ | ⋮ |
| 2443 | ⋮ | 0 | 0 | 0 | 0 | 0 | ⋮ |
| 2444 | ⋮ | 0 | 0 | 0 | 1 | 0 | ⋮ |
| 2445 | ⋮ | 0 | 0 | 1 | 1 | 1 | ⋮ |
| 2446 | ⋮ | 0 | 0 | 0 | 0 | 1 | ⋮ |
| 2447 | ⋮ | 0 | 0 | 0 | 0 | 0 | ⋮ |
| ⋮ | ⋮ | ⋮ | ⋮ | ⋮ | ⋮ | ⋮ | ⋮ |

| TIME (ms) | POSITION (x, y) | | | | | | |
|---|---|---|---|---|---|---|---|
| | ...... | (0, -2) | (0, -1) | (0, 0) | (0, 1) | (0, 2) | ...... |
| ⋮ | ⋮ | ⋮ | ⋮ | ⋮ | ⋮ | ⋮ | ⋮ |
| 2443 | ⋮ | 0 | 0 | 0 | 0 | 0 | ⋮ |
| 2444 | ⋮ | 0 | 0 | 0 | 1 | 0 | ⋮ |
| 2445 | ⋮ | 0 | 0 | 0 | 0 | 0 | ⋮ |
| 2446 | ⋮ | 0 | 0 | 0 | 0 | 0 | ⋮ |
| 2447 | ⋮ | 0 | 0 | 0 | 0 | 0 | ⋮ |
| ⋮ | ⋮ | ⋮ | ⋮ | ⋮ | ⋮ | ⋮ | ⋮ |

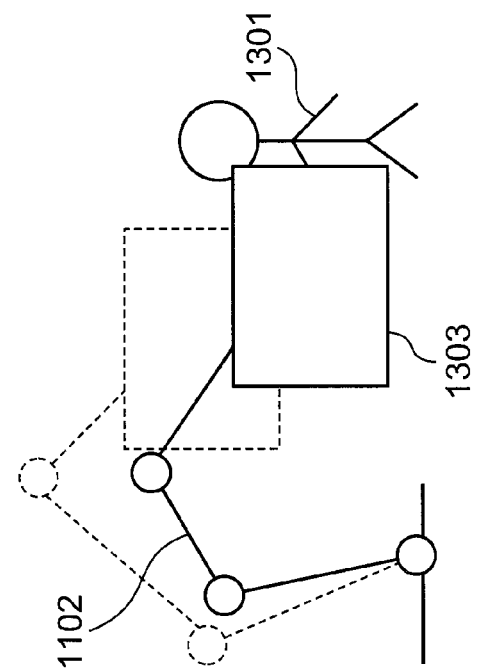
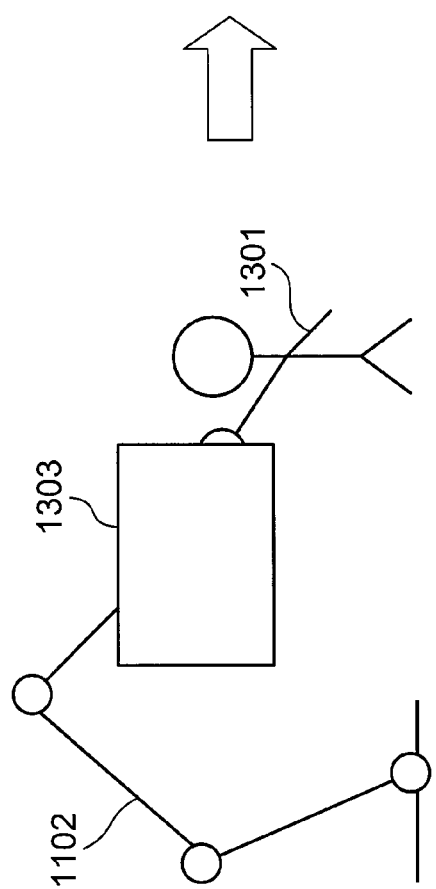
Fig.30

ARM CONTROL APPARATUS, ARM CONTROL METHOD, ARM CONTROL PROGRAM, ROBOT, AND INTEGRATED ELECTRONIC CIRCUIT FOR ARM CONTROL

CROSS-REFERENCE TO RELATED APPLICATIONS

This is a continuation application of International Application No. PCT/JP2013/006802, with an international filing date of Nov. 20, 2013, which claims priority of Japanese Patent Application No.: 2012-256525 filed on Nov. 22, 2012, the content of which is incorporated herein by reference.

TECHNICAL FIELD

The technical field relates to an arm control apparatus and a control method, a robot having the arm control apparatus, an arm control program, and an integrated electronic circuit for arm control, for controlling stiffness of an arm with a touch panel display and generating motions thereof.

BACKGROUND ART

The following technique is proposed as a technique with which a person moves a display device to a desired position. The display device has a detector for detecting contact of a person with a bezel portion. When the detector detects that the person makes contact with the bezel portion in order to move a display portion, a link portion is made turnable, and the display portion can be moved to a desired position. Further, when a situation that the contact between the person and the bezel portion is broken in order to hold a position of the display portion is detected, the link portion is made unturnable, and the position of the display portion is held (see Patent Literature 1).

CITATION LIST

Patent Literature

Patent Literature 1: Japanese Unexamined Patent Publication No. 2010-128195

SUMMARY OF INVENTION

Technical Problem

However, in Patent Literature 1, when the user moves the display portion, the user should always make contact with the bezel portion. For this reason, in moving the display device to a position that is easily viewable for the user, the user cannot hold a portion other than the bezel portion, such as the display portion, to draw the display device towards the user. Further, when the display portion is a touch panel display, since the user touches the touch panel display, the display portion should be moved more suitably.

One non-limiting and exemplary embodiment provides an arm control apparatus and an arm control method, a robot, an arm control program, and an integrated electronic circuit for an arm control, with each of which a person can move a touch panel display with light force in an arm with a touch panel display and the user can touch the touch panel display without moving the touch panel display to a touch direction.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: An arm control apparatus for controlling a position and an orientation of a touch panel display, the apparatus comprising:

a display information acquiring unit that acquires information displayed on a screen of the touch panel display;

a touch pattern estimating unit that estimates a region on the screen that is likely to be touched by a person and a motion direction of the touch based on the information acquired from the display information acquiring unit;

a stiffness parameter information generating unit that generates information for controlling the arm based on the region and the motion direction estimated by the touch pattern estimating unit so that the position and the orientation of the touch panel display do not change along a touch direction at a touch panel input time; and an arm control unit that controls a stiffness parameter of the arm based on the information generated by the stiffness parameter information generating unit.

These general and specific aspects may be implemented using a system, a method, and a computer program, and any combination of systems, methods, and computer programs.

According to the one aspect of the present disclosure, when the person touches the touch panel display, the arm with the touch panel display can be controlled according to contents displayed on the screen of the touch panel display.

BRIEF DESCRIPTION OF DRAWINGS

These and other aspects and features of the present disclosure will become clear from the following description taken in conjunction with the embodiments thereof with reference to the accompanying drawings, in which:

FIG. 2 is an explanatory view illustrating data about motion information in the robot according to the first embodiment;

FIG. 5A is an explanatory view illustrating data of a display information database in the robot according to the first embodiment;

FIG. 5B is an explanatory view illustrating data of the display information database in the robot according to the first embodiment;

FIG. 6C is an explanatory view illustrating information data about the estimation of the contact pattern (touch) in the robot according to the first embodiment;

FIG. 7E is an explanatory view illustrating information data about the estimation of the contact pattern (page turning) in the robot according to the first embodiment;

FIG. 8A is an explanatory view illustrating estimation of a contact pattern (enlargement or reduction) in the robot according to the first embodiment;

FIG. 8B is an explanatory view illustrating estimation of a contact pattern (enlargement or reduction) in the robot according to the first embodiment;

FIG. 9C is an explanatory view illustrating information data about the estimation of the contact pattern (keyboard input) in the robot according to the first embodiment;

FIG. 10C is an explanatory view illustrating information data about the estimation of the contact pattern (in the case where a plurality of manipulations may be performed) in the robot according to the first embodiment;

FIG. 11A is an explanatory view illustrating contents of a hospital in the robot according to the first embodiment;

FIG. 11B is an explanatory view illustrating the contents of the hospital in the robot according to the first embodiment;

FIG. 12 is an explanatory view illustrating data about position information in a contactable range estimated by a touch pattern estimating unit in the robot according to the first embodiment;

FIG. 15A is an explanatory view illustrating data of information about a force and a torque (touch) derived by a load estimating unit in the robot according to the first embodiment;

FIG. 15B is an explanatory view illustrating data of information about a force and a torque (page turning) derived by the load estimating unit in the robot according to the first embodiment;

FIG. 15C is an explanatory view illustrating data of information about a force and a torque (enlargement or reduction) derived by the load estimating unit in the robot according to the first embodiment;

FIG. 15D is an explanatory view illustrating data of information about a force and a torque (keyboard input) derived by the load estimating unit in the robot according to the first embodiment;

FIG. 15E is an explanatory view illustrating data of information about a force and a torque (in the case where a plurality of manipulations may be performed) derived by the load estimating unit in the robot according to the first embodiment;

FIG. 17A is an explanatory view illustrating data of stiffness parameter information (touch) generated by a stiffness parameter information generating unit in the robot according to the first embodiment;

FIG. 17B is an explanatory view illustrating data of stiffness parameter information (page turning) generated by the stiffness parameter information generating unit in the robot according to the first embodiment;

FIG. 17C is an explanatory view illustrating data of stiffness parameter information (enlargement or reduction) generated by the stiffness parameter information generating unit in the robot according to the first embodiment;

FIG. 17D is an explanatory view illustrating data of stiffness parameter information (keyboard input) generated by the stiffness parameter information generating unit in the robot according to the first embodiment;

FIG. 17E is an explanatory view illustrating data of stiffness parameter information (in the case where a plurality of manipulations may be performed) generated by the stiffness parameter information generating unit in the robot according to the first embodiment;

FIG. 25 is an explanatory view illustrating data of contact position information in the robot according to the second embodiment;

FIG. 30 is an explanatory view illustrating the touch panel display of the conventional arm with the display;

DETAILED DESCRIPTION

In this description, "touch" means that a person (user) 1301 or 301 touches a display 1303 or 303 with a finger 701 or a stylus pen. That is to say, "touch" means a motion until the finger 701 or the stylus pen makes contact with the display 1303 or 303, and does not include a motion for releasing the finger 701 or the stylus pen from the display 1303 or 303 after the contact.

Further, in this description, "person leaves" means that the person (user) 1301 or 301 removes the finger 701 or the stylus pen from the display 1303 or 303, and does not means that the person (user) 1301 or 301 actually leaves the display 1303 or 303.

Further, in this description, "multi-touch" means a state that a plurality of fingers 701 simultaneously make contact with the panel display 1303 or 303. That is to say, "multi-touch" means a plurality of touches on a plurality of positions on the touch panel display 1303 or 303, and thus a plurality of touches in a temporally overlapping manner. Therefore, "multi-touch" includes not only the plurality of touches started simultaneously but also a plurality of touches started at different times and detected simultaneously at a certain time point. Concretely, when a second touch is started while a first touch continues after a first touch is started, the first touch and the second touch correspond to the multi-touch at a starting time of the second touch.

Embodiments of the present disclosure are described in detail below with reference to the drawings.

Before the detailed description of the embodiments of the present disclosure with reference to the drawings, a knowledge that is the basis of the present disclosure is described, and then various aspects of the present disclosure are described.

(Knowledge that is the Basis of the Present Disclosure)

Figure 29A:
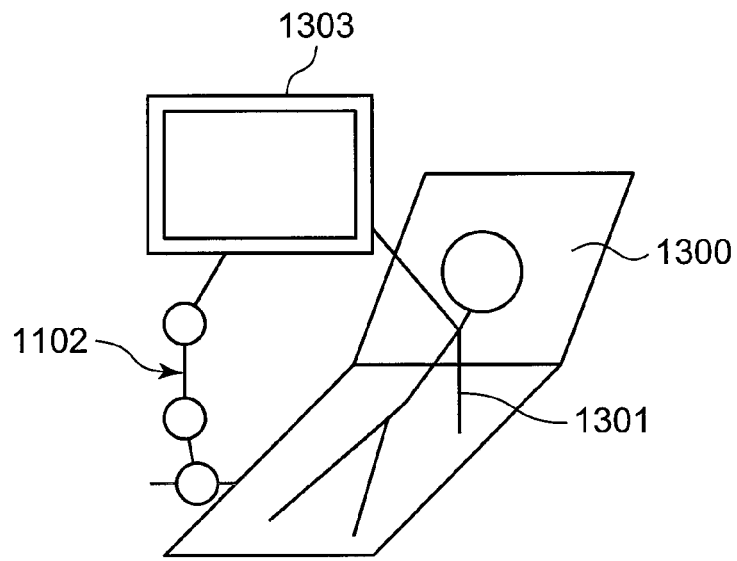
FIG. 29A is an explanatory view illustrating a touch panel display of a conventional arm with a display.
Figure 29B:
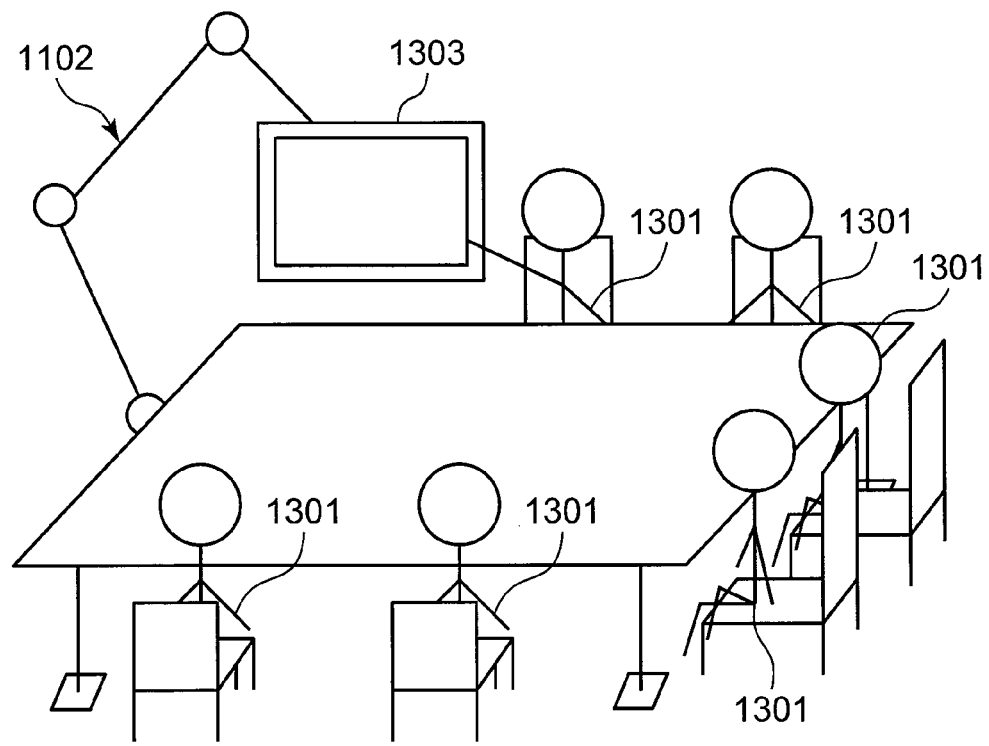
FIG. 29B is an explanatory view illustrating the touch panel display of the conventional arm with the display.

An example of a technique for moving a display to a position easily viewable for the person (user) 1301 includes a technique for gripping a part of the display 1303 attached to an arm 1102 and moving the display 1303 to a position desired by the user 1301 as shown in FIG. 30. A scene that the display 1303 attached to an arm 102 is freely moved is, as shown in FIGS. 29A and 29B, a case where while lying on a bed 1300, the user 1301 views the display 1303 or contents displayed on the display 1303 are shared by an attendance 1301 during a meeting.

In the above usage scene, stiffness of the arm 1102 is helpful to be controlled so that the display 1303 can be moved by a light force when it is moved, and the display 1303 is fixed firmly while the display 1303 is not being moved. As a result, the display 1303 can be moved by a light force, and the display 1303 can be disposed on an easily viewable position for the user 1301.

Figure 31:
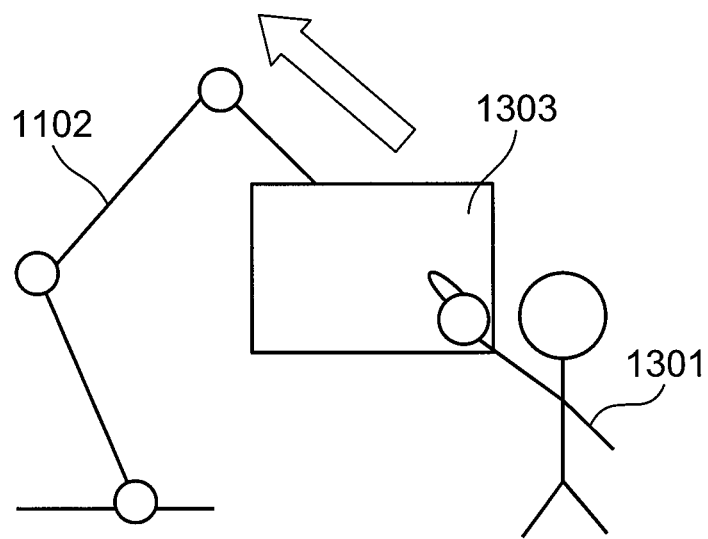
FIG. 31 is an explanatory view illustrating a problem of the touch panel display of the conventional arm with the display.

However, when the display 1303 is a touch panel display and the display 1303 is set so as to be capable of being moved by a light force, touch on the display 1303 by the user 1301 moves the display 1303 to a direction where the user 1301 touches the display 1303 as shown in FIG. 31.

Therefore, the stiffness of the arm 1102 is demanded to be controlled so that the touch panel display 1303 can be moved by a light force, and the display 1303 remains to be fixed at a time of touching the display 1303.

Examples of the disclosed technique are as follows.

1st aspect: An arm control apparatus for controlling a position and an orientation of a touch panel display, the apparatus comprising:

a display information acquiring unit that acquires information displayed on a screen of the touch panel display;

a touch pattern estimating unit that estimates a region on the screen that is likely to be touched by a person and a motion direction of the touch based on the information acquired from the display information acquiring unit;

a stiffness parameter information generating unit that generates information for controlling the arm based on the region and the motion direction estimated by the touch pattern estimating unit so that the position and the orientation of the touch panel display do not change along a touch direction at a touch panel input time; and an arm control unit that controls a stiffness parameter of the arm based on the information generated by the stiffness parameter information generating unit.

As a result, when the user (person) touches the touch panel display with a finger etc., the arm with the touch panel display can be controlled according to contents displayed on the display. Further, the user can freely move the touch panel display while holding the touch panel display with a hand. When the user touches the touch panel display, the user can securely perform touch input because the display is fixed. Further, since the stiffness parameter information generating unit generates the stiffness parameter information based on information about likelihood of the touch estimated by the touch pattern estimating unit, maneuverability of the touch panel display can be improved by a simple method.

2nd aspect: The arm control apparatus according to the 1st aspect, further comprising:

a load estimating unit that estimates a load or a torque with respect to the touch panel display based on the region and the motion direction estimated by the touch pattern estimating unit, wherein the stiffness parameter information generating unit generates the information for controlling the arm so that the position and the orientation of the touch panel display do not change along the touch direction at the touch panel input time based on the load or the torque estimated by the load estimating unit.

As a result, when the user (person) touches the touch panel display with a finger etc., the arm with the touch panel display can be controlled according to contents displayed on the display. Further, the user can freely move the touch panel display while holding the touch panel display with a hand. When the user touches the touch panel display, the user can securely perform touch input because the display is fixed.

3rd aspect: The arm control apparatus according to the 2nd aspect, wherein the touch pattern estimating unit estimates position information that changes while the person is touching and tracing the screen, the load estimating unit estimates information about at least one or more of:

a force relating to a pushing force to be applied vertically to a surface of the screen and a frictional force to be applied horizontally to the surface of the screen based on the position information estimated by the touch pattern estimating unit;

a torque whose axis is horizontal to the surface of the screen based on force information about the pushing force to be applied vertically to the surface of the screen and the position information; and a torque whose axis is vertical to the surface of the screen based on the force information about the frictional force to be applied horizontally to the surface of the screen and the position information.

As a result, when the person performs a manipulation for tracing the screen of the touch panel display, namely, applying a frictional force, the adjustment of the stiffness enables the person to touch the touch panel display without moving the touch panel display to the tracing direction.

4th aspect: The arm control apparatus according to the 3rd aspect, wherein the touch pattern estimating unit estimates position information that changes such that:

(1) the person touches the screen;

(2) a position on the screen which is touched by the person while being traced changes to any direction; and (3) the person separates from the screen, the load estimating unit estimates force information that changes such that:

(1) a force for vertically pushing the surface of the screen and the torque whose axis is horizontal to the surface of the screen are applied;

(2) the force for vertically pushing the surface of the screen, the frictional force to be horizontally applied to the surface of the screen, the torque whose axis is horizontal to the surface of the screen, and the torque whose axis is vertical to the surface of the screen are applied; and (3) no force is applied to the screen.

As a result, when the person performs a page turning, the adjustment of the stiffness enables the person to touch the touch panel display without moving the touch panel display to the tracing direction.

5th aspect: The arm control apparatus according to the 3rd aspect, wherein the touch pattern estimating unit estimates position information that changes such that:

(1) the person multi-touches the screen;

(2) positions on the screen multi-touched by the person change to a mutually separating direction; and (3) the person separates from the screen, the load estimating unit estimates force information that changes such that:

(1) a force for vertically pushing the surface of the screen and the torque whose axis is horizontal to the surface of the screen are applied;

(2) the force for vertically pushing the surface of the screen, the frictional force to be horizontally applied to the surface of the screen, the torque whose axis is horizontal to the surface of the screen, and the torque whose axis is vertical to the surface of the screen are applied; and (3) no force is applied to the screen.

As a result, when the person performs an enlarging manipulation, the adjustment of the stiffness enables the person to touch the touch panel display without moving the touch panel display to the tracing direction.

6th aspect: The arm control apparatus according to the 3rd aspect, wherein the touch pattern estimating unit estimates position information that changes such that:

(1) the person multi-touches the screen;

(2) positions on the screen multi-touched by the person change to mutually approaching directions; and (3) the person separates from the screen, the load estimating unit estimates the force information that changes such that:

(1) a force for vertically pushing the surface of the screen and the torque whose axis is horizontal to the surface of the screen are applied;

(2) the force for vertically pushing the surface of the screen, the frictional force to be horizontally applied to the surface of the screen, the torque whose axis is horizontal to the surface of the screen, and the torque whose axis is vertical to the surface of the screen are applied; and (3) no force is applied to the screen.

As a result, when the person performs a reducing manipulation, the adjustment of the stiffness enables the person to touch the touch panel display without moving the touch panel display to the tracing direction.

7th aspect: The arm control apparatus according to the 2nd aspect, wherein the touch pattern estimating unit estimates position information at a time when the person repeatedly touches the screen of the display more than once, the load estimating unit estimates at least one or more pieces of information about:

a pushing force to be vertically applied to a surface of the screen and a force at a time when no force is applied to the screen based on the position information estimated by the touch pattern estimating unit; and a torque whose axis is horizontal to the surface of the screen based on the force information about the pushing force to be vertically applied to the surface of the screen and the position information.

As a result, when the person continuously touches the screen, the adjustment of the stiffness enables the person to touch the touch panel display without moving the touch panel display to the touching direction.

8th aspect: The arm control apparatus according to the 7th aspect, wherein the touch pattern estimating unit estimates the position information that repeatedly changes more than once so that:

(1) the person touches the screen; and (2) the person separates from the screen, the load estimating unit estimates force information that changes such that:

(1) a force for vertically pushing the surface of the screen and the torque whose axis is horizontal to the surface of the screen are applied; and (2) no force is applied to the screen.

As a result, when the person performs a keyboard input manipulation, the adjustment of the stiffness enables the person to touch the touch panel display without moving the touch panel display to the touching direction.

9th aspect: The arm control apparatus according to the 1st or 2nd aspect, wherein the touch pattern estimating unit estimates all pieces of position information about positions likely to be touched when a plurality of candidates are present as manipulations that are likely to be performed by the person on the screen of the display.

As a result, the touch panel display can be touched for the contents on which a plurality of touching manipulations can be performed without moving the touch panel display to the touching direction.

10th aspect: The arm control apparatus according to the 1st or 2nd aspect, further comprising:

an initial contact position information acquiring unit that acquires a position on the screen to be initially touched by the person in an untouched state, wherein the touch pattern estimating unit estimates position information of a position that is likely to be touched by the person based on the initial contact position acquired from the initial contact position information acquiring unit.

As a result, when a position which is touched first by the person is detected and the stiffness is adjusted, the touch panel display can be touched without moving the touch panel display to the touching direction.

11th aspect: A robot comprising:

the arm control apparatus according to any one of the 1st to 10th aspects for controlling the arm; and the arm.

As a result, when the user (person) touches the touch panel display with a finger etc., the arm with the touch panel display can be controlled according to contents displayed on the display. Further, the user can freely move the touch panel display while holding the touch panel display with a hand. When the user touches the touch panel display, the user can securely perform touch input because the display is fixed. Further, since the stiffness parameter information generating unit generates the stiffness parameter information based on information about likelihood of the touch estimated by the touch pattern estimating unit, maneuverability of the touch panel display can be improved by a simple method.

12nd aspect: An arm control method for controlling a position and an orientation of a touch panel display, the method comprising:

acquiring information to be displayed on a screen of the touch panel display through a display information acquiring unit;

estimating a region on the screen likely to be touched by a person and a motion direction of the touch through a touch pattern estimating unit based on the information acquired by the display information acquiring unit;

generating information for controlling the arm through a stiffness parameter information generating unit so that the position and the orientation of the touch panel display do not change along a touching direction at a touch panel input time based on the region and the motion direction estimated by the touch pattern estimating unit; and controlling a stiffness parameter of the arm through an arm control unit based on the information generated by the stiffness parameter information generating unit.

As a result, when the user (person) touches the touch panel display with a finger etc., the arm with the touch panel display can be controlled according to contents displayed on the display. Further, the user can freely move the touch panel display while holding the touch panel display with a hand. When the user touches the touch panel display, the user can securely perform touch input because the display is fixed. Further, since the stiffness parameter information generating unit generates the stiffness parameter information based on information about likelihood of the touch estimated by the touch pattern estimating unit, maneuverability of the touch panel display can be improved by a simple method.

13rd aspect: An arm control program for controlling a position and an orientation of a touch panel display, the program making a computer to execute:

a step of acquiring information to be displayed on a screen of the touch panel display through a display information acquiring unit;

a step of estimating a region on the screen likely to be touched by a person and a motion direction of the touch through a touch pattern estimating unit based on the information acquired by the display information acquiring unit;

a step of generating information for controlling the arm so that the position and the orientation of the touch panel display do not change along a touching direction at a touch panel input time through a stiffness parameter information generating unit based on the region and the motion direction estimated by the touch pattern estimating unit; and a step of controlling a stiffness parameter of the arm through an arm control unit based on the information generated by the stiffness parameter information generating unit.

As a result, when the user (person) touches the touch panel display with a finger etc., the arm with the touch panel display can be controlled according to contents displayed on the display. Further, the user can freely move the touch panel display while holding the touch panel display with a hand. When the user touches the touch panel display, the user can securely perform touch input because the display is fixed. Further, since the stiffness parameter information generating unit generates the stiffness parameter information based on information about likelihood of the touch estimated by the touch pattern estimating unit, maneuverability of the touch panel display can be improved by a simple method.

14th aspect: An integrated electronic circuit for arm control, that controls a position and an orientation of a touch panel display, the circuit comprising:

acquiring information to be displayed on a screen of the touch panel display through a display information acquiring unit;

estimating a region on the screen likely to be touched by a person and a motion direction of the touch through a touch pattern estimating unit based on the information acquired by the display information acquiring unit;

generating information for controlling the arm through a stiffness parameter information generating unit so that the position and the orientation of the touch panel display do not change along a touching direction at a touch panel input time based on the region and the motion direction estimated by the touch pattern estimating unit; and controlling a stiffness parameter of the arm through an arm control unit based on the information generated by the stiffness parameter information generating unit.

As a result, when the user (person) touches the touch panel display with a finger etc., the arm with the touch panel display can be controlled according to contents displayed on the display. Further, the user can freely move the touch panel display while holding the touch panel display with a hand. When the user touches the touch panel display, the user can securely perform touch input because the display is fixed. Further, since the stiffness parameter information generating unit generates the stiffness parameter information based on information about likelihood of the touch estimated by the touch pattern estimating unit, maneuverability of the touch panel display can be improved by a simple method.

(First Embodiment)

Figure 1:
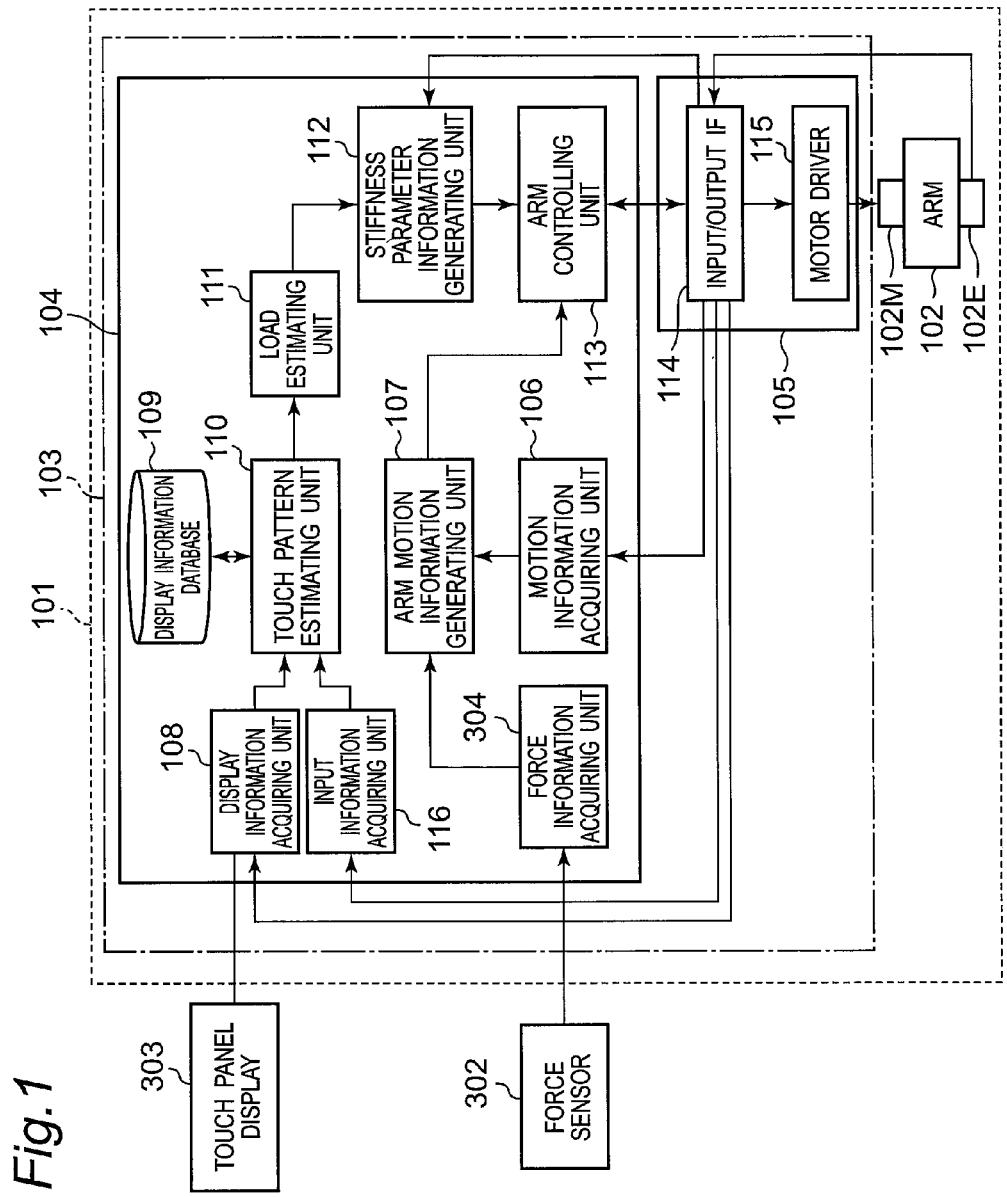
FIG. 1 is a block diagram illustrating an arm in a robot according to a first embodiment.

FIG. 1 is a block diagram illustrating a robot 101 having an arm control apparatus 103 according to a first embodiment of the present disclosure. In FIG. 1, the robot 101 is composed of an arm 102, and a control apparatus 103 of the arm 102.

The control apparatus 103 of the arm 102 is a control apparatus of the arm 102 for controlling a position and an orientation of a touch panel display 303 as one example of the display device. The control apparatus 103 of the arm 102 includes at least a display information acquiring unit 108, a touch pattern estimating unit 110, a load estimating unit 111, the stiffness parameter information generating unit 112, and an arm control unit 113.

A main constitution of the control apparatus 103 of the arm 102 is simply described below.

The display information acquiring unit 108 acquires information displayed on a display portion (screen) 303a of the touch panel display 303.

The touch pattern estimating unit 110 estimates a region on the screen 303a likely to be touched by the person 301 and a motion direction of the touch based on the information acquired by the display information acquiring unit 108.

The load estimating unit 111 estimates a load or a torque to be applied to the touch panel display 303 based on the region and the motion direction estimated by the touch pattern estimating unit 110.

The stiffness parameter information generating unit 112 generates information for controlling the arm 102 based on the load or the torque estimated by the load estimating unit ill so that the position and the orientation of the touch panel display 303 do not change along a touching direction at touch panel input time.

The arm control unit 113 controls a stiffness parameter of the arm 102 based on the information generated by the stiffness parameter information generating unit 112.

As a result, in order to prevent the touch panel display 303 from moving to the touching direction when the person 301 touches the touch panel display 303, the arm 102 is controlled so that the position of the touch panel display 303 is fixed at the touching time. Particularly in the first embodiment, the region to be touched and the force (or the torque) are estimated based on the display contents on the touch panel display 303, and the arm 102 is controlled to a direction where the force (or the torque) is canceled at touched time.

The first embodiment is described in detail below.

<Description About the Arm Control Apparatus>

The control apparatus 103 of the arm 102 is composed of a control apparatus main body 104 and a peripheral device 105.

<Description About Control Apparatus Main Body>

The control apparatus main body 104 is composed of a motion information acquiring unit 106, an arm motion information generating unit 107, the display information acquiring unit 108, a display information database 109, a touch pattern estimating unit 110, a load estimating unit 111, a stiffness parameter information generating unit 112, an arm control unit 113, and an input information acquiring unit 116.

The peripheral device 105 is composed of an input/output IF (interface) 114 and a motor driver 115. Respective functions are described below.

The position information and orientation information about the arm 102 from the input/output IF 114, and time information from a timer built in the input/output IF 114 are input into the motion information acquiring unit 106. Further, the motion information acquiring unit 106 differentiates the position information acquired from the input/output IF 114 by the time information so as to acquire velocity information. Further, the motion information acquiring unit 106 differentiates the orientation information by the time information so as to acquire angular velocity information. FIG. 2 illustrates the time information, the position information, the orientation information, the velocity information, and the angular velocity information acquired by the motion information acquiring unit 106.

The motion information is information for generating motions of the arm 102 at a time of moving the arm 102, and is independent from a stiffness parameter, described later.

The motion information acquiring unit 106 outputs the acquired position information, orientation information, velocity information, angular velocity information about the arm 102, and time information to the arm motion information generating unit 107.

Figure 3A:
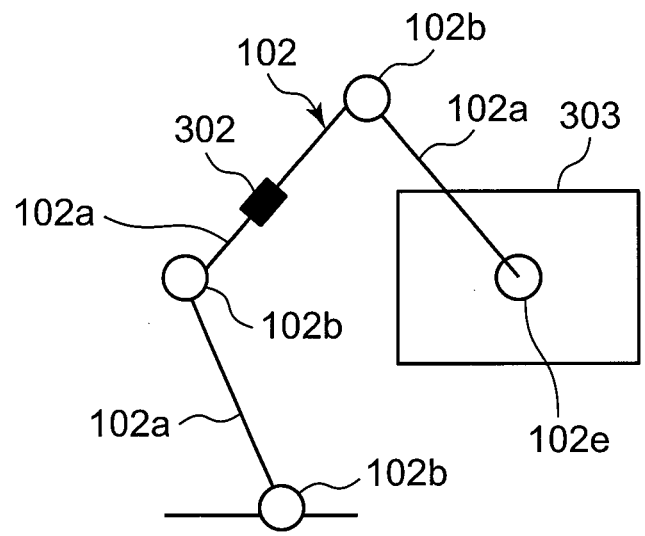
FIG. 3A is an explanatory view illustrating an arm movement in the robot according to the first embodiment.
Figure 3B:
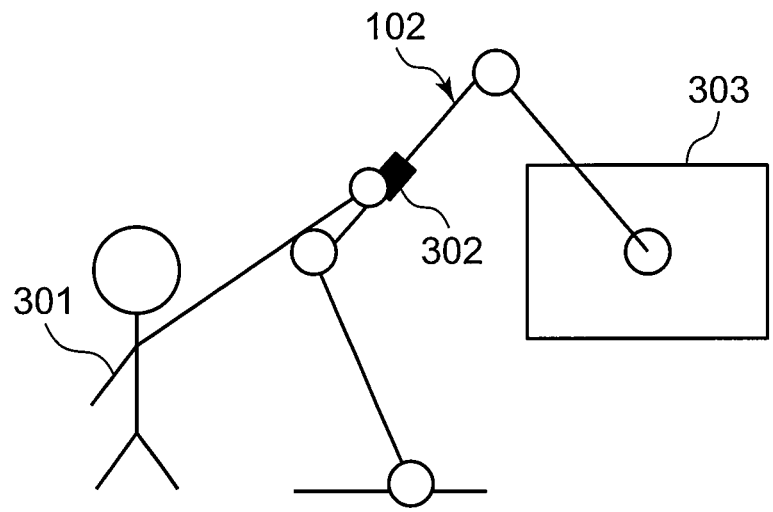
FIG. 3B is an explanatory view illustrating an arm movement in the robot according to the first embodiment.
Figure 3C:
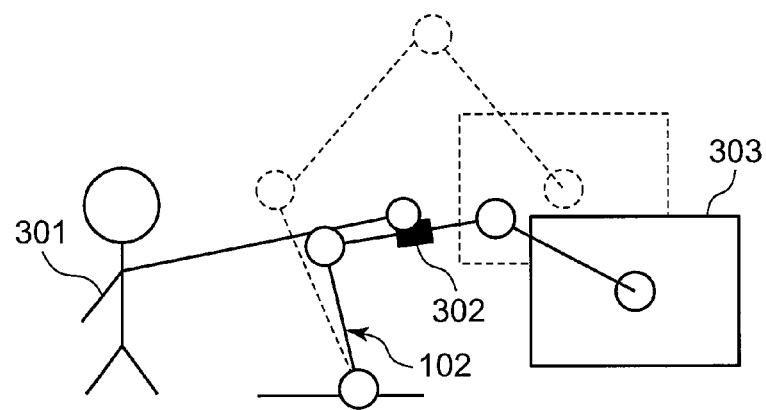
FIG. 3C is an explanatory view illustrating an arm movement in the robot according to the first embodiment.

The arm motion information generating unit 107 acquires the position information, the orientation information, the velocity information, the angular velocity information about the arm 102, and the time information from the motion information acquiring unit 106. The arm motion information generating unit 107 generates motion information for moving the arm 102 based on the acquired information. The motion information is generated when the person 301 directly touches the arm 102 and moves the arm 102. In order that the person 301 moves the arm 102 (see FIG. 3B), the stiffness of the arm 102 is helpful to be set low. For example, a force sensor is attached to the arm 102, and the arm motion information generating unit 107 multiplies a magnitude of a force applied to the arm 102 from the person 301 by a gain so as to derive a moving amount of the arm 102. At this time, a value of the gain is increased so that the arm 102 can be moved with a light force. FIG. 3A illustrates one example where the force sensor 302 is attached to the arm 102. Further, FIG. 3B and FIG. 3C illustrate an example where the person 301 applies a force to the force sensor 302 to move the arm 102. The arm 102 is composed of three arm members 102a and four rotary joint portions 102b, and the touch panel display 303 as one example of the display device is disposed at a distal end of the arm 102 via the rotary joint portions 102b. The force sensor 302 is disposed on the middle arm member 102a of the three arm members 102a. When the person 301 directly grips the force sensor 302 or makes contact with any arm member 102a of the three arm members 102a, while the force sensor 302 detects the force, the arm 102 is moved.

Further, when the force sensor 302 detects that the person 301 makes contact with a portion other than the display portion (screen) 303a (see FIG. 6A) of the touch panel display 303 or the arm 102, the stiffness parameter information generating unit 112 sets the stiffness low. For this reason, the arm 102 can be moved with a light force.

In this manner, when the person 301 makes contact with a portion other than the display portion 303a of the touch panel display 303, the stiffness parameter information generating unit 112 sets the stiffness of the arm 102 low.

As one example of the generation of the motion information in the arm motion information generating unit 107, motion information about the motions shown in FIG. 4A to FIG. 4D is generated.

Figure 4A:
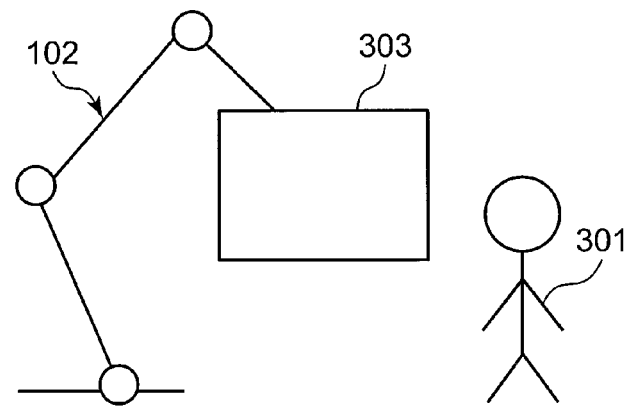
FIG. 4A is an explanatory view illustrating generation of the motion information in the robot according to the first embodiment.

In FIG. 4A, the person 301 touches neither the arm 102 nor the touch panel display 303, and neither the arm 102 nor the touch panel display 303 moves.

Figure 4B:
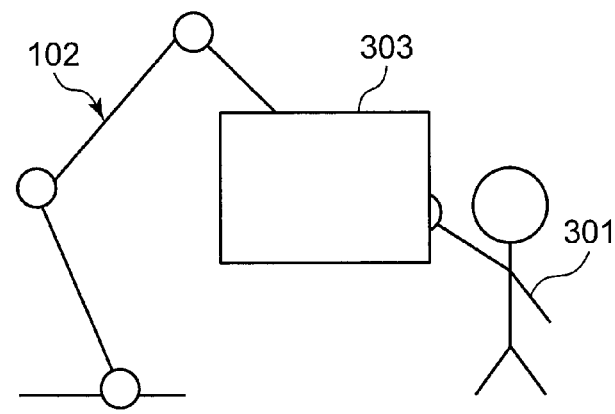
FIG. 4B is an explanatory view illustrating generation of the motion information in the robot according to the first embodiment.

In FIG. 4B, the person 301 touches the touch panel display 303, and applies a force to the arm 102 via the touch panel display 303 in a direction where the touch panel display 303 is desired to be moved.

Figure 4C:
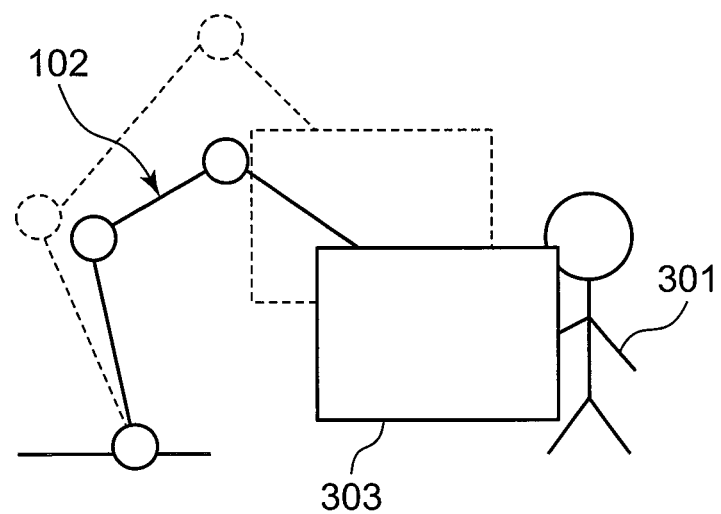
FIG. 4C is an explanatory view illustrating generation of the motion information in the robot according to the first embodiment.

In FIG. 4C, the touch panel display 303 moves via the arm 102 to a direction where the person 301 desires to move the touch panel display 303.

Figure 4D:
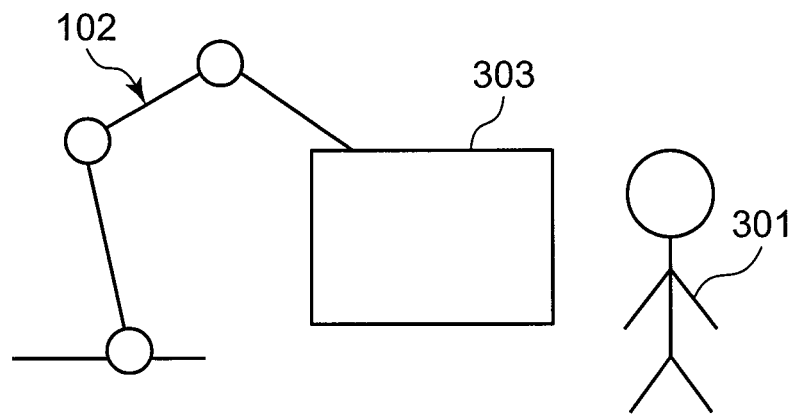
FIG. 4D is an explanatory view illustrating generation of the motion information in the robot according to the first embodiment.

In FIG. 4D, movements of the arm 102 and the touch panel display 303 are completed, the person 301 touches neither the arm 102 nor the touch panel display 303, and neither the arm 102 nor the touch panel display 303 moves.

The method for generating the motion information includes any methods such as a remote moving method using a remote control unit such as a pendant, and a moving method by teaching a motion in advance, in addition to a method in which the person 301 directly touches the arm 102 or the touch panel display 303 to generate the motion information.

The arm motion information generating unit 107 outputs the generated position information, orientation information, velocity information, angular velocity information about the arm 102, and time information as the motion information to the arm control unit 113. The motion information and the time information to be output have the similar structure to the information shown in FIG. 2.

The display information acquiring unit 108 acquires display information from the touch panel display 303. The display information is contents information displayed on the touch panel display 303. The contents information is, for example, text information for reading a book, moving image information for viewing a moving image, or map information for viewing a map. Further, when information is described in a format such as an HTML format, such information is included in the contents information.

The display information acquiring unit 108 outputs the display information acquired from the touch panel display 303 to the touch pattern estimating unit 110.

The display information database 109 retains data about position information and direction information (information about the motion direction of touch) in a contactable range (region) where the person 301 is likely to touch corresponding to the display information. Details of the position information and the direction information are described later. For example, in a case of the contents information described in the HTML format, the display information database 109 retains the database shown in FIG. 5A. This database has, for example, coordinate information about display positions and directions for each information about an event such as "mousedown" of HTML. Further, as one example of contents information that is not of the HTML format, the display information database 109 retains a database shown in FIG. 5B. This database includes, for example, coordinate information about display positions and directions for each information about "book" or the like.

As to the included data, the number of data can be compressed by increasing an interval between position information.

The information included in the display information database 109 is read by the touch pattern estimating unit 110.

The touch pattern estimating unit 110 acquires the contents information from the display information acquiring unit 108. The touch pattern estimating unit 110 estimates position information of a position likely to be touched by the person 301 based on the acquired contents information. The touch pattern estimating unit 110 outputs the acquired contents information to the display information database 109, and acquires the position information and the direction information in the contactable range corresponding to the contents information from the display information database 109. The information estimated by the touch pattern estimating unit 110 is composed of the position information and the direction information. The position information in the contactable range is position information (x, y) of a position likely to be touched by the person 301. The direction information in the contactable range is information about an advancing direction of the hand (finger) 701 when the person 301 traces the display portion 303a of the touch panel display 303 with the finger 701 while touching, and is composed of information about four directions +x, −x, +y, and −y. The position information and the direction information in the contactable range are represented by 1 in a likely case, but are represented by 0 in an unlikely case.

As the manipulation to be performed on the touch panel display 303 by the person 301 as one example of the display device, four manipulations including "touch", "page turning", "enlargement or reduction", and "keyboard input" are described.

<<Touch>>

Figure 6A:
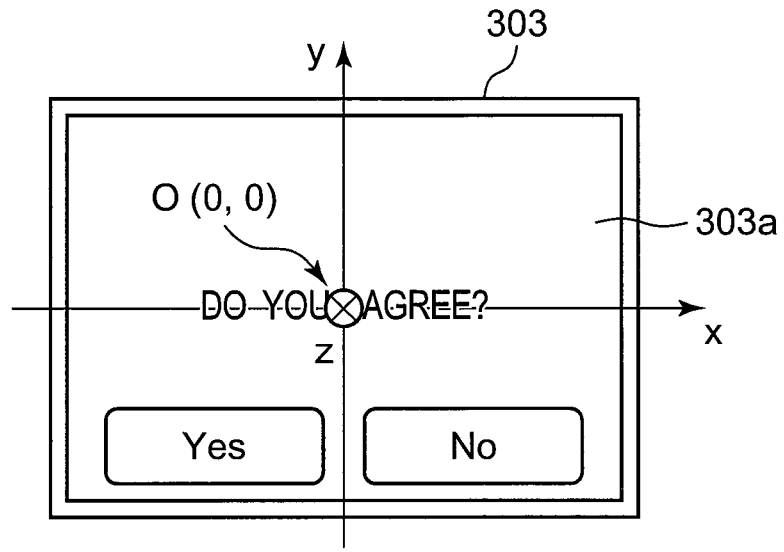
FIG. 6A is an explanatory view illustrating estimation of a contact pattern (touch) in the robot according to the first embodiment.
Figure 6B:
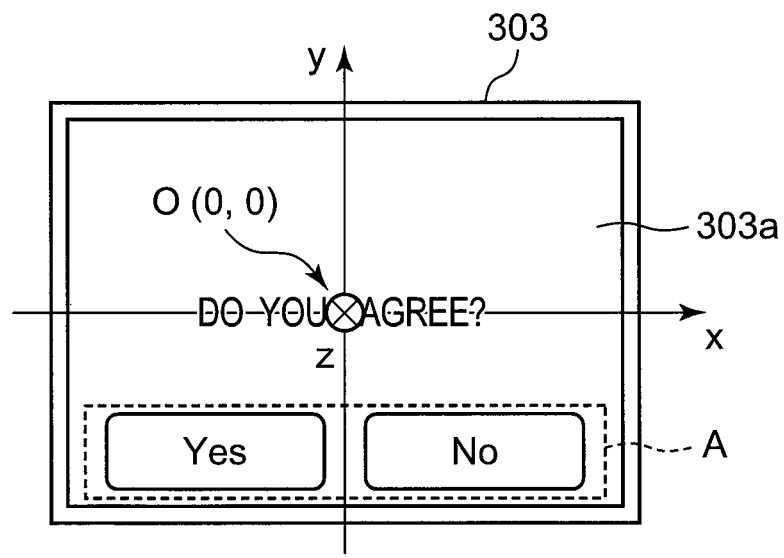
FIG. 6B is an explanatory view illustrating estimation of a contact pattern (touch) in the robot according to the first embodiment.

The touching manipulation is a motion for touching the display portion 303a (makes contact with the display portion 303a) of the touch panel display 303 performed by the person 301 with the finger 701 or the like. As an example, as shown in FIG. 6A, the touching manipulation is described using contents selected by the person 301 through the touching manipulation. In FIG. 6A, as the contents information, a question "Do you agree?" is displayed on the center of the display portion 303a, and two buttons "Yes" and "No" are displayed as a response to this question below the question. When such contents information is acquired from the display information acquiring unit 108, a position that is likely to be touched by the person 301 with the finger 701 is within a range surrounded by a broken line indicated by a reference symbol A on a lower part of the display portion 303*a* in FIG. 6B. For example, in HTML, the touch pattern estimating unit 110 acquires the range where the touching manipulation is likely to be performed in the event such as "mousedown" from the display information acquiring unit 108. Further, in a case that does not employ HTML, the person 301 inputs the contents information using the input/output IF 114, described later, and the touch pattern estimating unit 110 acquires the input. The contents information can be estimated in the following manner. The database includes the contents information, the touch pattern estimating unit 110 estimates a pattern of the included contents information, and determines the contents information. The touch pattern estimating unit 110 estimates information as the position information in the contactable range corresponding to the contents information so that a position (x, y) likely to be touched by the person 301 is represented by 1, and a position (x, y) unlikely to be touched by the person 301 is represented by 0. Further, the touch pattern estimating unit 110 sets direction information corresponding to the contents information so that the moving directions (four directions +x, −x, +y, and −y) are indicated by 1 when moving is likely to occur and indicated by 0 when moving is unlikely to occur. As one example, the moving manipulation on the touch panel display 303 means a tracing manipulation. Since the motion (tracing) is not likely to occur in any direction in this case, the information about any direction indicates 0. The touch pattern estimating unit 110 estimates the position information in the contactable range as (−x to +x, −y), and estimates the direction information in the contactable range as (0, 0, 0, 0). An example of the estimated information is shown in FIG. 6C.

<<Page Turning>>

Figure 7A:
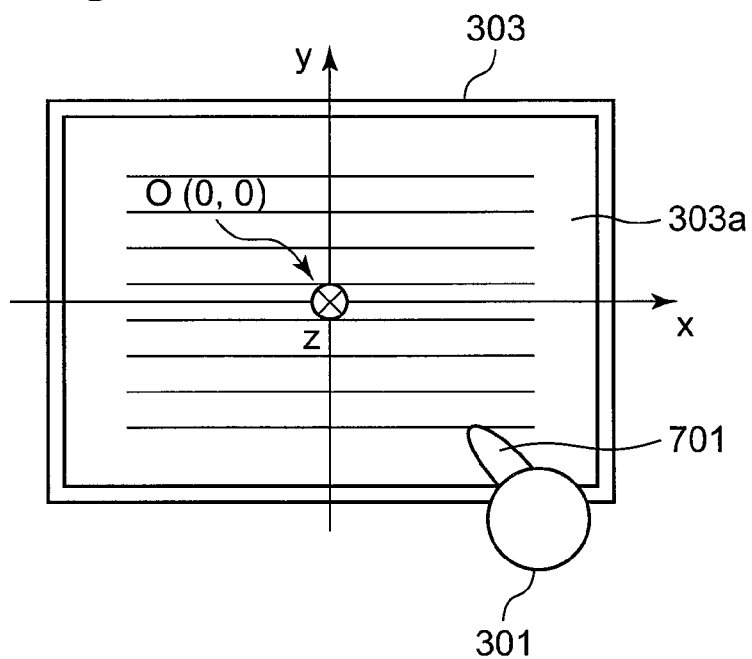
FIG. 7A is an explanatory view illustrating estimation of a contact pattern (page turning) in the robot according to the first embodiment.
Figure 7B:
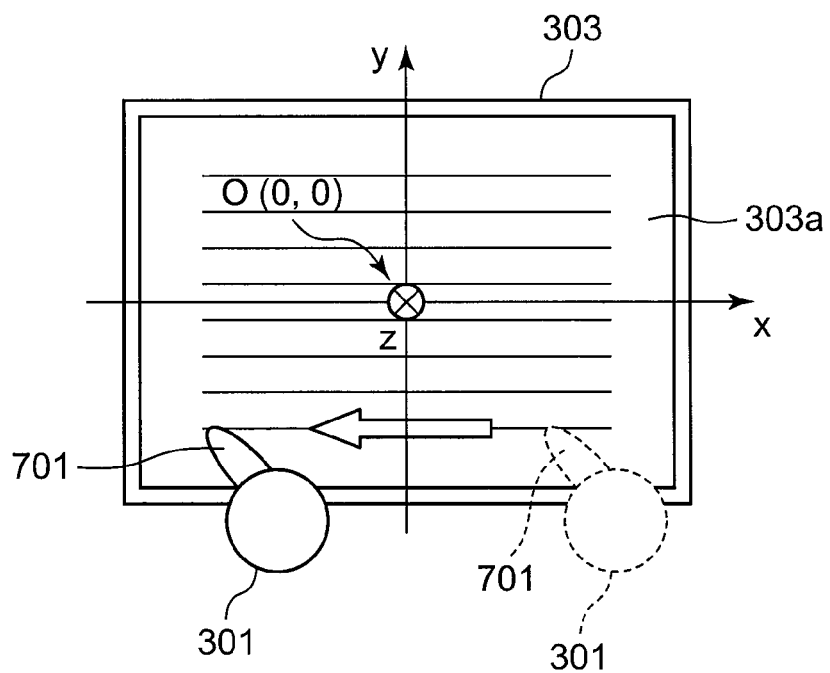
FIG. 7B is an explanatory view illustrating estimation of a contact pattern (page turning) in the robot according to the first embodiment.

The page turning manipulation is a motion to be performed by the person 301 when pages are changed in text reading. This manipulation is a motion performed by touching to trace the display portion 303*a* of the touch panel display 303 with the finger 701 to any direction. That is to say, position information about page turning is position information that changes such that the screen 303*a* is firstly touched by the finger 701, and while the screen 303*a* is being traced by the finger 701, the touch position shifts to any direction, and then the finger 701 is removed form the screen 303*a*. Concretely, as shown in FIGS. 7A and 7B, this motion is such that, while maintaining the touch state from a time point ((FIG. 7A) when the finger 701 of the person 301 touches the display portion 303*a* of the touch panel display 303, the hand 701 moves to a constant direction (as one example, in FIG. 7A, the −x-axial direction) (sliding motion)) (see FIG. 7B)

Figure 7C:
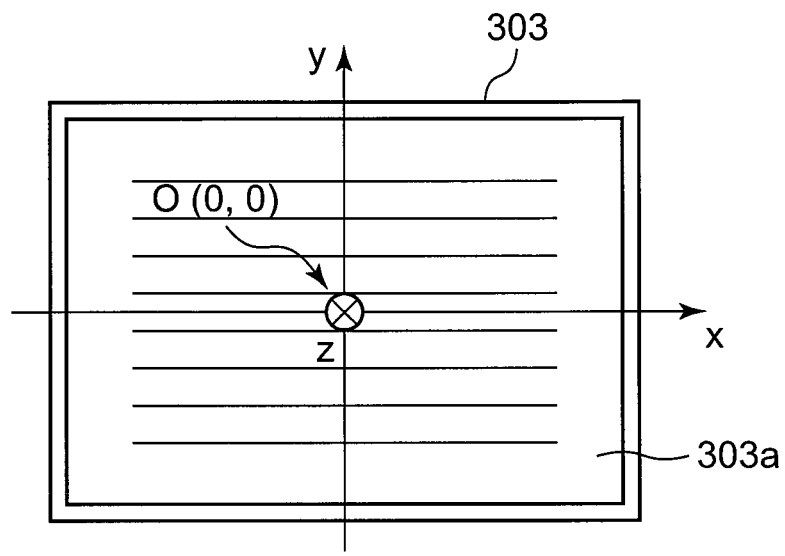
FIG. 7C is an explanatory view illustrating estimation of a contact pattern (page turning) in the robot according to the first embodiment.
Figure 7D:
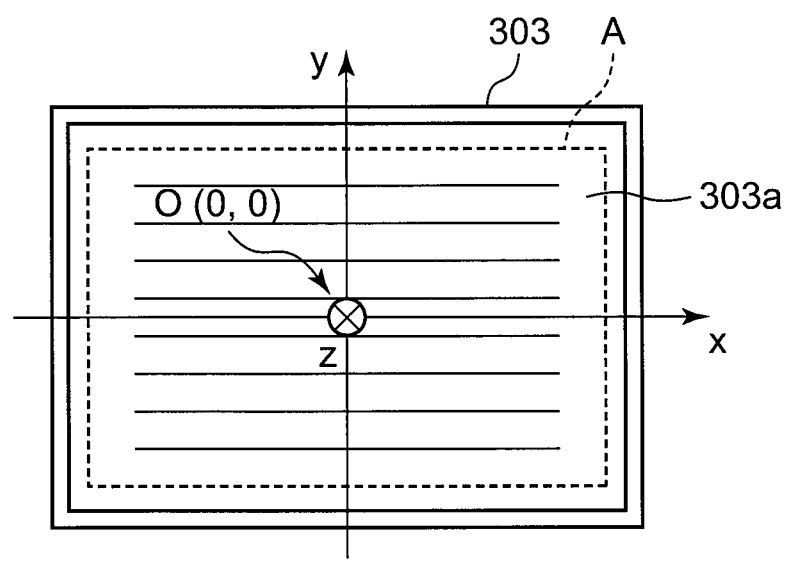
FIG. 7D is an explanatory view illustrating estimation of a contact pattern (page turning) in the robot according to the first embodiment.

As shown in FIG. 7C, the page turning manipulation is described by using the contents for reading texts. For example, in HTML, the touch pattern estimating unit 110 acquires a range where the page turning manipulation is likely to be performed on the display portion 303*a* in an event such as "draggable", from the display information acquiring unit 108. When the touch pattern estimating unit 110 acquires the contents information from the display information acquiring unit 108, a position on the display portion 303*a* that is likely to be touched by the person 301 is a range surrounded by a broken line shown by a reference symbol A in FIG. 7D. Further, possible directions where the position likely to be touched by the person 301 moves are the +x direction and the −x direction (right and left directions in FIG. 7D). Therefore, as the position information in the contactable range to be estimated, the position (x, y) is 1 for an entire region of the display portion 303*a* of the touch panel display 303, and the moving direction of the position (x, y) is 1 in the +x direction and the −x direction. In this manner, the touch pattern estimating unit 110 estimates the position information in the contactable range as (−x to +x, −y to +y), and the direction information in the contactable range as (+x, −x, 0, 0). An example of the estimated information is shown in FIG. 7E.

<<Enlargement or Reduction>>

The enlargement or reduction manipulation is a motion performed by the person 301 when a photograph is enlarged or reduced while the photograph being viewed. This manipulation is a motion performed by touching to trace the display portion 303*a* of the touch panel display 303 to two directions with a plurality of fingers 701. That is to say, position information about the enlargement manipulation changes such that the screen 303*a* is firstly multi-touched by the plurality of fingers 701 (positions on the screen 303*a* multi-touched by the plurality of the fingers 701 do not move), the positions on the screen 303*a* multi-touched by the plurality of fingers 701 are separated from each other, and the fingers 701 are removed from the screen 303*a*. Position information about the reduction manipulation changes such that the screen 303*a* is firstly multi-touched by the plurality of fingers 701 (positions on the screen 303*a* multi-touched by the plurality of the fingers 701 do not move), the positions on the screen 303*a* multi-touched by the plurality of fingers 701 mutually approach, and the fingers 701 are removed from the screen 303*a*. Concretely, as shown in FIG. 8A, in the enlargement case, the plurality of fingers 701 touch in mutually separating directions, and in the reduction case, as shown in FIG. 8B, the plurality of fingers 701 touch in mutually approaching directions.

Figure 8C:
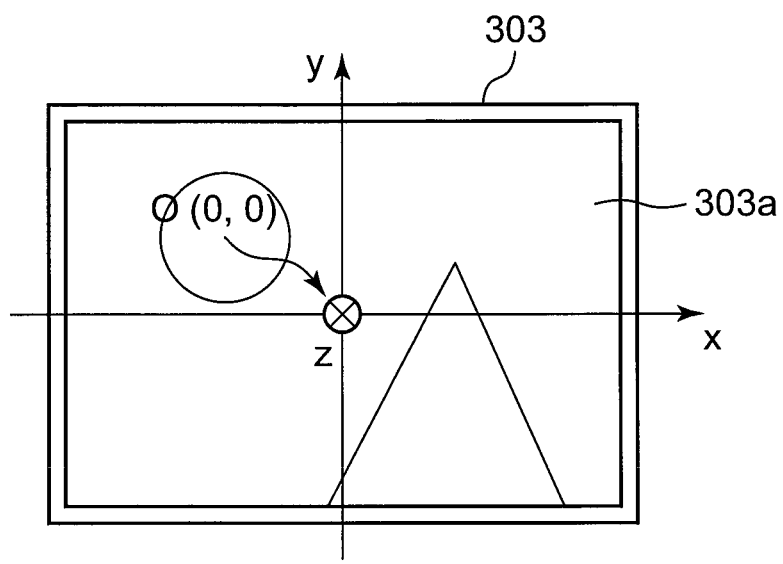
FIG. 8C is an explanatory view illustrating estimation of a contact pattern (enlargement or reduction) in the robot according to the first embodiment.
Figure 8D:
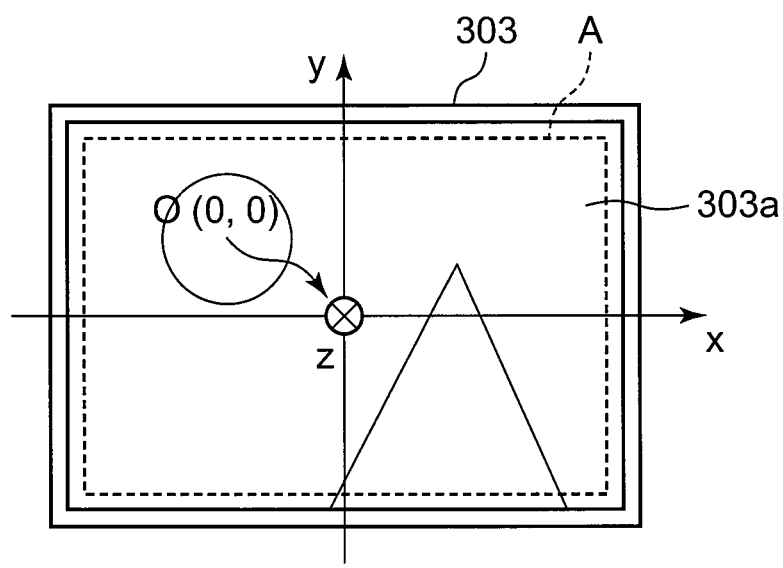
FIG. 8D is an explanatory view illustrating estimation of a contact pattern (enlargement or reduction) in the robot according to the first embodiment.
Figures 8E, 9A:
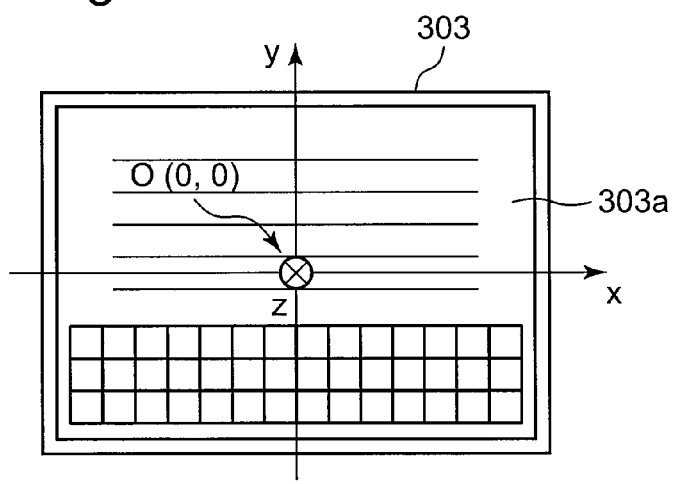
FIG. 8E is an explanatory view illustrating information data about the estimation of the contact pattern (enlargement or reduction) in the robot according to the first embodiment.
FIG. 9A is an explanatory view illustrating estimation of a contact pattern (keyboard input) in the robot according to the first embodiment.

As an example, as shown in FIG. 8C, the enlargement or reduction manipulation is described by using contents for viewing a photograph. For example, in HTML, when "meta name="viewpoint"" is specified, in an event such that whether pinch-out (enlargement) and pinch-in (reduction) are performed or not is specified by an argument of "USER-SCALABLE", the touch pattern estimating unit 110 acquires a range where enlargement or reduction is likely to be performed from the display information acquiring unit 108. When the touch pattern estimating unit 110 acquires such contents information from the display information acquiring unit 108, a position likely to be touched by the person 301 is a range surrounded by a broken line indicated by a reference symbol A in FIG. 8D. Further, possible directions where the position likely to be touched by the person 301 moves are the +x direction, the −x direction, the +y direction, and the −y direction. Therefore, as the position information in the contactable range to be estimated, the position (x, y) is 1 in the entire region of the display portion 303*a* of the touch panel display 303, and the direction where the position (x, y) moves is 1 in each of the +x direction, the −x direction, the +y direction, and the −y direction. In this manner, the touch pattern estimating unit 110 estimates the position information in the contactable range as (−x to +x, −y to +y), and estimates the direction information in the contactable range as (+x, −x, +y, −y). An example of the estimated information is shown in FIG. 8E.

<<Keyboard Input>>

Figure 9B:
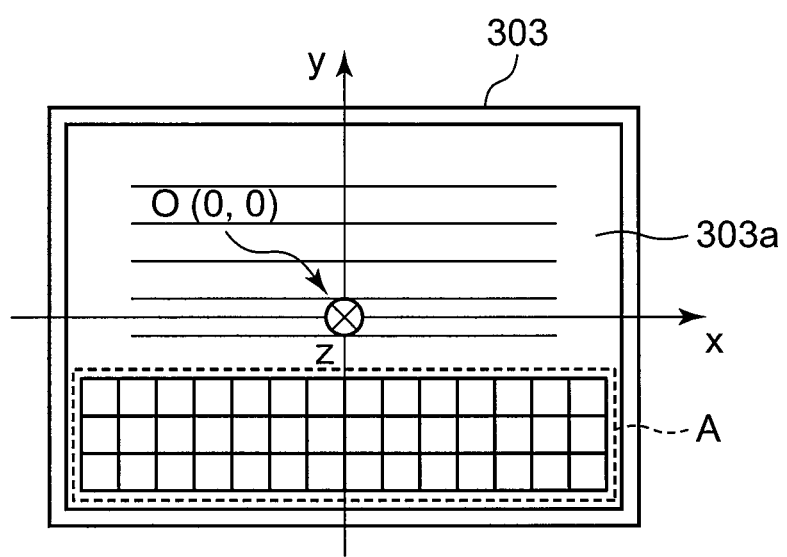
FIG. 9B is an explanatory view illustrating the estimation of the contact pattern (keyboard input) in the robot according to the first embodiment.

The keyboard input manipulation is a motion performed by the person 301 with a hand when keyboard input is performed in creation of a text. This manipulation is continuously performed by the above touching manipulation. That is to say, position information about a keyboard input manipulation is position information that changes repeatedly more than once in such a manner that the screen 303a is firstly touched by the finger 701 (the position on the screen 303a touched by the finger 701 does not move), and the finger 701 is removed from the screen 303a. Concretely, an example shown in FIG. 9A is described by using contents for creating a text. For example, in HTML, in an event such as "keydown", the touch pattern estimating unit 110 acquires a range where the keyboard input manipulation is likely to be performed from the display information acquiring unit 108. When the touch pattern estimating unit 110 acquires such contents information from the display information acquiring unit 108, a position that is likely to be touched by the person 301 is a range surrounded by a broken line indicated by a reference symbol A in FIG. 9B. Further, directions where the position likely to be touched by the person 301 moves are 0 in any directions.

A difference from the touching manipulation is that a time for which 1 is output for the position information in the contactable range to be estimated is continuously long because the person 301 likely to continuously touch. In this manner, the touch pattern estimating unit 110 estimates the position information at the time when the person 301 repeats the touch on the screen 303a of the touch panel display 303 more than once. That is to say, the touch pattern estimating unit 110 estimates the position information in the contactable range as (−x to +x, −y), and estimates the direction information in the contactable range as (0, 0, 0, 0). An example of the estimated information is shown in FIG. 9C.

<<In a Case where a Plurality of Manipulations May be Performed>>

Further, the above manipulations may include a plurality of possible candidates. That is to say, when there are a plurality of candidates of the manipulation to be performed by the person 301 on the screen 303a of the touch panel display 303, the touch pattern estimating unit 110 estimates all pieces of position information of positions likely to be touched.

Figure 10A:
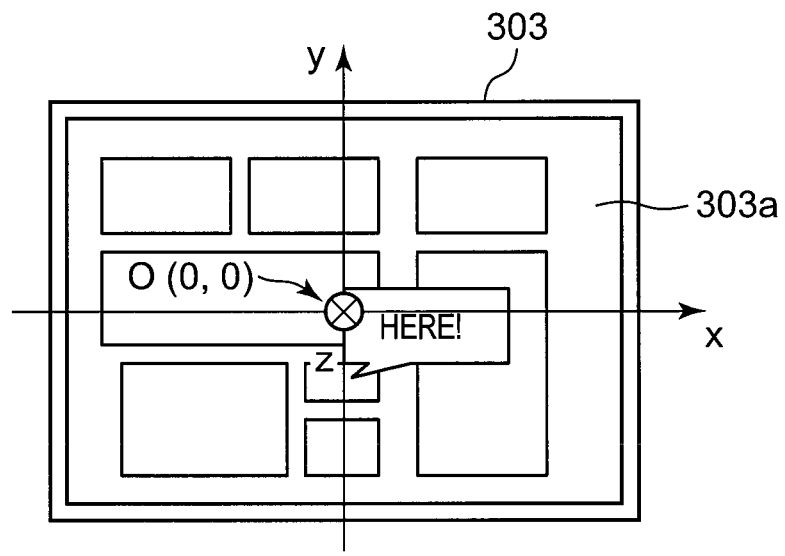
FIG. 10A is an explanatory view illustrating estimation of a contact pattern (in a case where a plurality of manipulations may be performed) in the robot according to the first embodiment.
Figure 10B:
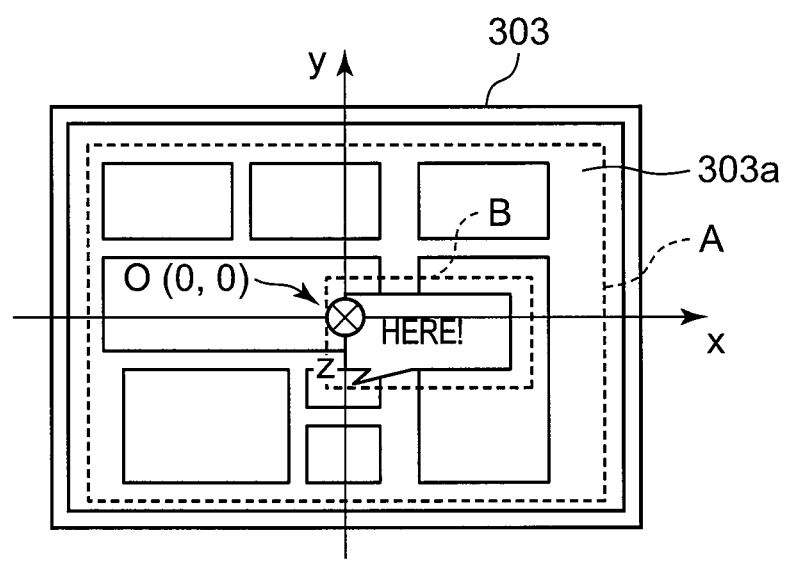
FIG. 10B is an explanatory view illustrating the estimation of the contact pattern (in the case where a plurality of manipulations may be performed) in the robot according to the first embodiment.

As an example, the case is described using contents for selecting a destination after a map is enlarged while being viewed as shown in FIG. 10A. When such contents are acquired from the display information acquiring unit 108, positions likely to be touched by the person 301 are a range surrounded by a broken line indicated by a reference symbol A in FIG. 10B (enlargement or reduction manipulation) and a range surrounded by a broken line indicated by a reference symbol B (touching manipulation). Further, directions where the positions likely to be touched by the person 301 move are the +x direction, the −x direction, the +y direction, and the −y direction in the range indicated by the reference symbol A, and are 0 in any direction in the range indicated by the reference symbol B. In the case of the contents in which the plurality of manipulations may be performed, the touch pattern estimating unit 110 estimates information in which the plurality of likely manipulations are added. In this example, the position is the range obtained by adding the range indicated by the reference symbol A and the range indicated by the reference symbol B, and the direction is a range obtained by adding the direction in the reference symbol A and the direction in the reference symbol B. In this manner, the touch pattern estimating unit 110 estimates the position information in the contactable range as (−x to +x, −y to +y), and estimates the direction information in the contactable range as (+x, −x, +y, −y). An example of the estimated information is shown in FIG. 10C.

Although the description is made herein about the above manipulation, but the present disclosure is applicable to all the manipulations that are performed on the touch panel display 303 by the person 301.

In addition to the above contents, the present disclosure can be applied also to contents to be used in hospitals. Concrete contents are described with reference to FIGS. 11A and 11B.

FIG. 11A illustrates contents of a moving image of a rehabilitation video. In such contents, the touch pattern estimating unit 110 estimates a portion indicated by a reference symbol A on which a replay/stop button or a slider is manipulated, as the position information in the contactable range likely to be touched by the person 301.

FIG. 11B illustrates contents for inputting physical conditions such as weight and blood pressure. In such contents, the touch pattern estimating unit 110 estimates portions indicated by reference symbols B and C on which selection or input is performed, as the position information in the contactable range likely to be touched by the person 301.

FIG. 12 illustrates the position information in the contactable range to be estimated by the touch pattern estimating unit 110. FIG. 12 includes the position information and the direction information in the contactable range.

The touch pattern estimating unit 110 outputs the estimated position information in the contactable range to the load estimating unit 111.

When a plurality of manipulations is likely to be performed, the touch pattern estimating unit 110 may define priorities for the above respective manipulations, and the touch pattern estimating unit 110 can adjusts the stiffness according to the priorities. For example, manipulations performed by the person (user) 301 in the past are stored in a database (not shown), and the touch pattern estimating unit 110 defines priorities for the manipulations in order of frequency.

The load estimating unit ill acquires the position information in the contactable range from the touch pattern estimating unit 110. The load estimating unit 111 calculates a force and a torque to be applied to the touch panel display 303 based on the position information in the contactable range acquired from the touch pattern estimating unit 110.

The information about the force and the information about the torque to be calculated are represented by 1 and 0, respectively. When the force and the torque are applied, the information represents 1 respectively, and when they are not applied, the information indicates 0 respectively. Further, forces Fx, Fy, and Fz in x, y, and z-axial directions are calculated, and torques Mx, My, and Mz in the x, y, and z-axial directions are calculated. Since 1 or 0 is obtained for each of + and −, twelve pieces of information about force and torque are calculated.

Figure 13A:
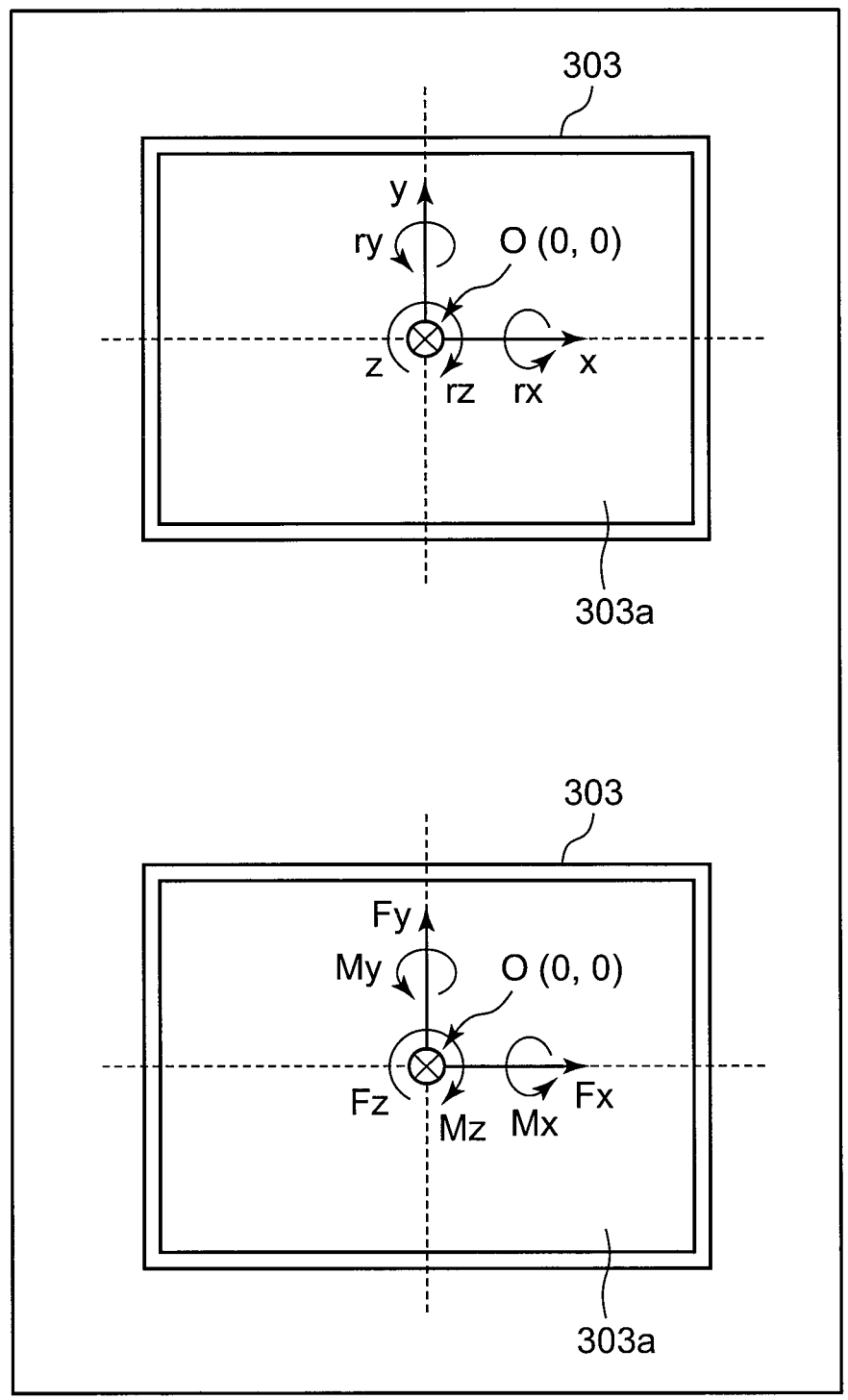
FIG. 13A is an explanatory view illustrating a coordinate system of a touch panel display in the robot according to the first embodiment.
Figure 13B:
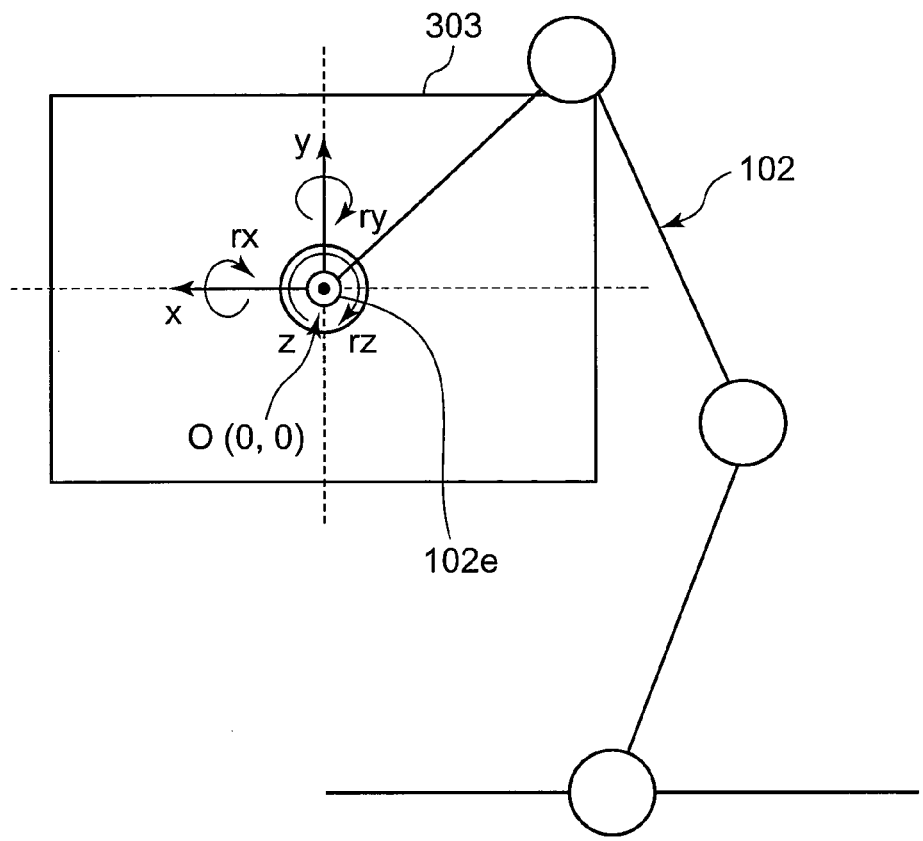
FIG. 13B is an explanatory view illustrating the coordinate system of the touch panel display in the robot according to the first embodiment.

A method for calculating the force and the torque in the load estimating unit 111 is described. A coordinate system of the touch panel display 303 and an attachment position of the arm 102 are described first. FIG. 13A and FIG. 13B illustrate a coordinate system of the touch panel display 303 and a coordinate system of an arm tip portion 102e of the arm 102. In the coordinate system of the display portion 303a of the touch panel display 303, as shown in FIG. 13A, a center portion is an origin O (0, 0). Further, the arm tip portion (an attachment portion of the touch panel display 303) 102e at the distal end of the arm 102 is attached to a center portion on a rear surface of the touch panel display 303 as shown in FIG. 13B. The setting in the coordinate system or the attachment of the arm tip portion 102e of the arm 102 can be carried out by other any methods.

As to the concrete method for calculating the force and the torque in the load estimating unit 111, the force Fx in the x-axial direction, the force Fy in the y-axial direction, the force Fz in the z-axial direction, the torque Mx about the x axis, the torque My about the y axis, and the torque Mz about the z axis are calculated based on the coordinate system in FIG. 13A under the following conditions. The forces Fx, Fy, and Fz represent the frictional forces to be horizontally applied to a surface of the screen 303a, and the pushing force to be vertically applied to the surface of the screen 303a based on the position information estimated by the touch pattern estimating unit 110. Further, the torque Mx, the torque My, and the torque Mz represent torques whose axes are horizontal to the surface of the screen 303a based on force information about the pushing force to be vertically applied to the surface of the screen 303a and position information, and a torque whose axis is vertical to the surface of the screen 303a based on the force information about a frictional force to be horizontally applied to the surface of the screen 303a and the position information.

(First Condition)

As to the forces Fx and Fy in the x and y-axial directions, it is assumed that when the direction information indicates 1 for each of the directions (+x, −x, +y, −y), the forces Fx and Fy of the axes are applied. On the contrary, it is assumed that when the direction information indicates 0, the forces Fx and Fy of the axes are not applied. The forces Fx and Fy are forces relating to the frictional forces. The load estimating unit ill estimates information about the forces Fx and Fy relating to the frictional forces to be horizontally applied to the surface of the screen 303a based on the position information estimated by the touch pattern estimating unit 110.

(Second Condition)

As to the force Fz in the z-axial direction, in the position information in the contactable range, it is assumed that when touch occurs on even one set of coordinates (the position information in the contactable range indicates 1), the force Fz is applied. On the contrary, it is assumed that when no touch occurs on all the coordinates (all pieces of the position information in the contactable range indicate 0), the force Fz is not applied. The load estimating unit 111 estimates the information about the pushing force Fz to be vertically applied to the surface of the screen 303a based on the position information estimated by the touch pattern estimating unit 110.

(Third Condition)

As to the torques Mx and My about the x and y axes, in the position information in the contactable range, it is assumed that when touch occurs in coordinates separated from the origin O(0, 0) (the position information in the contactable range indicates 1), the torques Mx and My are applied. For example, when touch occurs on the coordinates (3, 15), the torques −Mx and My are applied, and when touch occurs on the coordinates (−14, 0), the torque −My is applied. That is to say, when touch occurs on the coordinates (+x, 0), the torque +My is applied, and when touch occurs on the coordinates (0, +y), the torque −Mx is applied. The load estimating unit ill estimates information of the torques Mx and My whose axes are horizontal to the surface of the screen 303a based on the force information about the pushing force vertically applied to the surface of the screen 303a and the position information.

(Fourth Condition)

When the direction information in the x axis relating to the torque Mz about the z axis in the contactable range indicates 1, and the position information in the contactable range indicates that a position other than y=0 is touched, the torque Mz is applied. Further, when the direction information about the y axis in the contactable range indicates 1, and the position information in the contactable range indicates that a position other than x=0 is touched, the torque Mz is applied. The load estimating unit 111 estimates information about the torque Mz whose axis is vertical to the surface of the screen 303a based on the force information about the frictional force to be horizontally applied to the surface of the screen 303a and the position information.

The method for calculating the force and the torque in the load estimating unit 111 in the above manipulation is concretely described.

<<Touch>>

Figure 14A:
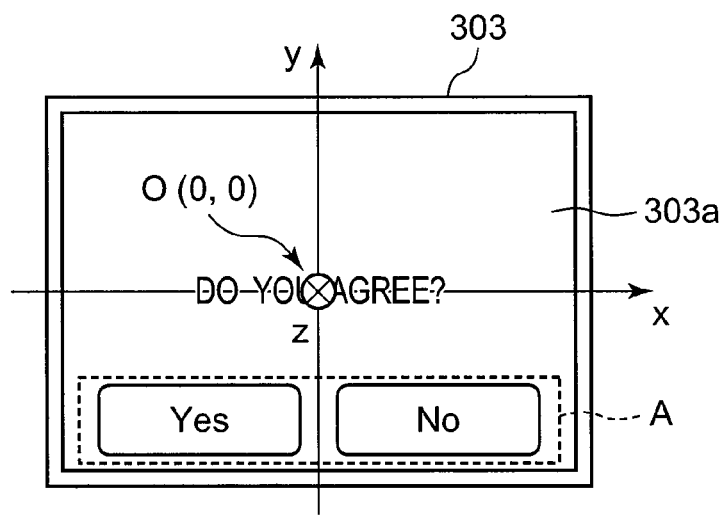
FIG. 14A is an explanatory view illustrating calculation of a contact force (touch) in the robot according to the first embodiment.

The position information in the contactable range acquired from the touch pattern estimating unit 110 by the load estimating unit 111 is a range (−x to +x, −y) surrounded by a broken line of a reference symbol A shown in FIG. 14A, and the direction information indicates 0. Therefore, since the direction information indicates 0 in any directions, the forces Fx and Fy are not applied in the x and y directions, which corresponds to the first condition. In the position information in the contactable range about the force Fz, since touch occurs even on one set of coordinates, the force +Fz is applied, which corresponds to the second condition. Since touch occurs on the coordinates (−x to +x, −y) separated from the origin O, the torques +Mx, +My, and −My are applied, which corresponds to the third condition. Since the direction information about the torque Mz indicates 0, the torque about the z axis is not applied, which corresponds to the fourth condition.

In this manner, the load estimating unit 111 estimates the force +Fz, and the torques +Mx, +My, and −My.

<<Page Turning>>

Figure 14B:
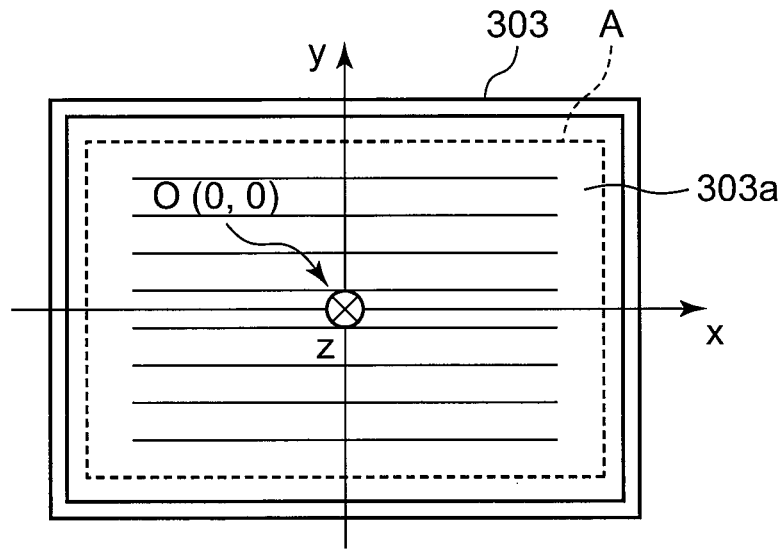
FIG. 14B is an explanatory view illustrating calculation of a contact force (page turning) in the robot according to the first embodiment.

The position information in the contactable range acquired from the touch pattern estimating unit 110 by the load estimating unit 111 is a range (−x to +x, −y to +y) surrounded by a broken line indicated by a reference symbol A shown in FIG. 14B, and the direction information in the contactable range is (+x, −x, 0, 0). Therefore, since the direction information is (+x, −x, 0, 0), the forces +Fx and −Fx are applied, which corresponds to the first condition. Since touch occurs even on one set of coordinates, the force +Fz is applied which corresponds to the second condition. Since touch occurs on the positions (−x to +x, −y to +y) separated from the origin O, the torques +Mx, −Mx, +My, and −My are applied, which corresponds to the third condition. Since the direction information is (+x, −x, 0, 0), and a position other than y=0 is likely to be touched, the torques +Mz and −Mz are applied, which corresponds to the fourth condition. That is to say, based on the position information, the load estimating unit 111 estimates the changing force information in the following manner in order. (1) The load estimating unit 111 estimates the force +Fz for vertically pushing the surface of the screen 303a and the torques +Mx, −Mx, +My, and −My whose axes are horizontal to the surface of the screen 303a. Then, (2) the load estimating unit 111 estimates the force +Fz for vertically pushing the surface of the screen 303a, the frictional forces +Fx and −Fx to be horizontally applied to the surface of the screen 303a, the torques +Mx, −Mx, +My, and −My whose axes are horizontal to the surface of the screen 303a, and the torques +Mz and −Mz whose axes are vertical to the surface of the screen 303a. Then, (3) no force is applied to the screen 303a, and the estimation is not performed by the load estimating unit 111 at this stage.

In this manner, the load estimating unit 111 estimates the forces +Fx, −Fx, and +Fz, and the torques +Mx, −Mx, +My, −My, +Mz, and −Mz.

<<Enlargement or Reduction>>

Figure 14C:
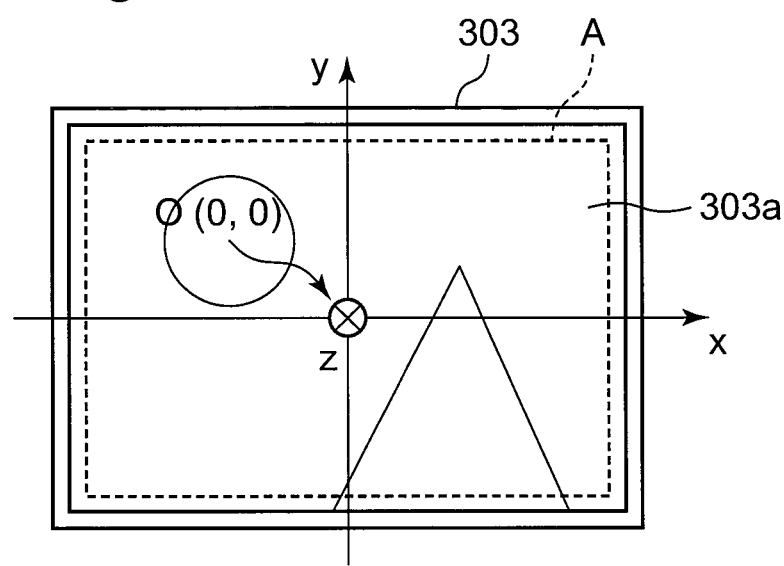
FIG. 14C is an explanatory view illustrating calculation of a contact force (enlargement or reduction) in the robot according to the first embodiment.

The position information in the contactable range acquired from the touch pattern estimating unit 110 by the load estimating unit 111 is a range (−x to +x, −y to +y) surrounded by a broken line indicated by a reference symbol A shown in FIG. 14C, and the direction information in the contactable range is (+x, −x, +y, −y). Therefore, since the direction information in the contactable range is (+x, −x, +y, −y), the forces +Fx, −Fx, +Fy, and −Fy are applied, which corresponds to the first condition. Since touch occurs even on one set of coordinates, the force +Fz is applied, which corresponds to the second condition. Since touch occurs on the positions (−x to +x, −y to +y) separated from the origin O, the torques +Mx, −Mx, +My, and −My are applied, which corresponds to the third condition. The direction information is (+x, −x, +y, −y), and since a position other than x=0, y=0 is likely to be touched, the torques +Mz and −Mz are applied, which corresponds to the fourth condition. That is to say, based on the position information, the load estimating unit 111 estimates the changing force information in the following manner in order. (1) The load estimating unit 111 estimates the force +Fz for vertically pushing the surface of the screen 303a and the torques +Mx, −Mx, +My, and −My whose axes are horizontal to the surface of the screen 303a. Then, (2) the load estimating unit 111 estimates the force +Fz for vertically pushing the surface of the screen 303a, the frictional forces +Fx, −Fx, +Fy, and −Fy to be horizontally applied to the surface of the screen 303a, the torques +Mx, −Mx, +My, and −My whose axes are horizontal to the surface of the screen 303a, and the torques +Mz and −Mz whose axes are vertical to the surface of the screen 303a. Then, (3) no force is applied to the screen 303a, and the estimation is not performed by the load estimating unit 111 at this stage.

In this manner, the load estimating unit 111 estimates the forces +Fx, −Fx, +Fy, −Fy, and +Fz and the torques +Mx, −Mx, +My, −My, +Mz, and −Mz.

<<Keyboard Input>>

Figure 14D:
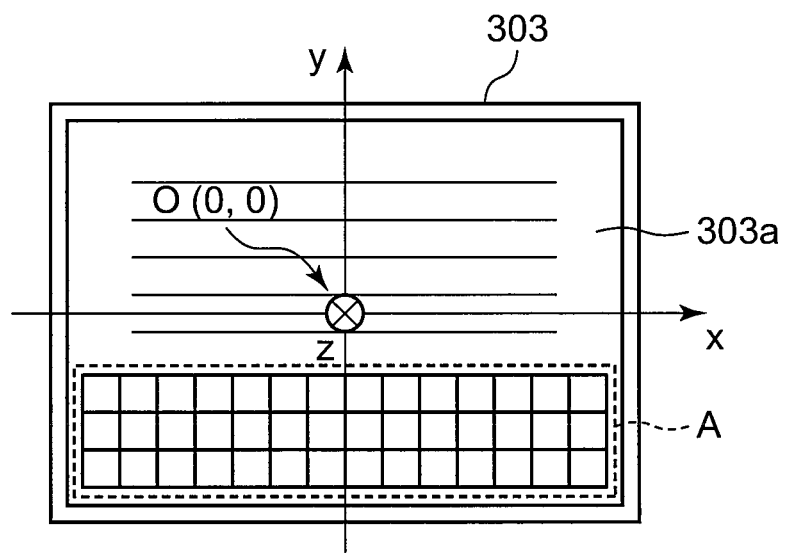
FIG. 14D is an explanatory view illustrating calculation of a contact force (keyboard input) in the robot according to the first embodiment.

The position information in the contactable range acquired from the touch pattern estimating unit 110 by the load estimating unit 111 is a range (−x to +x, −y) surrounded by a broken line of a reference symbol A shown in FIG. 14D, and the direction information in the contactable range indicates 0. Therefore, since the direction information indicates 0 in any directions, no force is applied in the x and y directions, which corresponds to the first condition. Since touch occurs even on one set of coordinates, the force +Fz is applied, which corresponds to the second condition. Since touch occurs on a place (−x to +x, −y) separated from the origin O, the torques +Mx, +My, and −My are applied, which corresponds to the third condition. Since the direction information in the contactable range indicates 0 in any directions, the torque about the z axis is not applied, which corresponds to the fourth condition. Based on the position information, the load estimating unit 111 estimates the changing force information in the following manner in order. Firstly, (1) the load estimating unit 111 estimates the force +Fz for vertically pushing the surface of the screen 303a and the torques +Mx, +My, and −My whose axes are horizontal to the surface of the screen 303a. Then, (2) no force is applied to the screen 303a, and at this stage the load estimating unit 111 does not perform estimation.

In this manner, the load estimating unit 111 estimates the force +Fz, and the torques +Mx, +My, and −My. A difference from the touching manipulation is that the time for which the force and the torques are applied is longer.

When the person 301 repeats the touch on the screen 303a more than once, the touch pattern estimating unit 110 estimates the position information at the time when the person 301 repeats the touch on the screen 303a more than once. The load estimating unit 111 estimates the pushing force Fz vertically applied to the surface of the screen 303a and a force at the time when no force is applied to the screen 303a (the person 301 does not touch the screen 303a) based on the position information estimated by the touch pattern estimating unit 110. Then, the load estimating unit 111 estimates information about at least one of the torques Mx and My whose axes are horizontal to the surface of the screen 303a based on the force information about the pushing force Fz vertically applied to the surface of the screen 303a and the position information.

<<In a Case Where a Plurality of Manipulations May be Performed>>

Figure 14E:
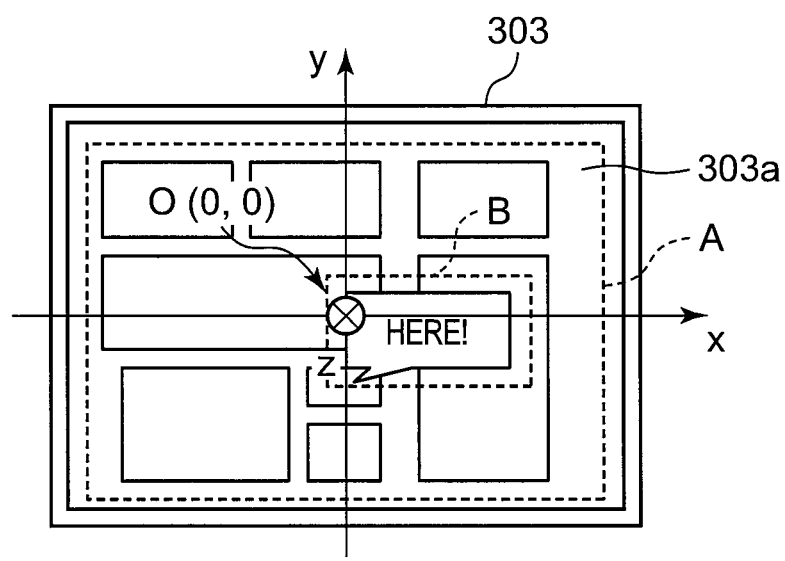
FIG. 14E is an explanatory view illustrating calculation of a contact force (in the case where a plurality of manipulations may be performed) in the robot according to the first embodiment.

The position information in the contactable range acquired from the touch pattern estimating unit 110 by the load estimating unit 111 is in a range obtained by adding a range (−x to +x, −y to +y) surrounded by a broken line of a reference symbol A shown in FIG. 14E and a range (−x to +x, −y to +y) surrounded by a broken line of a reference symbol B, and the direction information in the contactable range is information obtained by adding a direction (+x, −x, +y, −y) and a direction (0, 0, 0, 0). Therefore, since the direction information is (+x, −x, +y, −y), the forces +Fx, −Fx, +Fy, and −Fy are applied, which corresponds to the first condition. Since touch occurs even on one set of coordinates, the force +Fz is applied, which corresponds to the second condition. Since touch occurs in a place (−x to +x, −y to +y) separated from the origin O, the torques +Mx, −Mx, +My, and −My are applied, which corresponds to the third condition. The direction information is (+x, −x, +y, −y), and since a position other than x=0, y=0 is likely to be touched, the torques +Mz and −Mz are applied, which corresponds to the fourth condition.

In this manner, the load estimating unit 111 estimates the forces +Fx, −Fx, +Fy, −Fy, and +Fz and the torques +Mx, −Mx, +My, −My, +Mz, and −Mz.

As to the examples of the forces and the torques derived by the above method in the load estimating unit 111, FIG. 15A illustrates the touching manipulation, FIG. 15B illustrates the page turning manipulation, FIG. 15C illustrates the enlargement or reduction manipulation, FIG. 15D illustrates the keyboard input manipulation, and FIG. 15E illustrates the case where a plurality of manipulations are likely to be performed. FIG. 15A to FIG. 15E include the force information and the torque information, and 1 indicates that the force or the torque is applied, and 0 indicates that the force or the torque is not applied.

The load estimating unit 111 can estimate any one of the force and the torque. The driving method is similar to the above-described method. When any one of the force and the torque is estimated, the present disclosure can be applied also to a case where a degree of freedom of the arm 102 for holding the touch panel display 303 is less than 6 axes.

The load estimating unit 111 outputs the derived force information, torque information, and time information to the stiffness parameter information generating unit 112.

The stiffness parameter information generating unit 112 acquires the force information, the torque information, and the time information from the load estimating unit 111. The stiffness parameter information generating unit 112 generates the stiffness parameter information about the arm 102 based on the force and the torque acquired by the stiffness parameter information generating unit 112 so that the orientation of the touch panel display 303 does not change when the person 301 touches the touch panel display 303. The stiffness parameter information is information about the stiffness parameters of respective axes (x, y, z, rx, ry, rz) in the arm tip portion (the attachment portion of the touch panel display 303) 102e of the arm 102. Symbol rx represents a direction of the rotation about the x axis, symbol ry represents a direction of the rotation about the y axis, and symbol rz represents a direction of the rotation about the z axis. This value is changed by the stiffness parameter information generating unit 112, so that the stiffness of the arm tip portion 102e of the arm 102 can be changed by the stiffness parameter information generating unit 112. As a result, the stiffness at the time when the person 301 makes contact with the touch panel display 303 can be adjusted by the stiffness parameter information generating unit 112. Further, as shown in FIG. 13A and FIG. 13B, two kinds of the coordinate systems including a coordinate system of the display portion 303a of the touch panel display 303, and a coordinate system of the arm tip portion 102e of the arm 102 are present. The stiffness parameter information for the coordinate systems is generated by the stiffness parameter information generating unit 112 based on the coordinate system of the display portion 303a of the touch panel display 303. Also when the coordinate system of the arm tip portion 102e of the arm 102 and the coordinate system of the touch panel display 303 are different from each other, the stiffness of the display portion 303a of the touch panel display 303 can be changed at any time by the stiffness parameter information generating unit 112. Further, in the stiffness parameter information generating unit 112, an initial value of the stiffness in the stiffness parameter information is set low, and only when the stiffness of the arm 102 is to be changed, the stiffness is changed by the stiffness parameter information generating unit 112.

The heightened stiffness is set into low level in the stiffness parameter information generating unit 112 when the power of the touch panel display 303 (for example, as described later, on/off switching information about the power of the touch panel display 303 to be input by using the input/output IF 114) is turned off, or when the force and the torque calculated by the load estimating unit 111 are 0.

The method for generating the stiffness parameter information in the stiffness parameter information generating unit 112 is described. As to the force and torque information acquired from the load estimating unit ill by the stiffness parameter information generating unit 112, the stiffness parameter information generating unit 112 changes the stiffness without a movement to that direction in the information (the information indicating 1) representing that the force and the torque are applied. As a result, the stiffness parameter information generating unit 112 sets the stiffness in that direction high relative to the applied force and torque, so that the person 301 can easily perform the manipulations on the touch panel display 303. For example, when the force +Fz is applied, the stiffness parameter information generating unit 112 sets the stiffness in the +z direction high. Further, the stiffness parameter information generating unit 112 does not set the stiffness high for axes to which the force and the torque are not applied. With a method other than the above method for setting the stiffness high, the stiffness parameter information generating unit 112 can set the stiffness high in both the axial directions to which the force and the torque are applied (in the above example, the +z direction and the −z direction)

As one example of the method for setting the stiffness high in the stiffness parameter information generating unit 112, it is assumed the control system is constituted so that when the force of 1.0 N is applied in the z direction in a low stiffness state, the touch panel display 303 moves by about 20 mm due to the low stiffness. That is to say, the coefficient of the stiffness is 1.0/20=0.05 N/mm. In this state, every time when the person 301 touches the touch panel display 303 to input, the touch panel display 303 moves to the z direction. Therefore, the stiffness parameter information generating unit 112 increases the feedback gain of the motor 102M for control in the z direction, so that the stiffness is heightened. For example, the stiffness parameter information generating unit 112 changes the stiffness so that the movement of the touch panel display 303 is within 5 mm when the force of 2.0 N is applied in the z direction. As a result, the coefficient of the stiffness is made to be 2.0/5=0.4 N/mm. That is to say, to set the stiffness high in the stiffness parameter information generating unit 112 makes the touch panel display 303 hard to be moved in the direction where the person 301 pushes the touch panel display 303. When the stiffness is set higher in the stiffness parameter information generating unit 112, the touch panel display 303 moves along a shorter distance than in the case where the stiffness is set low even when the touch panel display 303 is pushed with the same force. In both the cases, when the person 301 does make contact with the touch panel display 303, the touch panel display 303 does not move.

Figure 16:
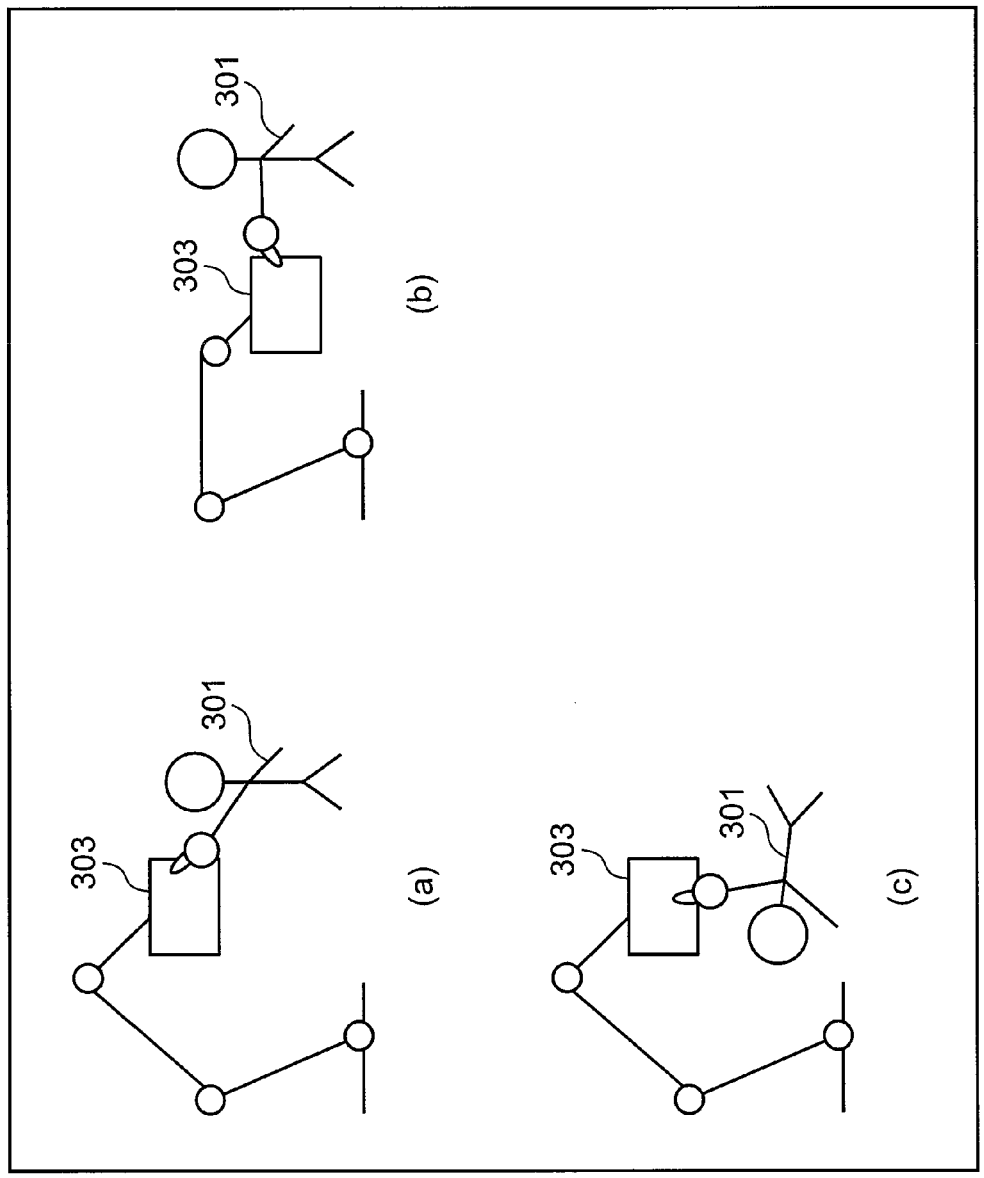
FIG. 16 is an explanatory view illustrating a position relationship between a person and the touch panel display in the robot according to the first embodiment of the present invention.

Further, as shown in FIG. 16, even in the same touching manipulation or the keyboard manipulation, the force to be applied to the touch panel display 303 varies depending on a positional relationship between the person 301 and the touch panel display 303. Therefore, an adjustment amount of the stiffness is helpful to be changed by the stiffness parameter information generating unit 112 in advance according to environments where the touch panel display 303 with the arm is used. As one example of the adjusting method, the person 301 can input the adjusting amount of the stiffness into the stiffness parameter information generating unit 112 using the input/output IF 114. Further, when the stiffness is to be set low by the stiffness parameter information generating unit 112, the stiffness is set by the stiffness parameter information generating unit 112 so that the touch panel display 303 does not fall down under an influence of gravity.

In the respective manipulations, when the force and the torque expressed by FIG. 15A to FIG. 15E are acquired, stiffness parameter information shown in FIG. 17A to FIG. 17E is generated by the stiffness parameter information generating unit 112, for example. FIG. 17A illustrates the case of the touching manipulation, FIG. 17B illustrates the case of the page turning manipulation, FIG. 17C illustrates the case of the enlargement or reduction manipulation, FIG. 17D illustrates the case of the keyboard input manipulation, and FIG. 17E illustrates the case where a plurality of manipulations is likely to be performed. As to the stiffness parameter information, the information indicating 1 represents an axis whose stiffness is to be set high, and the information indicating 0 represents an axis whose stiffness is not to be set high.

The stiffness parameter information generating unit 112 adjusts the stiffness using two values including 1 and 0, but as explained below as examples, any parameter value may be given so that a level of the stiffness can be subtly adjusted by the stiffness parameter information generating unit 112.

Examples of a method for giving any parameter value are described.

In a first example, the parameter value is changed by the stiffness parameter information generating unit 112 according to the manipulations. For example, the parameter at the time of setting the stiffness high is changed by the stiffness parameter information generating unit 112 so as to give 1.0 for the touching manipulation, 0.8 for the keyboard input manipulation, 0.6 for the page turning manipulation, and 0.4 for the enlargement or reduction manipulation. As the parameter is larger, the stiffness is higher. This method for changing the parameter is based on the fact that a force and a torque to be applied are larger in the touching manipulation or the keyboard input manipulation than those in the page turning manipulation or the enlargement or reduction manipulation.

This is because strength of the force to be applied to the display portion 303a by the person 301 varies according to the manipulations, and the stiffness is high in the case of the manipulation in which a larger force is applied. When the stiffness is adjusted by the stiffness parameter information generating unit 112 in such a manner, the maneuverability of the touch panel display 303 according to the respective manipulations can be provided.

In the second example, the stiffness parameter information generating unit 112 changes the parameter value according to axes to which a force and a torque are applied. For example, the stiffness parameter information generating unit 112 changes parameters at the time of setting the stiffness high so as to give 1.0 for the force Fz, 0.8 for the torques Mx and My, 0.6 for the forces Fx and Fy, and 0.4 for the torque Mz. This parameter changing method is based on the fact that strong force is applied in the direction where the display portion 303a of the touch panel display 303 is pushed.

This is because strength of the forces to be applied to the display portion 303a by the person 301 varies according to the axes, and the stiffness is higher in the case of the manipulation for applying a stronger force. For example, the force for pushing in the vertical direction is stronger than that in the direction where the display portion 303a is traced. When the stiffness parameter information generating unit 112 adjusts the stiffness in such a manner, the maneuverability of the touch panel display can be provided according to the respective axes.

In the third example, the stiffness parameter information generating unit 112 changes the parameter value according to a touching position. For example, as a position to be touched is separated from the origin O farther, the stiffness parameter information generating unit 112 increases the parameter value larger, and the stiffness parameter information generating unit 112 sets the stiffness higher. This is because as a position farther separated from the origin O is touched, the torques Mx and My further increase.

When the stiffness parameter information generating unit 112 adjusts the stiffness in such a manner, the maneuverability of the touch panel display 303 can be provided according to the respective rotational directions.

Also when the stiffness parameter information generating unit 112 acquires any one of the force information and the torque information from the load estimating unit 111, the stiffness parameter information generating unit 112 can generate the stiffness parameter information. The driving method is similar to the above-described method. When the stiffness parameter information about any one of the force and the torque is generated by using any one of the force information and the torque information, the present disclosure can be applied also to the case where the degree of freedom of the arm 102 for holding the touch panel display 303 is less than 6 axes.

The stiffness parameter information generating unit 112 outputs the stiffness parameter information generated by the stiffness parameter information generating unit 112 and the time information to the arm control unit 113.

The arm control unit 113 acquires the motion information and time information from the arm motion information generating unit 107. Further, the arm control unit 113 acquires the stiffness parameter information and the time information from the stiffness parameter information generating unit 112.

As the first function of the arm control unit 113, the motion information input into the arm control unit 113 is output from the arm control unit 113 to the input/output IF 114 at every constant time (for example, every 1 ms) using the timer built in the input/output IF 114, so that the motion of the arm 102 is controlled via the motor driver 115.

As the second function of the arm control unit 113, the stiffness parameter information input into the arm control unit 113 is output from the arm control unit 113 to the input/output IF 114 at every constant time (for example, every 1 ms) using the timer built in the input/output IF 114, so that the stiffness of the arm tip portion (the attachment portion of the touch panel display 303) 102e of the arm 102 is controlled by the arm control unit 113. When the stiffness parameter information is not input into the arm control unit 113, the arm control unit 113 controls the stiffness low so that the person 301 can move the arm 102 with a light force. The arm control unit 113 always controls the stiffness with respect to the display portion 303a of the touch panel display 303. That is to say, the arm control unit 113 controls the stiffness of the arm 102 based on the coordinate system of the display portion 303a of the touch panel display 303. The control of the stiffness through the arm control unit 113 facilitates the touching manipulation performed by the person 301. That is to say, when the person 301 manipulates the touch panel display 303, the arm control unit 113 controls the stiffness so that the position and the orientation of the touch panel display 303 do not change.

As the method for controlling the stiffness through the arm control unit 113, any control method such as impedance control or damping control can be used. For example, a force and a torque to be output are multiplied by a gain, and the arm control unit 113 controls the position and the orientation of the arm 102. At this time, the arm control unit 113 adjusts the magnitude of the gain value so as to be capable of adjusting the stiffness.

Further, when the stiffness is reduced and the touch panel display 303 is moved, the impedance control or the damping control may be used in the arm control unit 113. On the other hand, when the stiffness is heightened, a plurality of control methods can be combined in the arm control unit 113 in such a manner that the position control is used in the arm control unit 113 in order to allow the touch panel display 303 to remain on that position.

When the stiffness is set high by the arm control unit 113 for the touching manipulation, the person 301 can be notified of the setting of the high stiffness by lighting a lamp or generating a sound through an output unit 114B. When the person 301 is notified of the setting of the stiffness in such a manner, the person 301 can perform the touching manipulation safely, or collision of the person 301 with the touch panel display 303 can be reduced.

On the other hand, the input information acquiring unit 116 acquires input information from the input/output IF 114. The input information means information that is input into the input information acquiring unit 116 by the person 301 through the input/output IF 114.

One example of the input information is switching information about powering on/off of the touch panel display 303.

Another example of the input information is proficiency information. The proficiency information is information about use history that the person 301 uses the arm control apparatus 103 in the first embodiment. For example, the person 301 selects one of three choices including the use histories "0 to 1 month", "2 to 5 months", and "6 or more months", and inputs the proficiency information into the input information acquiring unit 116 through the input/output IF 114.

Figure 18A:
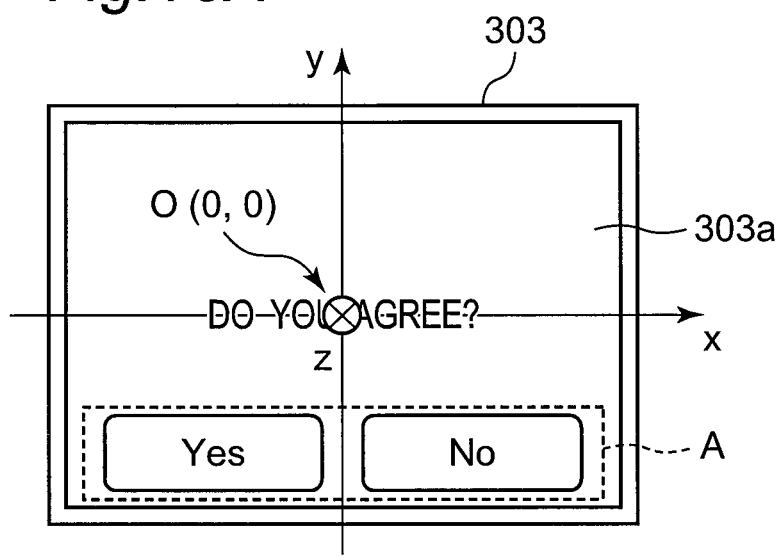
FIG. 18A is an explanatory view illustrating proficiency in the robot according to the first embodiment.
Figure 18B:
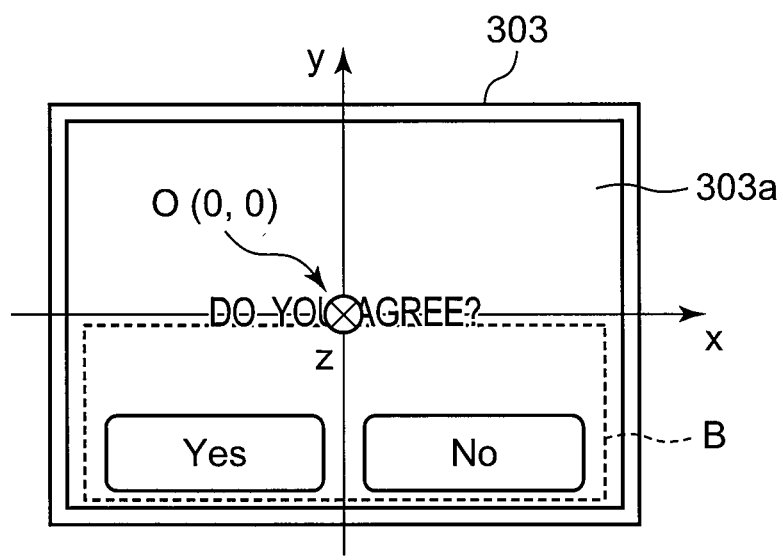
FIG. 18B is an explanatory view illustrating proficiency in the robot according to the first embodiment.
Figure 18C:
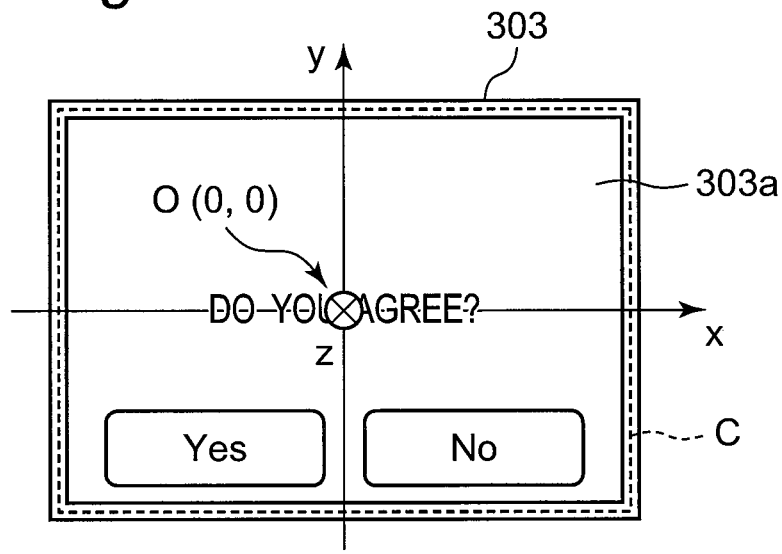
FIG. 18C is an explanatory view illustrating proficiency in the robot according to the first embodiment.
Figure 18D:
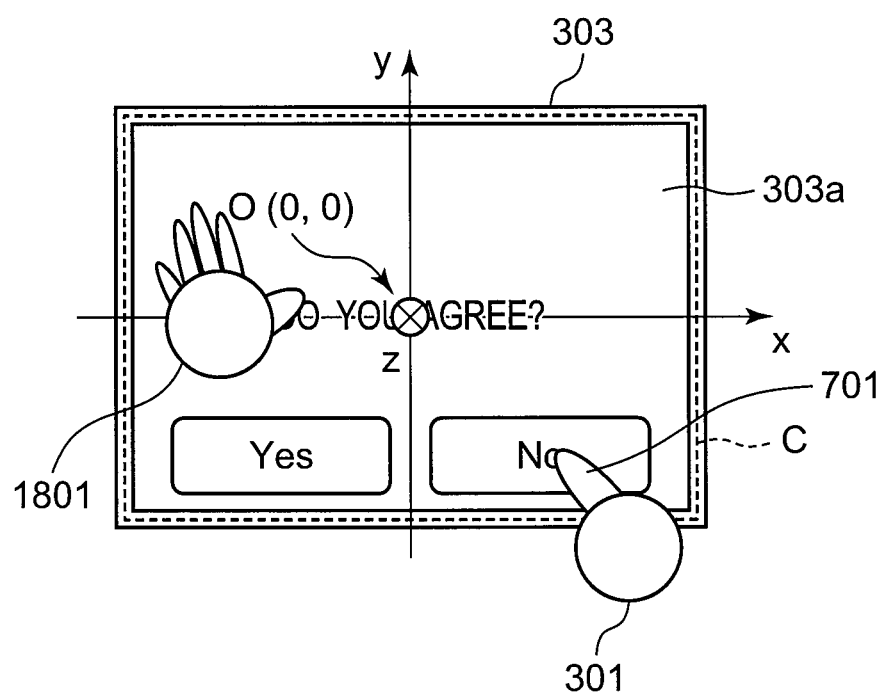
FIG. 18D is an explanatory view illustrating proficiency in the robot according to the first embodiment.
Figure 18E:
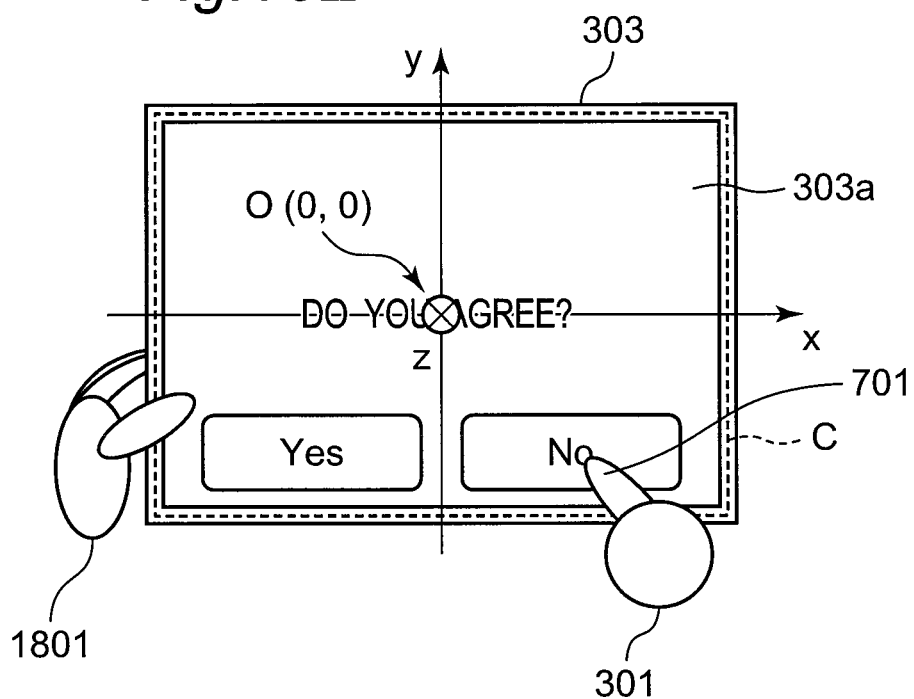
FIG. 18E is an explanatory view illustrating proficiency in the robot according to the first embodiment.

The touch pattern estimating unit 110 adjusts the position information in the contactable range based on the proficiency information input into the input information acquiring unit 116. For example, the position information in the contactable range on the display portion 303a of the touch panel display 303 is made to be wider for the person 301 whose use history is short in comparison with the person 301 whose use history is long. As a result, when the person 301 whose use history is short performs the touching manipulation, the person 301 can cope with an unaccustomed state such that the touching manipulation is performed while a portion other than the display portion 303a (for example, an outer frame portion that surrounds the display portion 303a of the touch panel display 303) is being touched. The description is concretely given with reference to FIG. 18A to FIG. 18C. A range indicated by a reference symbol A in FIG. 18A is the position information in the contactable range for the person 301 whose use history is "6 months or more". The position information in the contactable range about the person 301 is information about a position to be likely touched by the person 301 with the finger 701, and more concretely, a coordinate value of the range likely to be touched. The person 301 whose use history is long is accustomed to the touching manipulation, and thus seldom touches a portion other than the selected portion. For this reason, the position information in the contactable range can be narrowed (namely, the range likely to be touched can be narrowed). A range indicated by a reference symbol B in FIG. 18B is the position information in the contactable range about the person 301 whose use history is "2 to 5 months". A range indicated by a reference symbol C in FIG. 18C is the position information in the contactable range about the person 301 whose use history is "0 to 1 month". Since the person 301 whose use history is short is not accustomed to the touching manipulation, the person 301 occasionally performs the touching manipulation while holding a part of the display portion 303a with a hand that is not used for the touching manipulation. For example as shown in FIG. 18D and FIG. 18E, even in a state that a part of the display portion 303a, or the outer frame and a part of the display portion 303a are held with a hand 1801 that is not the hand 701 performing the touching manipulation, the touch panel display 303 does not move. For this reason, the touching manipulation is enabled.

The proficiency information is acquired by input from the person in the above, but the touch pattern estimating unit 110 may store the number of times at which the touch panel display 303 is powered on or the number of times at which the touch panel display is touched so as to be capable of estimating the proficiency information.

<Description about Peripheral Devices>

The input/output IF 114 outputs the motion information input form the arm control unit 113 to the motor driver 115. Further, the position information and orientation information about the arm 102 are obtained by calculating units inside the encoders based on input values obtained by the encoders 102E of the respective axes of the arm 102, and then, are input into the input/output IF 114. The position information and orientation information input into the input/output IF 114 and the time information from the timer built in the input/output IF 114 are output from the input/output IF 114 to the motion information acquiring unit 106.

Figure 19:
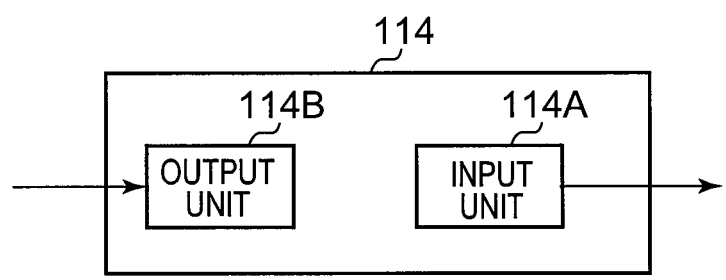
FIG. 19 is a block diagram illustrating an input/output IF in the robot according to the first embodiment.

The input/output IF 114 is composed of an input unit 114A and an output unit 114B as shown in FIG. 19. The input unit 112A is an input IF, and the input IF is used when the person 301 selects an item through a keyboard, a mouse, a touch panel display, or voice input, or the person 301 inputs numerical values through a keyboard, a mouse, a touch panel display, or voice input. The output unit 114B is an output IF, and the output IF is used when the acquired information is output to the outside or is displayed on a display. The output unit 114B is composed of a display, a speaker, or a lamp, and the output unit 114B can output the acquired information to the outside through display, voice, illuminating of light, or flickering of light.

The motor driver 115 outputs command values of the axes of the arm 102 to the motors 102M, to the arm 102 in order to control the arm 102 based on the motion information and stiffness parameter information acquired from the input/output IF 114.

<Description about the Arm>

The motion information about the arm 102 is obtained by the calculating units inside the encoders 102E of the arm 102 at every certain constant time (for example, every 1 ms) using the timer built in the input/output IF 114 in the arm 102 and then is output to the input/output IF 114. Further, the motors 102M of the axes of the arm 102 are controlled according to command values from the motor driver 115.

Figure 20:
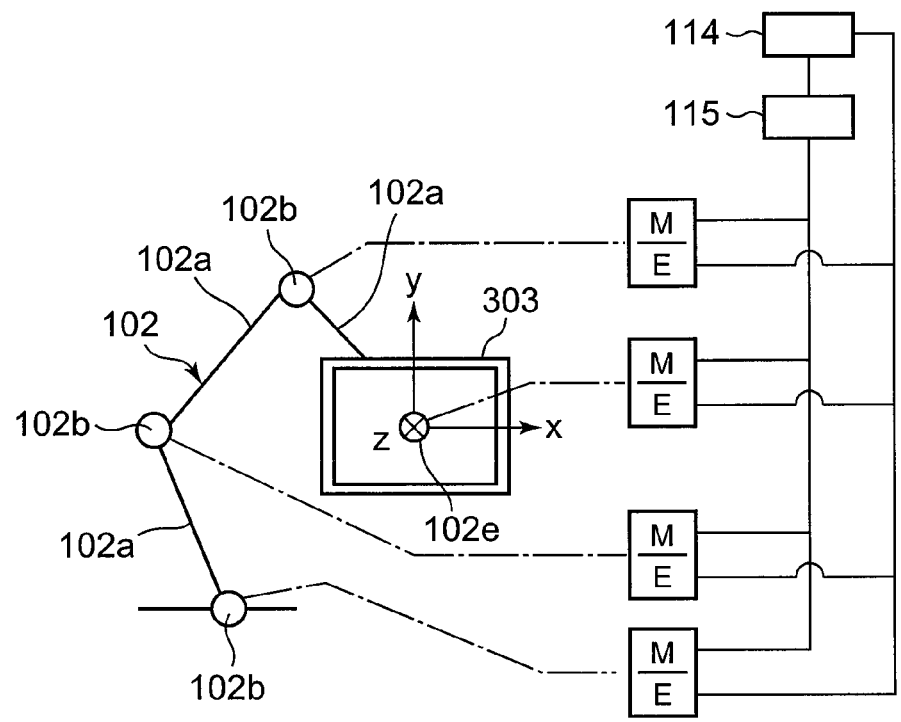
FIG. 20 is an explanatory view illustrating the arm in the robot according to the first embodiment.

The motor 102M and the encoder 102E are disposed at each joint of the arm 102. More concretely, each joint portion 102b for jointing the arm members 102a of the arm 102 is provided with a rotation driving device such as the motor 102M for driving the joint portion, and the encoder 102E (actually, disposed inside each of the joint portions 102b of the arm 102) for detecting each rotational phase angle (namely, a joint angle) of each rotational shaft of each motor 102M and calculating the position information and the orientation information using each of the internal calculating units so as to output them. The motor 102M (actually, disposed inside each of the joint portions 102b of the arm 102) is provided to one of a pair of the arm members 102a (for example, the arm member 102a on a turning side and the arm member 102a on a supporting side for supporting the arm member 102a on the turning side) composing each of the joint portions 102b, and is driven to be controlled by the motor driver 115. A rotational shaft of the motor 102M provided to one of the arm members 102a of each joint portion 102b is jointed to the other arm member 102a of each joint portion 102b, and the rotational shaft is rotated forward and reversely, so that the other arm member 102a can be rotated about each axis with respect to the one arm member 102a. In such a constitution, the motors 102M and the encoders 102E can control the arm 102 to desired position and orientation. A multi-link manipulator of six-degree-of-freedom having six joints is considered herein. The coordinate system of the arm tip portion 102e of the arm 102 is similar to the coordinate system of the touch panel display 303 according to a coordinate system shown in FIG. 20. The number of joints and the degree of freedom of the arm 102 are not limited to the numbers in the first embodiment, and can be any number of 1 or greater.

<Description about the Motion Procedure>

The motion procedure in the first embodiment is described. As an example of contents to be displayed, contents for reading texts are described.

An exemplary procedure for moving the arm 102 so as to adjust the stiffness through the arm control apparatus 103 according to contents is described with reference to FIG. 21A to FIG. 21G.

Figure 21A:
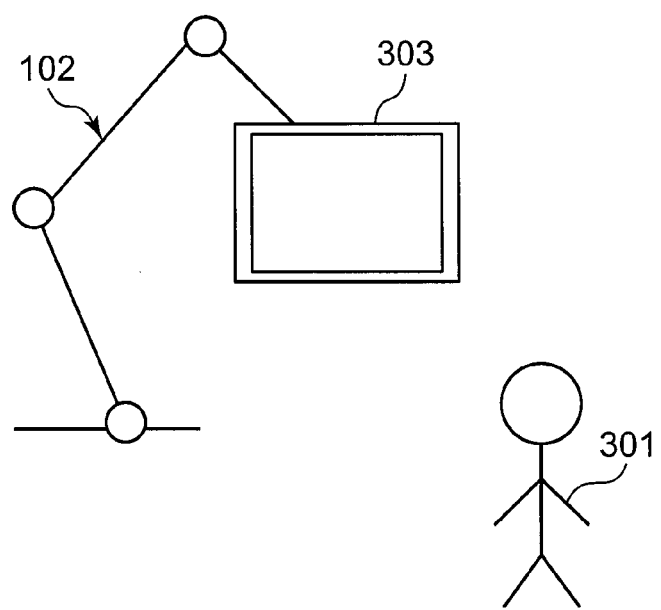
FIG. 21A is an explanatory view illustrating a motion procedure in the robot according to the first embodiment.

FIG. 21A illustrates a time point at which the touch panel display 303 is separated from the person 301. The power of the touch panel display 303 is off, and the stiffness parameter information generating unit 112 sets the stiffness of the arm 102 low on all the axes. This is because the initial value of the stiffness of the arm 102 is set low by the stiffness parameter information generating unit 112.

Figure 21B:
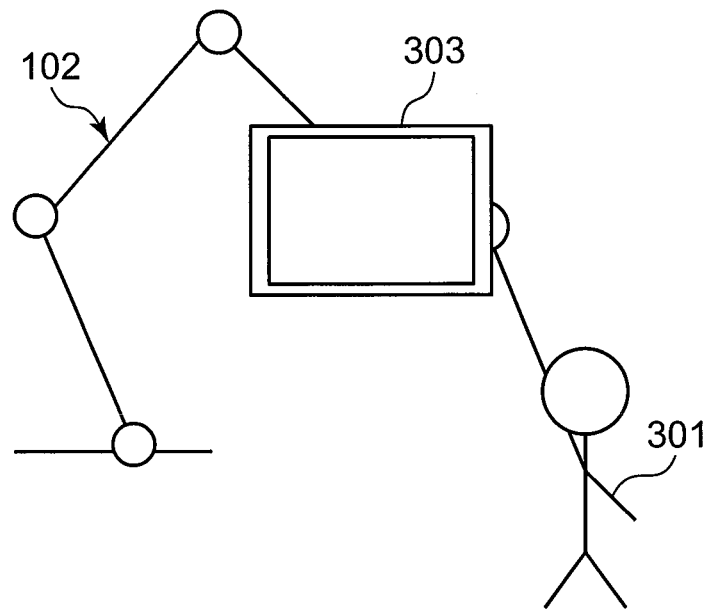
FIG. 21B is an explanatory view illustrating a motion procedure in the robot according to the first embodiment.

FIG. 21B illustrates a time point at which the person 301 holds a side portion of the touch panel display 303, and moves the touch panel display 303 to an easily viewable position. Since the stiffness parameter information generating unit 112 sets the stiffness of the arm 102 low on all the axes, the person 301 can move the touch panel display 303 to an easily viewable position with a light force.

Figure 21C:
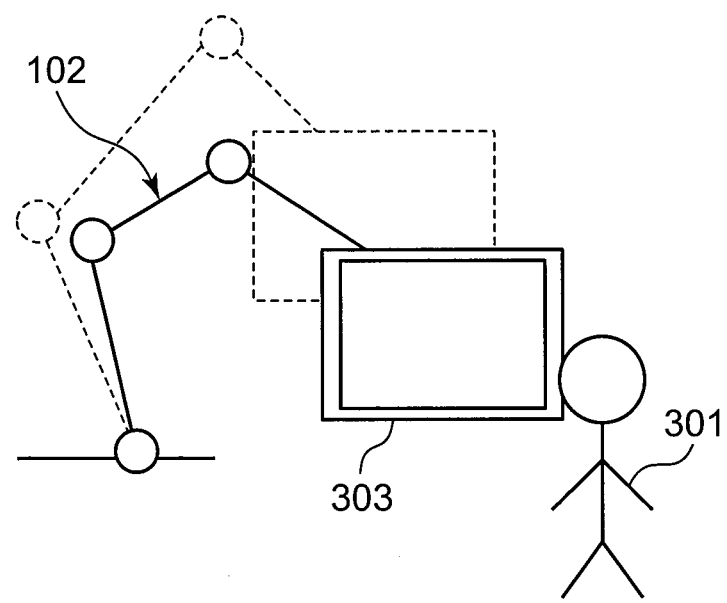
FIG. 21C is an explanatory view illustrating a motion procedure in the robot according to the first embodiment.

FIG. 21C illustrates a time point at which the person 301 has moved the touch panel display 303 to an easily viewable position.

Figure 21D:
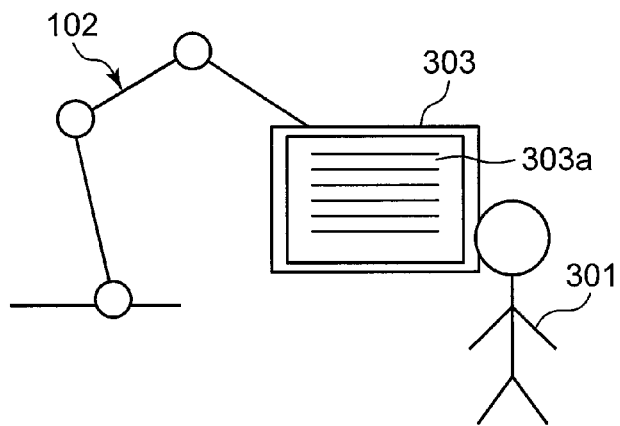
FIG. 21D is an explanatory view illustrating a motion procedure in the robot according to the first embodiment.

FIG. 21D illustrates a time point at which the person 301 has powered on the touch panel display 303. Since the contents for reading texts are displayed on the display portion 303a at this time, the stiffness parameter information generating unit 112 sets the stiffness high in the directions +x, −x, +z, +rx, −rx, +ry, −ry, +rz, and −rz. That is to say, every time when the contents are switched, the stiffness parameter information generating unit 112 switches the axis whose stiffness is to be set high.

Figure 21E:
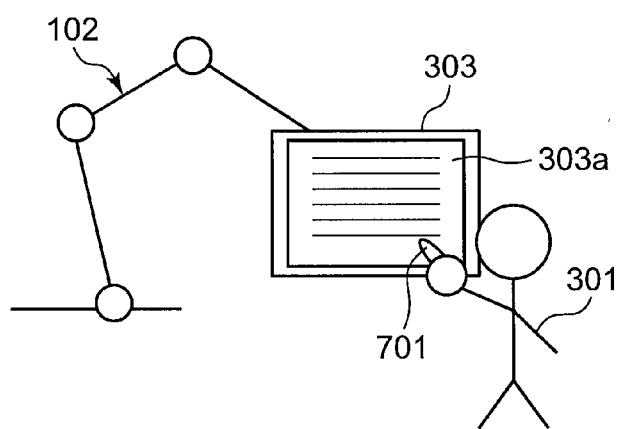
FIG. 21E is an explanatory view illustrating a motion procedure in the robot according to the first embodiment.

FIG. 21E illustrates a time point at which the person 301 touches the display portion 303a of the touch panel display 303. Since the stiffness is set high at the time point when the contents are displayed, the person 301 can touch the touch panel display 303 without moving the touch panel display 303 to the direction where the display portion 303a of the touch panel display 303 is pushed. Further, when the person 301 makes contact with a position other than the display portion 303a of the touch panel display 303, the stiffness parameter information generating unit 112 sets the stiffness low.

Figure 21F:
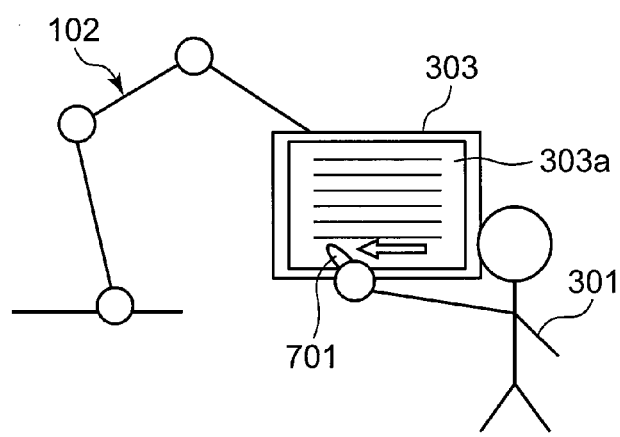
FIG. 21F is an explanatory view illustrating a motion procedure in the robot according to the first embodiment.

FIG. 21F illustrates a time point at which the person 301 performs the page turning manipulation on the display portion 303a of the touch panel display 303. Since the stiffness in the direction where the page turning manipulation is performed is set high by the stiffness parameter information generating unit 112 at the time point when the contents are displayed, the person 301 can perform the page turning manipulation on the display portion 303a without moving the touch panel display 303 to the direction where the person 301 pushes the display portion 303a of the touch panel display 303.

Figure 21G:
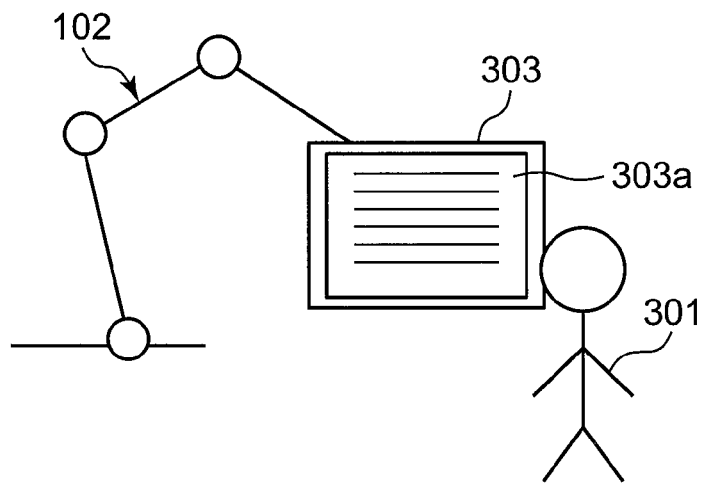
FIG. 21G is an explanatory view illustrating a motion procedure in the robot according to the first embodiment.

FIG. 21G illustrates a time point at which the person 301 reads displayed texts without touching the touch panel display 303. Since the contents of texts are displayed also at this time point, the stiffness parameter information generating unit 112 sets the stiffness high in the directions +x, −x, +z, +rx, −rx, +ry, −ry, +rz, and −rz. When the person 301 makes contact with a portion other than the display portion 303a of the touch panel display 303, the stiffness parameter information generating unit 112 sets the stiffness low.

As to the time point when the stiffness parameter information generating unit 112 sets the stiffness low, any method can be employed including a case where the stiffness is set low when contents not accompanying the touching manipulation are displayed or when a constant time passes after the setting of the high stiffness.

The stiffness parameter information generating unit 112 adjusts the stiffness of the arm 102 according to the contents, so that the person 301 can easily perform the manipulations.

<Flowchart>

The manipulation procedure of the control apparatus 103 of the arm 102 according to the first embodiment is described with reference to flowcharts in FIG. 22 and FIG. 23.

Figure 22:
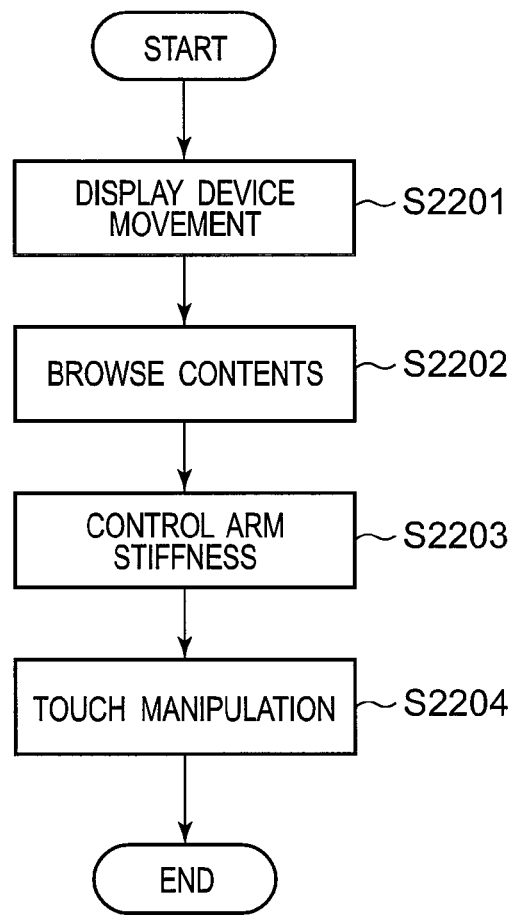
FIG. 22 is a flowchart illustrating a manipulation procedure of the control apparatus in the robot according to the first embodiment.

FIG. 22 illustrates one example of the manipulation of the control apparatus 103 of the arm 102 according to the first embodiment.

Finally, the person 301 moves the touch panel display 303 to easily viewable position and orientation at step S2201, and the sequence goes to step S2202.

Next, the person 301 views the contents displayed on the touch panel display 303 at step S2202, and the sequence goes to step S2203.

Next, the arm control unit 113 controls the stiffness of the arm 102 according to the contents information displayed on the touch panel display 303 at step S2203, and the sequence goes to step S2204. The contents on which the person 301 is likely to perform the touching manipulation are displayed, and the stiffness parameter information generating unit 112 sets the stiffness of the arm 102 high.

Next, the person 301 touches the display portion 303a of the touch panel display 303 at step S2204. Since the stiffness parameter information generating unit 112 sets the stiffness high at step S2203, the person 301 can touch the display portion 303a of the touch panel display 303 without moving the touch panel display 303.

Figure 23:
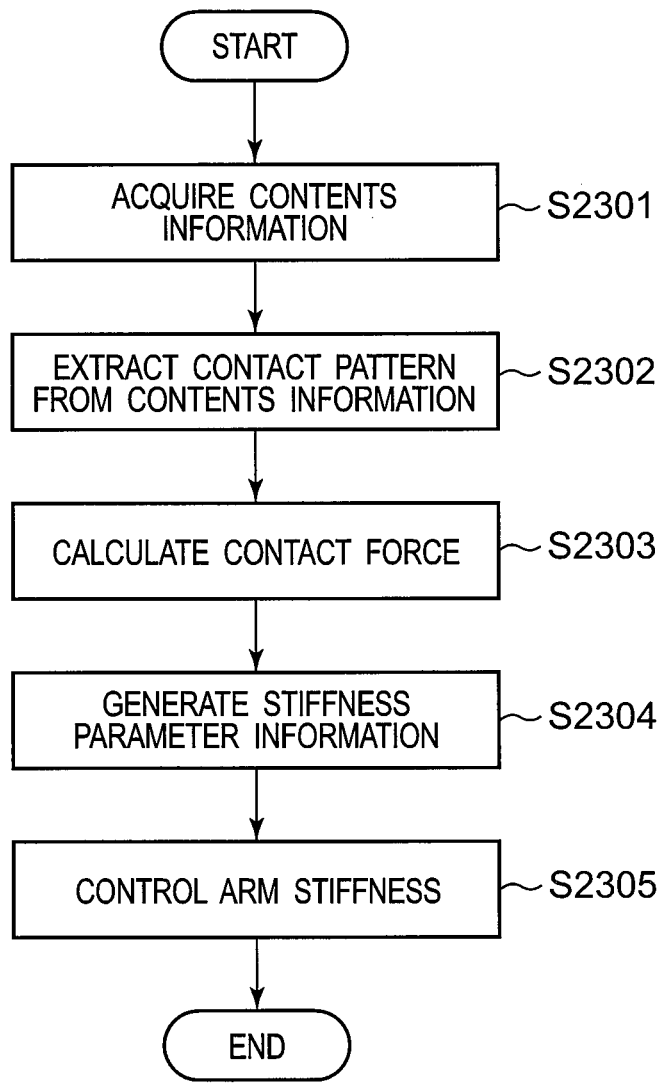
FIG. 23 is a flowchart illustrating the manipulation procedure of the control apparatus in the robot according to the first embodiment.

In FIG. 23, the control of the arm stiffness at step S2203 in the flowchart shown in FIG. 22 is described in detail.

Firstly, the touch pattern estimating unit 110 acquires the contents information from the display information acquiring unit 108 at step S2301, and the sequence goes to step S2302.

Next, the touch pattern estimating unit 110 estimates the position information and the direction information at step S2302 in the contactable range of a position likely to be touched by the person 301 based on the contents information acquired from the display information acquiring unit 108 and the information from the display information database 109. The estimated position information and direction information are output from the touch pattern estimating unit 110 to the load estimating unit 111, and the sequence goes to step S2303.

Next, the load estimating unit 111 calculates a force and a torque to be applied to the touch panel display 303 at step S2303 based on the position information and the direction information in the contactable range acquired from the touch pattern estimating unit 110. The calculated force and torque are output from the load estimating unit 111 to the stiffness parameter information generating unit 112, and the sequence goes to step S2304.

Next, the stiffness parameter information generating unit 112 generates the stiffness parameter information at step S2304 based on the values of the force and the torque obtained from the load estimating unit 111, and the sequence goes to step S2305.

Next, the arm control unit 113 controls the stiffness of the arm 102 at step S2305 via the input/output IF 114 and the motor driver 115 according to the stiffness parameter information acquired from the stiffness parameter information generating unit 112.

<<Effect of the First Embodiment>>

When the stiffness parameter information generating unit 112 adjusts the stiffness of the arm 102 according to the contents, the person 301 can move the touch panel display 303 with a light force. When the person 301 touches to manipulate the display portion 303a, the stiffness parameter information generating unit 112 sets the stiffness high so that the person 301 can touch the display portion 303a without moving the touch panel display 303 to the direction where the person 301 pushes the touch panel display 303. Therefore, the maneuverability of the touch panel display 303 can be improved.

(Second Embodiment)

Figure 24:
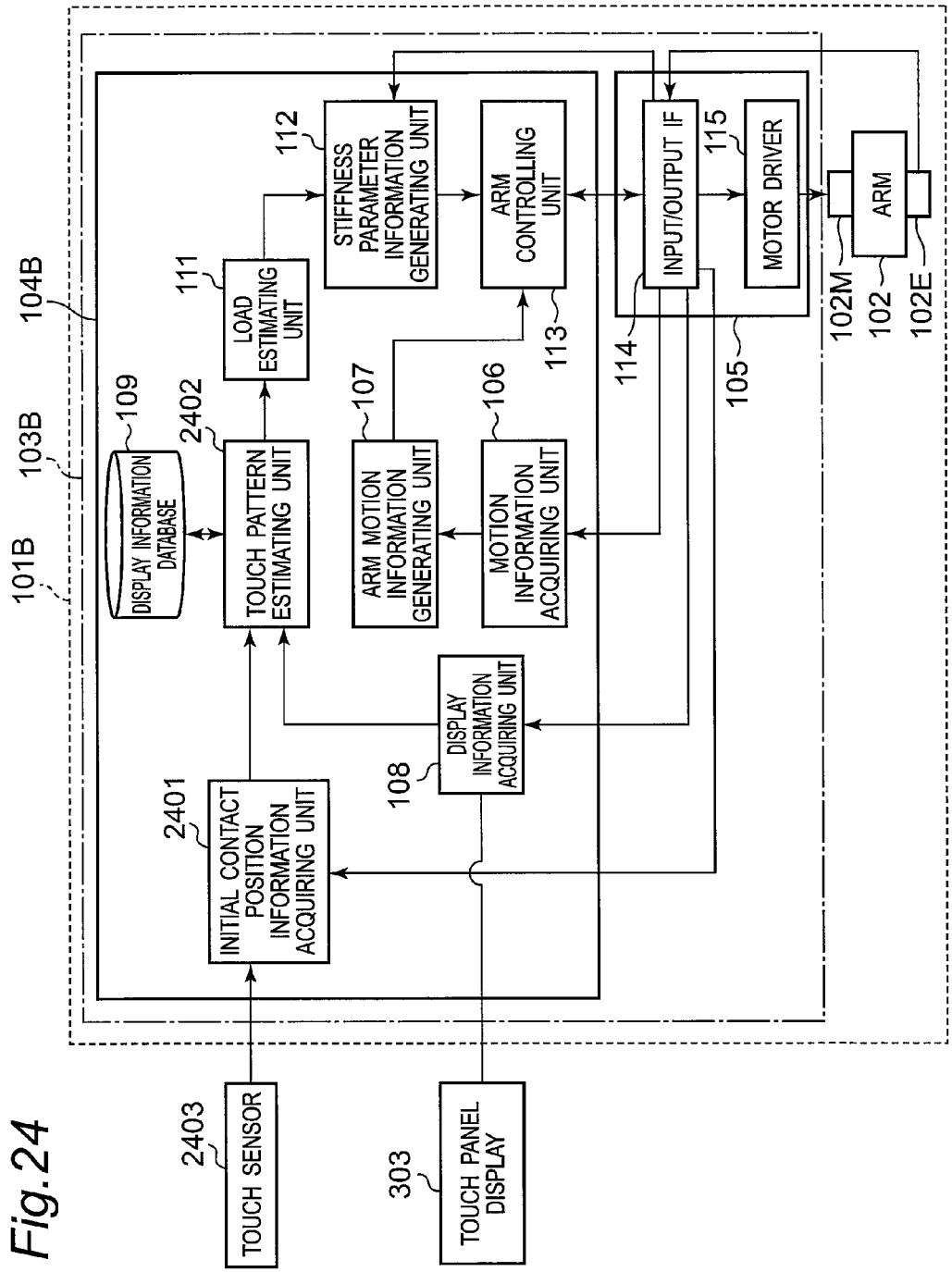
FIG. 24 is a block diagram illustrating an arm in a robot according to a second embodiment.

FIG. 24 is a block diagram illustrating a robot 101B according to a second embodiment of the present disclosure. In the robot 101B according to the second embodiment of the present disclosure, the arm 102, the peripheral device 105, the motion information acquiring unit 106 in a control apparatus main body 104B of a control apparatus 103B, the arm motion information generating unit 107, the load estimating unit 111, the stiffness parameter information generating unit 112, and the arm control unit 113 are similar to those in the first embodiment. For this reason, members common with those in the first embodiment are denoted by the same reference symbols, the description thereof is omitted, and only different portions are described in detail below.

A touch sensor 2403 is attached to the display portion 303a of the touch panel display 303, and the touch sensor 2403 detects a touched position on the display portion 303a according to a coordinate system in FIG. 13A. The position information in the contactable range detected by the touch sensor 2403 is output to an initial contact position information acquiring unit 2401 via an input/output IF 114.

The touch panel display 303 having the touch sensor 2403 can be realized by using, for example, an electrostatic capacity type touch panel display.

Contact position information from the input/output IF 114, and time information from a timer built in the input/output IF 114 are input into an initial contact position information acquiring unit 2401. The contact position information input from the input/output IF 114 is, for example, information shown in FIG. 25. A touched case is indicated by 1, and an untouched case is indicated by 0.

The initial contact position information acquiring unit 2401 generates initial contact position information based on the contact position information input from the input/output IF 114. In a method for generating the initial contact position information, under a condition is that a state where no touch occurs on entire position is detected at a previous time point in the contact position information input from the input/output IF 114, and the initial contact position information acquiring unit 2401 detects a position that is touched in the state that no touch occurs on the entire position.

As one example, when the contact position information shown in FIG. 25 is input, the contact position information indicates 0 on the entire position at time 2443 (ms), and the contact position information indicates 1 on the position (0, 1) at next time 2444 (ms). For this reason, the initial contact position information acquiring unit 2401 detects the position (0, 1) as the initial contact position information. Since the above condition is not fulfilled at the other time, the initial contact position information acquiring unit 2401 does not detect the initial contact position information.

Figures 26, 27A:
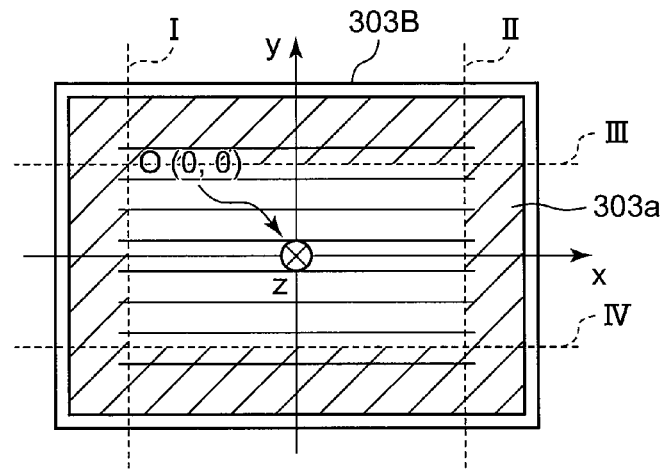
FIG. 26 is an explanatory view illustrating data of initial contact position information in the robot according to the second embodiment.
FIG. 27A is an explanatory view illustrating estimation of a contact pattern (page turning) in the robot according to the second embodiment.

FIG. 26 illustrates the initial contact position information that is generated by the initial contact position information acquiring unit 2401 when the initial contact position information acquiring unit 2401 detects the contact position information shown in FIG. 25. When initial contact occurs here, the initial contact position information indicates 1, and when no initial contact occurs, the initial contact position information indicates 0.

The initial contact position information generated by the initial contact position information acquiring unit 2401, and the time information are output from the initial contact position information acquiring unit 2401 to a touch pattern estimating unit 2402.

The touch pattern estimating unit 2402 is provided to the control apparatus 103B of the arm instead of the touch pattern estimating unit 110 according to the first embodiment, and has a function for estimating a subsequent contact pattern based on the initial contact position information acquired from the initial contact position information acquiring unit 2401 in addition to the function of the touch pattern estimating unit 110 in the first embodiment. The added function is described below.

The touch pattern estimating unit 2402 acquires the initial contact position information and the time information from the initial contact position information acquiring unit 2401. The touch pattern estimating unit 2402 estimates the subsequent contact pattern based on the initial contact position information acquired from the initial contact position information acquiring unit 2401. As to difference from the first embodiment, the touch pattern estimating unit 110 estimates the position and direction information based only on the contents information in the first embodiment, but the touch pattern estimating unit 2402 estimates the position and direction information based on the initial contact position information in addition to the contents information in the second embodiment. For this reason, only limited information can be estimated more accurately. In other words, the initial contact position information acquiring unit 2401 acquires a position that is first touched by the person 301, and the touch pattern estimating unit 110 estimates a subsequent contact pattern. Concretely, the initial contact position information acquiring unit 2401 acquires the position that is first touched in the state that the person 301 does not touch the screen 303a, and then, the touch pattern estimating unit 110 estimates position information about a position likely to be touched by the person 301 based on the initial contact position acquired from the initial contact position information acquiring unit 2401.

As an example of an estimating method in the touch pattern estimating unit 2402, the page turning manipulation is described.

Firstly, the touch pattern estimating unit 2402 acquires a text shown in FIG. 7C from the display information acquiring unit 108 as the contents information. The touch pattern estimating unit 2402 derives a condition using a threshold value based on the contents information acquired from the display information acquiring unit 108. As one example, the touch pattern estimating unit 2402 sets straight lines of threshold values I to IV shown in FIG. 27A on the display portion 303a.

The threshold value I is a straight line of $x=-150$ (a vertical dotted line with a reference symbol I). The touch pattern estimating unit 2402 limits the direction information about the x direction to +x direction in the case of $x<-150$ (region indicated by slanted lines) in the initial contact position information, and deletes the direction information about the $-x$ direction. This is because when a left end portion on the touch panel display 303 is first touched for the page turning manipulation, the touch pattern estimating unit 2402 can estimate that the page turning is carried out in the +x direction.

Similarly, the threshold value II is a straight line of $x=150$ (vertical dotted line with a reference symbol II). The touch pattern estimating unit 2402 limits the direction information about the x direction to the $-x$ direction and deletes the direction information about the +x direction in the case of $x>150$ (region of slated lines) in the initial contact position information.

The threshold value III is a straight line of $y=100$ (a horizontal dotted line with a reference symbol III). The touch pattern estimating unit 2402 limits the position information about y to +y and deletes the position information about $-y$ in the case of $y>100$ (a region of slanted lines) in the initial contact position information. This is because when an upper end portion of the display portion 303a on the touch panel display 303 is first touched in the page turning manipulation, the page turning manipulation is seldom performed in the y direction, and thus the touch pattern estimating unit 2402 can estimate the range of +y.

Similarly, the threshold value IV is a straight line of $y=-100$ (horizontal dotted line with a reference symbol IV). The touch pattern estimating unit 2402 limits the position information about y to $-y$ and deletes the position information about +y in the case of $y<-100$ (the range of the slated lines) in the initial contact position information.

Figure 27B:
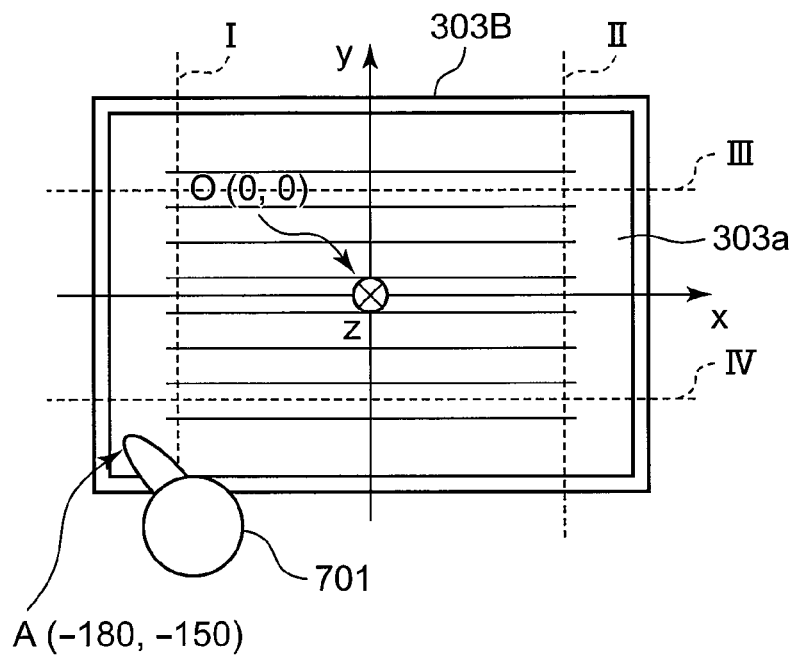
FIG. 27B is an explanatory view illustrating estimation of a contact pattern (page turning) in the robot according to the second embodiment.
Figure 27C:
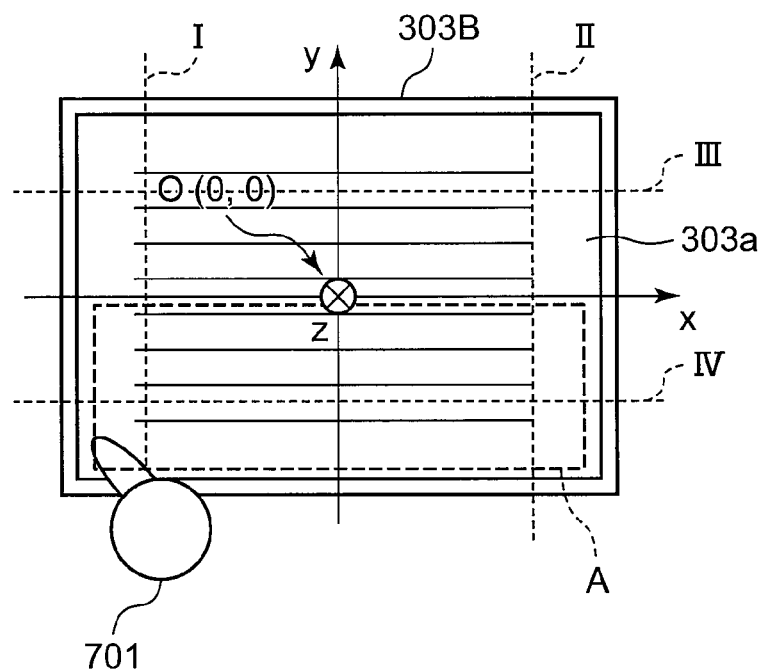
FIG. 27C is an explanatory view illustrating estimation of a contact pattern (page turning) in the robot according to the second embodiment.

A contact pattern estimated in the second embodiment is compared with the contact pattern estimated in the first embodiment. As one example, when the initial contact position of the hand 701 of the person 301 is a position A (−180, −150) shown in FIG. 27B, the initial contact position fulfills the condition about the threshold value I and the condition about the threshold value IV in the second embodiment. For this reason, the position information is a region (−x to +x, −y) shown by a reference symbol A in FIG. 27C, and the direction information is the +x direction in the touch pattern estimating unit 2402. On the other hand, in the first embodiment, the position information is a region (−x to +x, −y to +y) shown by the reference symbol A in FIG. 7D and the direction information is the +x direction and the −x direction in the touch pattern estimating unit 2402. It is found from this result that when the added function in the second embodiment is used, the information to be estimated can be limited in comparison with the case in the first embodiment.

Further, also in the other manipulations, only limited information can be estimated accurately in such a manner that the enlargement or reduction manipulation is limited to either the enlargement manipulation or the reduction manipulation.

<Flowchart>

Figure 28:
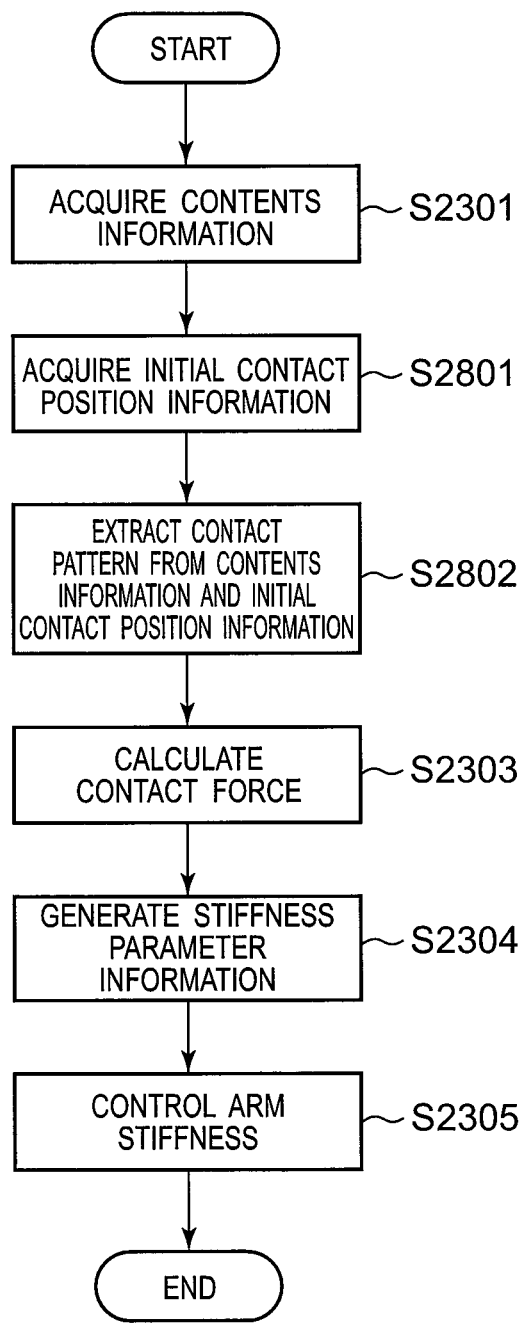
FIG. 28 is a flowchart illustrating the manipulation procedure of the control apparatus in the robot according to the second embodiment.

The manipulation procedure of the control apparatus 103B of the arm 102 according to the second embodiment is described with reference to a flowchart in FIG. 28.

One example of the manipulation in the control apparatus 103B of the arm 102 according to the second embodiment is similar to that in FIG. 22. Control of the stiffness of the arm at step S2203 in the flowchart shown in FIG. 22 is described with reference to FIG. 28.

Firstly, the touch pattern estimating unit 2402 acquires the contents information from the display information acquiring unit 108 at step S2301, and the sequence goes to step S2801.

Next, the touch pattern estimating unit 2402 acquires the initial contact position information from the initial contact position information acquiring unit 2401 at step S2801, and the sequence goes to step S2802.

Next, the touch pattern estimating unit 2402 estimates the position information and the direction information about of a position likely to be touched by the person 301 and outputs the information to output them to the load estimating unit Mat step S2802 based on the contents information acquired from the display information acquiring unit 108, the initial contact position information acquired from the initial contact position information acquiring unit 2401, and the information in the display information database 109, and the sequence goes to step S2303.

Next, the load estimating unit ill calculates the force and the torque to be applied to the touch panel display 303 based on the position information and the direction information acquired from the touch pattern estimating unit 2402 and outputs them to the stiffness parameter information generating unit 112 at step S2303, and the sequence goes to step S2304.

Next, the stiffness parameter information generating unit 112 generates the stiffness parameter information at step S2304 based on the values of the force and the torque obtained from the load estimating unit 111, and the sequence goes to step S2305.

Next, the arm control unit 113 controls the stiffness of the arm 102 via the input/output IF 114 and the motor driver 115 according to the stiffness parameter information acquired from the stiffness parameter information generating unit 112 at step S2305.

<<Effect of Second Embodiment>>

The stiffness parameter information generating unit 112 adjusts the stiffness of the arm 102 according to the initial contact position of the person 301 in addition to the contents so that the stiffness can be accurately adjusted only on the limited axes. Therefore, the maneuverability of the touch panel display 303 can be improved.

(Third Embodiment)

In the first embodiment, the load estimating unit 111 calculates the force and the torque to be applied to the touch panel display 303 based on the position information in the contactable range estimated by the touch pattern estimating unit 110, and generates the stiffness parameter information about the arm 102 based on the calculated force and the torque. On the contrary, in the third embodiment, the stiffness parameter information about the arm 102 is generated based on the position information in the contactable range estimated by the touch pattern estimating unit 110. That is to say, the load estimating unit ill is not provided, and the stiffness parameter information is generated by a simple method.

Figure 32:
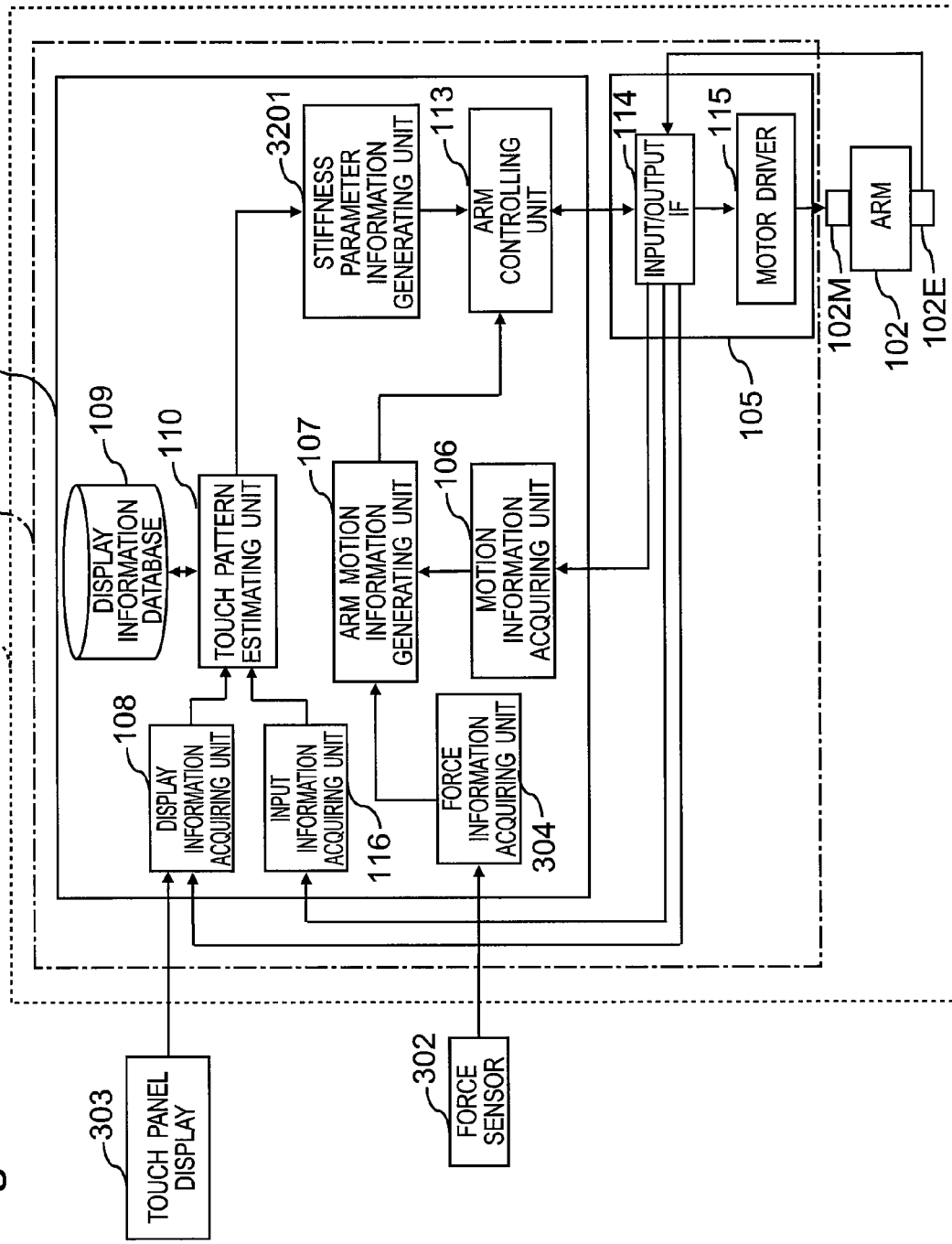
FIG. 32 is a block diagram illustrating an arm in a robot according to a third embodiment.

FIG. 32 is a block diagram illustrating a robot 101C according to a third embodiment of the present disclosure. In the robot 101C according to the third embodiment of the present disclosure, the robot arm 102, the peripheral device 105, the motion information acquiring unit 106, the arm motion information generating unit 107, the display information acquiring unit 108, the display information database 109, the touch pattern estimating unit 110, the arm control unit 113, the input information acquiring unit 116, and a force information acquiring unit 304 in a control apparatus main body 104C are similar to those in the first embodiment. For this reason, the common portions are denoted by the same reference symbols, the description thereof are omitted, and only different portions are described in detail below.

A stiffness parameter information generating unit 3201 acquires position information in a contactable range estimated by the touch pattern estimating unit 110 from the touch pattern estimating unit 110. The stiffness parameter information generating unit 3201 generates a stiffness parameter of the arm 102 based on the position information in the contactable range acquired from the touch pattern estimating unit 110 so that the orientation of the touch panel display 303 does not change when the person 301 makes contact with the touch panel display 303.

A method for generating the stiffness parameter information in the stiffness parameter information generating unit 3201 is described. The stiffness parameter information generating unit 3201 does not change the stiffness in the position information acquired from the touch pattern estimating unit 110 when the position information indicates 0 on the entire position, and sets the stiffness high in all the directions when the position information indicates 1 on at least one position. That is to say, the stiffness parameter information generating unit 3201 does not change the stiffness when contact is unlikely to occur based on the position information estimated by the touch pattern estimating unit 110, and sets the stiffness high in all the directions when contact is likely to occur. A method for setting the stiffness high is similar to that in the first embodiment.

The stiffness parameter information generating unit 3201 generates the stiffness parameter information based on the position information in the touch pattern estimating unit 110, so that the stiffness can be heightened when touch is likely to occurs, and the stiffness can be prevented from being changed when touch is unlikely to occur, by a simple method.

<Flowchart>

Figure 33:
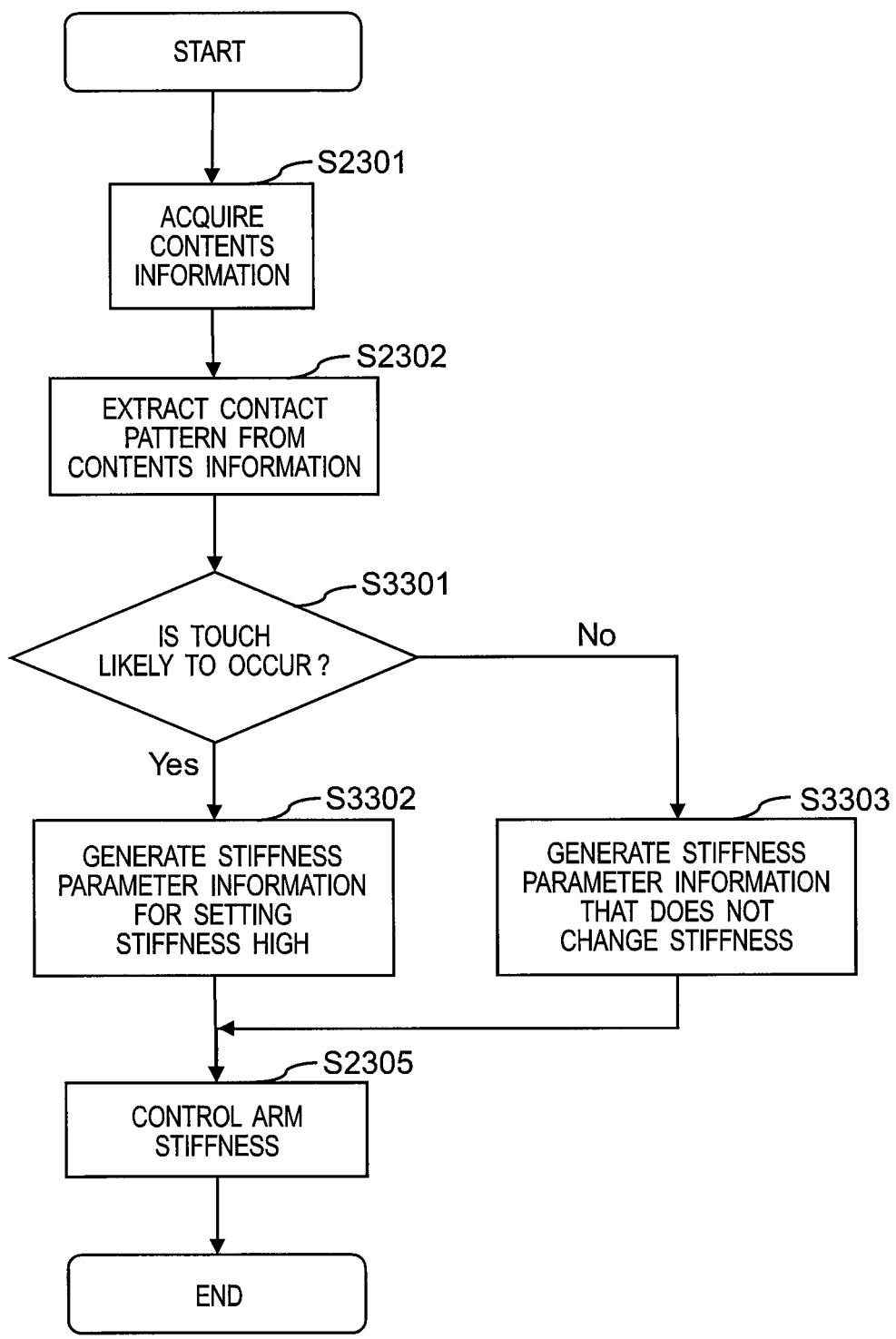
FIG. 33 is a flowchart illustrating a manipulation procedure of a control apparatus in the robot according to the third embodiment.

A manipulation procedure of the control apparatus 103C of the arm 102 according to the third embodiment is described with reference to a flowchart of FIG. 33.

One example of the manipulation in the control apparatus 103C of the arm 102 according to the third embodiment is similar to that in FIG. 22. Control of the arm stiffness at step S2203 in the flowchart shown in FIG. 22 is described with reference to FIG. 33.

Firstly, the touch pattern estimating unit 110 acquires the contents information from the display information acquiring unit 108 at step S2301, and the sequence goes to step S2302.

Next, the touch pattern estimating unit 110 estimates the position information and the direction information in the contactable range of a position likely to be touched by the person 301 at step S2302 based on the contents information acquired from the display information acquiring unit 108 and the information from the display information database 109. The estimated position information and the direction information are output from the touch pattern estimating unit 110 to the stiffness parameter information generating unit 3201, and the sequence goes to step S3301.

Next, the stiffness parameter information generating unit 3201 decides the likelihood of the touch at step S3301 based on the position information and the direction information in the contactable range acquired from the touch pattern estimating unit 110. When the stiffness parameter information generating unit 3201 decides that touch is likely to occur, the sequence goes to step S3302. When the stiffness parameter information generating unit 3201 decides that touch is unlikely to occur, the sequence goes to step S3303.

Next, the stiffness parameter information generating unit 3201 generates the stiffness parameter information at step S3302 so that the stiffness is set high in all the directions, and the sequence goes to step S2305.

Next, the stiffness parameter information generating unit 3201 generates the stiffness parameter information at step S3303 so that the stiffness does not change, and the sequence goes to step S2305.

Next, the arm control unit 113 controls the stiffness of the arm 102 at step S2305 via the input/output IF 114 and the motor driver 115 according to the stiffness parameter information acquired from the stiffness parameter information generating unit 3201.

<<Effect of the Third Embodiment>>

Since the stiffness parameter information generating unit 3201 generates the stiffness parameter information based on the information about the likelihood of touch estimated by the touch pattern estimating unit 110, the maneuverability of the touch panel display 303 can be improved by a simple method.

An example where the touch panel display 303 is integral with the arm 102 is described, but a mode such that the touch panel display 303 is attachable to the arm 102 can be employed. For example, such a mode can be used in a case where the touch panel display 303 is a mobile device with a touch panel display, such as a tablet or a smart phone.

In the first to third embodiments, the stiffness adjustment amount obtained by the stiffness parameter information generating unit 112 is desirably set so that when interaction takes place between the person 301 and the touch panel display 303, the movement of the touch panel display 303 is set to be within a sufficiently small range. The stiffness adjustment amount is helpful to be set particularly depending on the state of the touch panel display 303 with respect to the person 301. For example as shown in FIG. 16, even in the same touching manipulation or the keyboard manipulation, the force to be applied to the touch panel display 303 varies depending on a positional relationship between the person 301 and the touch panel display 303. Therefore, an adjustment amount of the stiffness is helpful to be changed by the stiffness parameter information generating unit 112 in advance according to environments where the touch panel display 303 with the arm is used. As one example of the adjusting method, the person 301 can perform input into the stiffness parameter information generating unit 112 using the input/output IF 114.

Though the present disclosure has been described above based on the above first to third embodiments and modifications, the present disclosure should not be limited to the above-described first to third embodiments and modifications For example, the present disclosure also includes the following cases.

Part or entirety of each of the above-described control apparatuses is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the apparatus according to each of the above-mentioned embodiments is a following program. That is to say, this program has a computer execute the sections (parts/units) defined in claims. The program has a computer execute the units/steps defined in claims. That is, such a program is an arm control program for controlling a position and an orientation of a touch panel display, the program making a computer to execute:

a step of acquiring information to be displayed on a screen of the touch panel display through a display information acquiring unit;

a step of estimating a region on the screen likely to be touched by a person and a motion direction of the touch through a touch pattern estimating unit based on the information acquired by the display information acquiring unit;

a step of generating information for controlling the arm so that the position and the orientation of the touch panel display do not change along a touching direction at a touch panel input time through a stiffness parameter information generating unit based on the region and the motion direction estimated by the touch pattern estimating unit; and a step of controlling a stiffness parameter of the arm through an arm control unit based on the information generated by the stiffness parameter information generating unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment (s) or modification(s) of the aforementioned various embodiments and modifications, the effects possessed by the embodiment (s) or modification(s) can be produced.

INDUSTRIAL APPLICABILITY

In the arm control apparatus and the arm control method, the robot, the arm control program, and the integrated electronic circuit for arm control of the present disclosure, when the stiffness of the arm is adjusted according to contents, a person can move the touch panel display with a light force, and can touch the touch panel display without moving the touch panel display to a direction where the person pushes the touch panel display at the time of the touch. The arm control apparatus and the arm control method, the robot, the arm control program, and the integrated electronic circuit for arm control of the present disclosure are useful for an arm control apparatus, an arm control method, a robot, an arm control program, and an integrated electronic circuit for arm control in a household touch panel display with an arm. Further, the arm control apparatus, the arm control method, the robot, the arm control program, and the integrated electronic circuit for arm control of the present disclosure are not limited to a household device, and can be applied as an arm control apparatus, an arm control method, a robot, an arm control program, and an integrated electronic circuit for arm control in an industrial touch panel display with an arm or a medical touch panel display with an arm.

The entire disclosure of Japanese Patent Application No. 2012-256525 filed on Nov. 22, 2012, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. An arm control apparatus for controlling a position and an orientation of a touch panel display, the apparatus comprising:
   a display information acquiring unit that acquires information displayed on a screen of the touch panel display;
   a touch pattern estimating unit that estimates a region on the screen that is likely to be touched by a person and a motion direction of the touch based on the information acquired from the display information acquiring unit;
   a stiffness parameter information generating unit that generates information for controlling the arm based on the region and the motion direction estimated by the touch pattern estimating unit so that the position and the orientation of the touch panel display do not change along a touch direction at a touch panel input time; and
   an arm control unit that controls a stiffness parameter of the arm based on the information generated by the stiffness parameter information generating unit.

2. The arm control apparatus according to claim 1, further comprising:
   a load estimating unit that estimates a load or a torque with respect to the touch panel display based on the region and the motion direction estimated by the touch pattern estimating unit, wherein
   the stiffness parameter information generating unit generates the information for controlling the arm so that the position and the orientation of the touch panel display do not change along the touch direction at the touch panel input time based on the load or the torque estimated by the load estimating unit.

3. The arm control apparatus according to claim 2, wherein the touch pattern estimating unit estimates position information that changes while the person is touching and tracing the screen,
   the load estimating unit estimates information about at least one or more of:
   a force relating to a pushing force to be applied vertically to a surface of the screen and a frictional force to be applied horizontally to the surface of the screen based on the position information estimated by the touch pattern estimating unit;
   a torque whose axis is horizontal to the surface of the screen based on force information about the pushing force to be applied vertically to the surface of the screen and the position information; and
   a torque whose axis is vertical to the surface of the screen based on the force information about the frictional force to be applied horizontally to the surface of the screen and the position information.

4. The arm control apparatus according to claim 3, wherein the touch pattern estimating unit estimates position information that changes such that:
   (1) the person touches the screen;
   (2) a position on the screen which is touched by the person while being traced changes to any direction; and
   (3) the person separates from the screen,
   the load estimating unit estimates force information that changes such that:
   (1) a force for vertically pushing the surface of the screen and the torque whose axis is horizontal to the surface of the screen are applied;
   (2) the force for vertically pushing the surface of the screen, the frictional force to be horizontally applied to the surface of the screen, the torque whose axis is horizontal to the surface of the screen, and the torque whose axis is vertical to the surface of the screen are applied; and
   (3) no force is applied to the screen.

5. The arm control apparatus according to claim 3, wherein the touch pattern estimating unit estimates position information that changes such that:
   (1) the person multi-touches the screen;
   (2) positions on the screen multi-touched by the person change to a mutually separating direction; and
   (3) the person separates from the screen,
   the load estimating unit estimates force information that changes such that:
   (1) a force for vertically pushing the surface of the screen and the torque whose axis is horizontal to the surface of the screen are applied;
   (2) the force for vertically pushing the surface of the screen, the frictional force to be horizontally applied to the surface of the screen, the torque whose axis is horizontal to the surface of the screen, and the torque whose axis is vertical to the surface of the screen are applied; and
   (3) no force is applied to the screen.

6. The arm control apparatus according to claim 3, wherein the touch pattern estimating unit estimates position information that changes such that:
   (1) the person multi-touches the screen;
   (2) positions on the screen multi-touched by the person change to mutually approaching directions; and
   (3) the person separates from the screen,
   the load estimating unit estimates the force information that changes such that:
   (1) a force for vertically pushing the surface of the screen and the torque whose axis is horizontal to the surface of the screen are applied;
   (2) the force for vertically pushing the surface of the screen, the frictional force to be horizontally applied to the surface of the screen, the torque whose axis is horizontal to the surface of the screen, and the torque whose axis is vertical to the surface of the screen are applied; and
   (3) no force is applied to the screen.

7. The arm control apparatus according to claim 2, wherein the touch pattern estimating unit estimates position information at a time when the person repeatedly touches the screen of the display more than once, the load estimating unit estimates at least one or more pieces of information about:
a pushing force to be vertically applied to a surface of the screen and a force at a time when no force is applied to the screen based on the position information estimated by the touch pattern estimating unit; and
a torque whose axis is horizontal to the surface of the screen based on the force information about the pushing force to be vertically applied to the surface of the screen and the position information.

8. The arm control apparatus according to claim 7, wherein the touch pattern estimating unit estimates the position information that repeatedly changes more than once so that:
(1) the person touches the screen; and
(2) the person separates from the screen,
the load estimating unit estimates force information that changes such that:
(1) a force for vertically pushing the surface of the screen and the torque whose axis is horizontal to the surface of the screen are applied; and
(2) no force is applied to the screen.

9. The arm control apparatus according to claim 1, wherein the touch pattern estimating unit estimates all pieces of position information about positions likely to be touched when a plurality of candidates are present as manipulations that are likely to be performed by the person on the screen of the display.

10. The arm control apparatus according to claim 2, wherein the touch pattern estimating unit estimates all pieces of position information about positions likely to be touched when a plurality of candidates are present as manipulations that are likely to be performed by the person on the screen of the display.

11. The arm control apparatus according to claim 1, further comprising:
an initial contact position information acquiring unit that acquires a position on the screen to be initially touched by the person in an untouched state, wherein
the touch pattern estimating unit estimates position information of a position that is likely to be touched by the person based on the initial contact position acquired from the initial contact position information acquiring unit.

12. The arm control apparatus according to claim 2, further comprising:
an initial contact position information acquiring unit that acquires a position on the screen to be initially touched by the person in an untouched state, wherein
the touch pattern estimating unit estimates position information of a position that is likely to be touched by the person based on the initial contact position acquired from the initial contact position information acquiring unit.

13. A robot comprising:
the arm control apparatus according to claim 1 for controlling the arm; and
the arm.

14. A robot comprising:
the arm control apparatus according to claim 2 for controlling the arm; and
the arm.

15. A robot comprising:
the arm control apparatus according to claim 3 for controlling the arm; and
the arm.

16. An arm control method for controlling a position and an orientation of a touch panel display, the method comprising:
acquiring information to be displayed on a screen of the touch panel display through a display information acquiring unit;
estimating a region on the screen likely to be touched by a person and a motion direction of the touch through a touch pattern estimating unit based on the information acquired by the display information acquiring unit;
generating information for controlling the arm through a stiffness parameter information generating unit so that the position and the orientation of the touch panel display do not change along a touching direction at a touch panel input time based on the region and the motion direction estimated by the touch pattern estimating unit; and
controlling a stiffness parameter of the arm through an arm control unit based on the information generated by the stiffness parameter information generating unit.

17. A computer-readable recording medium including an arm control program for controlling a position and an orientation of a touch panel display, the program making a computer to execute:
a step of acquiring information to be displayed on a screen of the touch panel display through a display information acquiring unit;
a step of estimating a region on the screen likely to be touched by a person and a motion direction of the touch through a touch pattern estimating unit based on the information acquired by the display information acquiring unit;
a step of generating information for controlling the arm so that the position and the orientation of the touch panel display do not change along a touching direction at a touch panel input time through a stiffness parameter information generating unit based on the region and the motion direction estimated by the touch pattern estimating unit; and
a step of controlling a stiffness parameter of the arm through an arm control unit based on the information generated by the stiffness parameter information generating unit.

18. An integrated electronic circuit for arm control, that controls a position and an orientation of a touch panel display, the circuit configured to:
acquire information to be displayed on a screen of the touch panel display through a display information acquiring unit;
estimates a region on the screen likely to be touched by a person and a motion direction of the touch through a touch pattern estimating unit based on the information acquired by the display information acquiring unit;
generate information for controlling the arm through a stiffness parameter information generating unit so that the position and the orientation of the touch panel display do not change along a touching direction at a touch panel input time based on the region and the motion direction estimated by the touch pattern estimating unit; and
control a stiffness parameter of the arm through an arm control unit based on the information generated by the stiffness parameter information generating unit.

* * * * *